(12) United States Patent
Krajnik et al.

(10) Patent No.: US 6,869,996 B1
(45) Date of Patent: Mar. 22, 2005

(54) WATERBORNE COATING HAVING IMPROVED CHEMICAL RESISTANCE

(75) Inventors: John M. Krajnik, Shaker Heights, OH (US); Keith R. Olesen, Morrisville, NC (US); Gerald A. Vandezande, Cary, NC (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 09/437,171

(22) Filed: Nov. 9, 1999

Related U.S. Application Data
(60) Provisional application No. 60/138,086, filed on Jun. 8, 1999.

(51) Int. Cl.$^7$ .......................... C08L 29/12; C08L 31/04
(52) U.S. Cl. ...................... 524/521; 524/501; 524/515; 524/522; 524/523; 524/524
(58) Field of Search ............... 524/501, 515, 524/521, 522, 523, 524

(56) References Cited

U.S. PATENT DOCUMENTS

| | | | |
|---|---|---|---|
| 3,150,110 A | 9/1964 | Becker, Jr. et al. | 260/17 |
| 3,277,056 A | 10/1966 | Coleman | 260/63 |
| 3,345,336 A | 10/1967 | Kuhlkamp et al. | 260/63 |
| 3,736,165 A | 5/1973 | Sawyer, Jr. | 106/487 |
| 3,896,073 A | 7/1975 | Smith | 260/29.6 RW |
| 3,959,224 A | 5/1976 | Coleman | 260/63 R |
| 3,984,485 A | 10/1976 | Neefe | 260/63 UY |
| 4,025,483 A | 5/1977 | Ramig, Jr. | 260/29.6 MM |
| 4,102,843 A | 7/1978 | Sperry et al. | 260/29.6 RW |
| 4,107,120 A * | 8/1978 | Plamondon et al. | 523/201 |
| 4,144,212 A | 3/1979 | Linder et al. | 260/29.7 H |
| 4,176,103 A * | 11/1979 | Cruden et al. | 260/29.6 RW |
| 4,283,320 A | 8/1981 | Carroll et al. | 260/29.6 RW |
| 4,384,980 A | 5/1983 | Sonnabend | 526/313 |
| 4,514,552 A | 4/1985 | Shay et al. | 526/301 |
| 4,517,098 A | 5/1985 | Hann et al. | 210/701 |
| 4,522,962 A | 6/1985 | Abbey et al. | 523/410 |
| RE31,936 E | 7/1985 | Sperry et al. | 524/522 |
| 4,600,761 A | 7/1986 | Ruffner et al. | 526/270 |
| 4,616,074 A | 10/1986 | Ruffner | 526/318 |
| 4,703,080 A | 10/1987 | Shay et al. | 524/555 |
| 4,722,962 A | 2/1988 | Shay et al. | 524/548 |
| 4,743,698 A | 5/1988 | Ruffner et al. | 549/478 |
| 4,771,086 A | 9/1988 | Martin | 523/205 |
| 4,789,694 A | 12/1988 | Hahn, Jr. | 523/310 |
| 4,792,343 A | 12/1988 | Hawe et al. | 44/51 |
| 4,801,671 A | 1/1989 | Shay et al. | 526/214 |
| 4,997,864 A | 3/1991 | Waters | 523/319 |
| 5,102,936 A | 4/1992 | Huth et al. | 524/247 |
| 5,179,158 A * | 1/1993 | Azuma et al. | 524/748 |
| 5,191,051 A | 3/1993 | Shay et al. | 526/301 |
| 5,278,225 A | 1/1994 | Kohlhammer et al. | 524/560 |
| 5,292,828 A | 3/1994 | Jenkins et al. | 525/420 |
| 5,292,843 A | 3/1994 | Jenkins et al. | 526/318.5 |
| 5,294,693 A | 3/1994 | Egraz et al. | 526/310 |
| 5,320,672 A | 6/1994 | Whalen-Shaw | 106/287.24 |
| 5,342,883 A | 8/1994 | Jenkins et al. | 524/845 |
| 5,352,734 A | 10/1994 | Jenkins et al. | 524/845 |
| 5,385,960 A | 1/1995 | Emmons et al. | 523/205 |
| 5,399,618 A | 3/1995 | Jenkins et al. | 524/817 |
| 5,401,802 A | 3/1995 | Jenkins et al. | 524/845 |
| 5,405,900 A | 4/1995 | Jenkins et al. | 524/556 |
| 5,412,019 A | 5/1995 | Roulstone et al. | 524/497 |
| 5,414,041 A | 5/1995 | Larson et al. | 524/589 |
| 5,426,182 A | 6/1995 | Jenkins et al. | 536/54 |
| 5,432,229 A | 7/1995 | Aoki et al. | 524/820 |
| 5,436,292 A | 7/1995 | Jenkins et al. | 524/817 |
| 5,476,900 A | 12/1995 | Jenkins et al. | 524/823 |
| 5,478,602 A | 12/1995 | Shay et al. | 427/389 |
| 5,486,587 A | 1/1996 | Shay et al. | 526/333 |
| 5,488,180 A | 1/1996 | Jenkins et al. | 568/609 |
| 5,534,585 A | 7/1996 | Roulstone et al. | 524/497 |
| 5,561,189 A | 10/1996 | Jenkins et al. | 524/817 |
| 5,629,375 A | 5/1997 | Jenkins et al. | 524/556 |
| 5,639,841 A | 6/1997 | Jenkins | 526/333 |
| 5,739,196 A | 4/1998 | Jenkins et al. | 524/460 |
| 5,739,378 A | 4/1998 | Jenkins et al. | 560/181 |
| 5,889,107 A * | 3/1999 | Jakob et al. | 524/783 |
| 5,912,293 A | 6/1999 | Stockwell et al. | 524/306 |
| 5,928,730 A | 7/1999 | Nakayama | 427/457 |
| 5,962,571 A | 10/1999 | Overbeek et al. | 524/460 |
| 6,262,169 B1 | 7/2001 | Helmer et al. | 524/555 |
| 6,362,274 B1 | 3/2002 | Legrand et al. | 524/612 |

FOREIGN PATENT DOCUMENTS

| | | |
|---|---|---|
| EP | 0 409 459 | 1/1991 |
| EP | 0 811 663 | 12/1997 |
| EP | 0 875 540 | 11/1998 |
| EP | 0 875 542 | 11/1998 |
| EP | 0 989 163 | 3/2000 |
| WO | WO 98/52980 | 11/1998 |
| WO | WO 00/75205 A1 | 12/2000 |
| WO | WO 00/75206 A1 | 12/2000 |

OTHER PUBLICATIONS

A. D. Jenkins (UK), P. Kratochvil (Czech Republic), R.F. T. Stepto (UK), and U. W. Suter (Switzerland); Glossary of Basic Terms in Polymer Science, Pure & Appl. Chem., vol. 68, No. 12, pp. 2287–2311, 1996.

* cited by examiner

Primary Examiner—Judy M. Reddick
(74) Attorney, Agent, or Firm—Arthi K. Tirey; Vivien Y. Tsang; Heidi A. Boehlefeld

(57) ABSTRACT

A waterborne coating having improved chemical resistance produced from a composition containing a binder resin having post crosslinking groups, an associative thickener having post crosslinking groups and an associative dispersant having post crosslinking groups.

21 Claims, No Drawings

WATERBORNE COATING HAVING IMPROVED CHEMICAL RESISTANCE

This application claims the benefit of Provisional application Ser. No. 60/138,086, filed Jun. 8, 1999.

BACKGROUND OF THE INVENTION

This invention relates to waterborne coatings having improved chemical resistance. Conventional latex paints are widely used because they provide low volatile organic compound emission and because they allow easier clean up than solvent borne coatings. However, when compared to solvent borne coating systems, typical latex coatings lack the chemical resistance provided by such solvent borne coatings.

It has now been found that latex coating compositions having superior chemical resistance can be produced by formulating a chemical coating comprising a binder resin having post crosslinking groups, an associative thickener having post crosslinking groups and an associative dispersant having post crosslinking groups. The crosslinking groups present in the polymer of the dispersant and/or the thickener can be adjusted, depending on the particular binder resin used, to optimize the desired performance properties of the coating composition. Specifically, a coating composition can be tailor made to have increased chemical resistance, corrosion resistance, humidity resistance and/or adhesion to a particular substrate by altering the levels of crosslinking on the binder, thickener and dispersant. The coating composition of the present invention may be ambient cured, oven cured or radiation cured.

SUMMARY OF THE INVENTION

The present invention is directed to an aqueous coating composition in which the binder polymer, thickener polymer and/or dispersant polymer have functional groups that further react some time after initial formation of the polymer. The aqueous coating composition contains (a) a binder polymer comprising at least one or more copolymerizable monoethylenically unsaturated monomers, wherein at least one of the monoethylenically unsaturated monomers contains latent crosslinking functionality; and (b) a second polymer comprising a monoethylenically unsaturated monomer containing latent crosslinking functionality. The second polymer may be an associative thickener or an associative dispersant.

The binder polymer, thickener and dispersant polymer may contain a macromonomer represented by the formula:

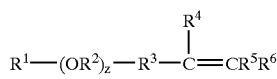

wherein $R^1$ is a monovalent residue of a substituted or unsubstituted hydrophobe compound; each $R^2$ is the same or different and is a substituted or unsubstituted divalent hydrocarbon residue; $R^3$ is a substituted or unsubstituted divalent hydrocarbon residue; $R^4$, $R^5$, $R^6$ are the same or different and are hydrogen or a substituted or unsubstituted monovalent hydrocarbon residue; and z is a value of 0 to 150.

The binder polymer, thickener polymer and dispersant polymer may contain diacetone acrylamide as the monomer having latent crosslinking functionality.

The aqueous coating compositions of the present invention produce coatings having improved chemical resistance, as well as improved corrosion resistance.

DETAILED DESCRIPTION OF THE INVENTION

Binder

The latex polymers used as binders in accordance with the present invention (also referred to herein as "binders") include those polymers polymerized from one or more suitable monomers. Typically, the binders are polymerized from one or more copolymerizable monoethylenically unsaturated monomers such as, for example, vinyl monomers and acrylic monomers.

The vinyl monomers suitable for use in accordance with the present invention include any compounds having vinyl functionality, i.e., ethylenic unsaturation, exclusive of compounds having acrylic functionality, e.g., acrylic acid, methacrylic acid, esters of such acids, acrylonitrile and acrylamides. Preferably, the vinyl monomers are selected from the group consisting of vinyl esters, vinyl aromatic hydrocarbons, vinyl aliphatic hydrocarbons, vinyl alkyl ethers and mixtures thereof.

Suitable vinyl monomers include vinyl esters, such as, for example, vinyl propionate, vinyl laurate, vinyl pivalate, vinyl nonanoate, vinyl decanoate, vinyl neodecanoate, vinyl butyrates, vinyl benzoates, vinyl isopropyl acetates and similar vinyl esters; vinyl aromatic hydrocarbons, such as, for example, styrene, methyl styrenes and similar lower alkyl styrenes, chlorostyrene, vinyl toluene, vinyl naphthalene and divinyl benzene; vinyl aliphatic hydrocarbon monomers, such as, for example, vinyl chloride and vinylidene chloride as well as alpha olefins such as, for example, ethylene, propylene, isobutylene, as well as conjugated dienes such as 1,3 butadiene, methyl-2-butadiene, 1,3-piperylene, 2,3-dimethyl butadiene, isoprene, cyclohexene, cyclopentadiene, and dicyclopentadiene; and vinyl alkyl ethers, such as, for example, methyl vinyl ether, isopropyl vinyl ether, n-butyl vinyl ether, and isobutyl vinyl ether.

The acrylic monomers suitable for use in accordance with the present invention comprise any compounds having acrylic functionality. Preferred acrylic monomers are selected from the group consisting of alkyl acrylates, alkyl methacrylates, acrylate acids and methacrylate acids as well as aromatic derivatives of acrylic and methacrylic acid, acrylamides and acrylonitrile. Typically, the alkyl acrylate and methacrylic monomers (also referred to herein as "alkyl esters of acrylic or methacrylic acid") will have an alkyl ester portion containing from 1 to about 12, preferably about 1 to 5, carbon atoms per molecule.

Suitable acrylic monomers include, for example, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecyl acrylate and methacrylate, benzyl acrylate and methacrylate, isobornyl acrylate and methacrylate, neopentyl acrylate and methacrylate, 1-adamatyl methacrylate and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates, amino acrylates, methacrylates as well as acrylic acids such as acrylic and methacrylic acid, ethacrylic acid, alpha-chloroacrylic acid, alpha-cycanoacrylic acid, crotonic acid, beta-acryloxy propionic acid, and beta-styryl acrylic acid.

In addition to the specific monomers described above, those skilled in the art will recognize that other monomers such as, for example, allylic monomers, or monomers which impart wet adhesion, e.g., methacrylamidoethyl ethylene urea, can be used in place of, or in addition to, the specifically described monomers in the preparation of the binders (as well as the dispersants and thickeners hereinafter described). Further details concerning such other monomers suitable for copolymerization in accordance with the present invention are known to those skilled in the art. The amount of such other monomers is dependent on the particular monomers and their intended function, which amount can be determined by those skilled in the art.

The binder polymer of the present invention has crosslinking functionality. At least one of the monomers used to polymerize the binder is a monoethylenically, unsaturated monomer containing "latent crosslinking" capabilities, which as used herein means a monomer which possesses the ability to further react some time after initial formation of the polymer. Activation can occur through the application of energy, e.g., through heat or radiation. Also, drying can activate the crosslinking polymer through changes in pH, oxygen content or other changes that causes a reaction to occur. The particular method of achieving crosslinking in the binder polymer is not critical to the present invention. A variety of chemistries are known in the art to produce crosslinking in latexes.

Examples of monomers which do not effect crosslinking until during film formation include carbonyl-containing monomers such as acrolein, methacrolein, diacetone acrylamide, diacetone methacrylamide and vinylaceto acetate. These monomers result in postcrosslinking, for example, when the aqueous polymer emulsion simultaneously contains an appropriate added amount of a polyamine compound. Particularly suitable compounds of this type are the dihydrazides and trihydrazides of aliphatic and aromatic dicarboxylic acids of 2 to 20 carbon atoms. Examples of these are oxalic dihydrazide, adipic dihydrazide and sebacic dihydrazide. Another monomer which produces postcrosslinking is, for example, 2-acetoacetoxyethyl methacrylate (alone or in combination with polyamines or polyaldehydes, such as glyoxal).

Other polymer building blocks which are suitable for postcrosslinking are those which contain hydrolyzable organosilicon bonds. Examples are the copolymerizable monomers methacryloyloxypropyltrimethoxysilane and vinyltrimethoxysilane. Further suitable polymer building blocks of a corresponding type are described in DE-A4341260. If the disperse polymer particles have carboxyl groups, postcrosslinking can also be effected by adding metal salts having polyvalent cations (for example Mg, Ca, Zn or Zr salts).

Epoxy-, hydroxyl- and/or N-alkylol-containing monomers, for example, glycidyl acrylate, N-methylolacrylamide and -methacrylamide and monoesters of dihydric alcohols with α,β-monoethylenically unsaturated carboxylic acids of 3 to 6 carbon atoms, such as hydroxyethyl, hydroxy-n-propyl or hydroxy-n-butyl acrylate and methacrylate are also suitable for postcrosslinking.

U.S. Pat. No. 4,144,212 describes an air-curing copolymer latex prepared by emulsion copolymerization in the presence of free radical polymerization catalysts such as inorganic or organic peroxide polymerization catalysts, with a blend (in % by weight based on the total weight of all monomers used) of (a) about 1% to about 20% of dicyclopentadienyl acrylate or dicyclopentadienyl methacrylate, (b) about 99% to about 20% of an alkyl acrylate or methacrylate, including mixtures of such monomers, and preferably a lower alkyl acrylate or methacrylate in which the alkyl groups contain from 1 to 4 carbon atoms, (c) 0% to about 5% of acrylic acid or methacrylic acid, and (d) 0% to about 85% of other monoethylenically unsaturated copolymerizable monomers, e.g., higher alkyl acrylates and methacrylates in which the alkyl groups contain from 5 to about 18 carbon atoms, acrylamide, methacrylamide, acrylonitrile or methacrylonitrile; also vinyl esters (e.g. vinyl acetate, vinyl propionate of vinyl chloride), styrene and alkyl vinyl ethers.

The binder resin of the present invention contains about 0.5 to 10% by weight, based on the total weight of the polymer, of at least one monomer having latent crosslinking functionality, and preferably 1 to 6% by weight, based on the total weight of the polymer, of at least one monomer having latent crosslinking functionality.

Typically, the particle size of the binders is from about 0.1 to 1.0 microns, preferably from about 0.2 to 0.4 microns and more preferably from about 0.25 to 0.3 microns. The Tg of the binders of the present invention is typically from about −60 to 100° C. preferably from about −30 to 70° C. and more preferably from about −15 to 60° C. As used herein, the term "Tg" means polymer glass transition temperature. Techniques for measuring the glass transition temperature of polymers are known to those skilled in the art. One such technique is, for example, differential scanning calorimetry. A particularly useful means of estimating the glass transition temperature of a polymer is that given by Fox, $$1/Tg_{(polymer)} = x_1/Tg_1 + x_2/Tg_2 + x_3/Tg_3 + \ldots + x_n/Tg_n \qquad (1)$$

where $x_1$ is the weight fraction of component i in the copolymer and $Tg_1$ is the homopolymer glass transition of component i. The homopolymer glass transition temperatures can be found in any publicly available source such as the Polymer Handbook. For example, the homopolymer glass transition temperatures for typical monomers are: vinyl acetate =−32° C., butyl acrylate =−54° C., and vinyl neodecanoate =−3° C. and 2-ethylhexyl acrylate =−65° C.

Typically, the viscosity of the binders of the present invention is from about 20 to 3000 and preferably from about 50 to 1500 centipoise ("cP") measured with a 40 to 60 weight percent solids composition using a Brookfield Viscometer with a number 2 spindle at 60 revolutions per minute. The molecular weight of the binders of the present invention is typically from about 104 to $10^7$, preferably from about 200,000 to 1,000,000 grams per gram mole. As used herein, the term "molecular weight" means weight average molecular weight. Techniques for altering molecular weight are well known and include, for example, utilizing multi functional monomers and chain transfer agents. Techniques for measuring the weight average molecular weight of latex polymers is known to those skilled in the art. One such technique is, for example, gel permeation chromatography.

The binder polymer of the present invention may contain hydrophobic groups. The monoethylenically unsaturated monomers described above can be polymerized with one or more macromonomers which are polymerizable. Such macromonomers comprise a hydrophobic portion and an alkoxylated portion which is polymerizable with the other monomers. U.S. Pat. No. 4,703,080, incorporated herein by reference, describes hydrophobic binder resins. Preferred macromonomers are urethane monomers which comprise the reaction product of a monohydric surfactant and a monoethylenically unsaturated isocyanate. These macromonomers are described in detail below with respect to the dispersant.

In one aspect of the present invention, the binder polymer comprises an acid functional latex. Specific acid functional monomers suitable for use in accordance with the present invention include, for example, acrylic acid, methacrylic acid, and maleic acid.

Preparation of latex compositions is well known in the paint and coatings art. Any of the well known free-radical emulsion polymerization techniques used to formulate latex polymers can be used in the present invention. Such procedures include, for example, single feed, core-shell, and inverted core-shell procedures which produce homogeneous or structures particles.

A preferred vinyl acrylate binder resin comprises 40–60% by weight of a fatty acid vinyl ester, 30–50% by weight of methylmethacrylate, 0.5 to 10% by weight of diacetone acrylamide and 0.5–5% by weight methacrylic acid, based on the total weight of the polymer.

A preferred acrylic binder resin comprises 20–35% by weight butyl acrylate, 40–65% by weight methyl methacrylate, 0.5–10% by weight diacetone acrylamide, 0.5–5% by weight methacrylic acid and 5–10% by weight acrylonitrile, based on the total weight of the polymer.

Dispersants

The dispersants suitable for use in accordance with the present invention comprise the reaction product of an unsaturated carboxylic acid monomer, a monoethylenically unsaturated monomer different from the carboxylic acid monomer, a macromonomer comprising a hydrophobic portion and an alkoxylated portion which is polymerizable with the other monomers, and a monomer having latent crosslinking functionality.

The unsaturated carboxylic acid monomers suitable for use in accordance with the present invention are typically $\alpha,\beta$-monethylenically unsaturated carboxylic acids. Preferred carboxylic acid monomers are selected from the group consisting of acrylic acid, methacrylic acid, crotonic acid, itaconic acid, maleic acid, and mixtures thereof. Methacrylic acid is especially preferred. The concentration of the carboxylic acid monomer is typically from about 20 to 70 weight percent, preferably from about 20 to 50 weight percent and more preferably from about 35 to 45 weight percent based on the total weight of the polymer. The amount of the carboxylic acid monomer is preferably sufficient to provide a polymeric structure which will solubilize and provide viscosity enhancement when reacted with an alkali such as for example, sodium hydroxide.

In accordance with the present invention, the monoethylenically unsaturated monomer different from the carboxylic acid monomer preferably comprises a methyl group. More preferably, this monomer is an acrylate. Most preferably, this monomer is ethyl acrylate. Typically, the amount of the monoethylenically unsaturated monomer different from carboxylic acid is from about 5 to 70 weight percent, preferably from about 10 to 50 weight percent based on the total weight of the polymer.

The macromonomers suitable for manufacturing the dispersant in accordance with the present invention comprise a hydrophobic portion and an alkoxylated portion which is polymerizable with other monomer(s). As used herein, the term "macromonomer" means a polymerizable monomer which comprises the reaction product of two or more compounds. Such macromonomers include, for example, any alkoxylated, e.g., ethoxylated or propoxylated, monomers having ethylenic unsaturation and which are terminated by a hydrophobic fatty chain. Examples of unsaturated, polymerizable moieties include those selected from the group consisting of vinyl group containing moieties, methacryloyl, maleoyl, itaconoyl, crotonyl, an unsaturated urethane moiety, hemiester maleoyl, hemiester itaconoyl, $CH_2=CHCH_2-O-$, methacrylamido and substituted methacrylamido. Examples of hydrophobic moieties include those selected from the group consisting of alkyl, alkaryl, i.e., alkylaryl or aralkyl, or aryl, linear or branched, saturated or unsaturated, and having at least 6 carbon atoms, preferably from about 6 to 30 carbon atoms per molecule.

Preferred macromonomers are urethane monomers which comprise the reaction product of a monohydric surfactant and a monoethylenically unsaturated isocyanate. Preferably, the urethane monomer is a nonionic, urethane monomer which is the urethane reaction product of a monohydric, nonionic surfactant with a monoethylenically unsaturated monoisocyanate, preferably one lacking ester groups, e.g., alpha, alpha-dimethyl-m-isopropenyl benzyl isocyanate. The monohydric nonionic surfactants are themselves well known and are usually alkoxylated, e.g., ethoxylated, hydrophobes containing adducted ethylene oxide to provide the hydrophilic portion of the molecule. The hydrophobes are usually aliphatic alcohols or alkyl phenols in which a carbon chain containing at least 6 carbon atoms, preferably about 6 to 30 carbon atoms, provides the hydrophobic portion of the surfactant. These surfactants are illustrated by ethylene oxide adducts of dodecyl alcohol or octyl or nonyl phenol which are available in commerce and which contain about 5 to about 150, preferably 25 to 60 moles of ethylene oxide per mole of hydrophobe. Other hydrophobic substituents, such as complex hydrophobes, disclosed for example in U.S. Pat. No. 5,488,180 issued Jan. 30, 1996, are suitable for use in accordance with the present invention.

The monoethylenically unsaturated isocyanates suitable for use in preparing the urethane monomers can be any isocyanates effective to form the desired urethane linkage. Preferably, the isocyanate is a monoethylenically unsaturated monoisocyanate. Any copolymerizable unsaturation may be employed, such as acrylate and methacrylate unsaturation. One may also use allylic unsaturation, as provided by allyl alcohol. These, preferably in the form of a hydroxy-functional derivative, as is obtained by reacting a C2–C4 monoepoxide, like ethylene oxide, propylene oxide or butylene oxide, with acrylic or methacrylic acid to form an hydroxy ester, are preferably reacted in equimolar proportions with an organic diisocyanate, such as toluene diisocyanate or isophorone diisocyanate. The preferred monoethylenic monoisocyanate is styryl, as in alpha, alpha-dimethyl-m-isopropenyl benzyl isocyanate, and this unsaturated monoisocyanate lacks the ester group so it forms urethanes which lack this group. The amount of the monoethylenically unsaturated isocyanate relative to the monohydric surfactant used in making the macromonomer, (on a mole ratio basis) is typically from about 0.1–2.0 to 1, preferably about 1.0 to 1.0.

Suitable macromonomers useful in this invention can also be represented by the formula:

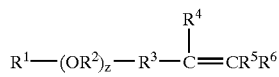

wherein:
R[1] is a monovalent residue of a substituted or unsubstituted hydrophobe compound;
each R[2] is the same or different and is a substituted or unsubstituted divalent hydrocarbon residue;

$R^3$ is a substituted or unsubstituted divalent hydrocarbon residue;

$R^4$, $R^5$, $R^6$ are the same or different and are hydrogen or a substituted or unsubstituted monovalent hydrocarbon residue;

and z is a value of 0 to 150.

Illustrative $R^1$ substituents include, for example, simple or complex hydrophobe containing from 1 to 30 carbon atoms such as alkyl, aryl, aralkyl, alkaryl and cycloakyl groups.

Illustrative $R^3$ substituents include, for example, the organic residue of ethers, esters, urethanes, amides, ureas, anhydrides and the like including mixtures thereof. The $R^3$ substituent can be generally described as a "linkage" between the hydrophobe bearing surfactant or alcohol and the unsaturated portion of the macromonomer compound.

The oxyalkylene moieties included in the macromonomer compounds may be homopolymers or block or random copolymers of straight or branched alkylene oxides. Mixtures of alkylene oxides such as ethylene oxide and propylene oxides may also be employed.

Further details concerning the preparation of such macromonomers are known to those skilled in the art and are disclosed, for example, in U.S. Pat. Nos. 4,514,552, 4,801, 671, 5,292,828, 5,292,843 and 5,294,693, incorporated herein by reference.

Typically, the amount of the macromonomer is from about 0.5 to 60 weight percent, preferably from about 5 to 50 weight percent and more preferably from about 35 to 45 weight percent based on the total weight of the dispersant polymer. Typically, the molecular weight of the macromonomer ranges from about 400 to 8000 grams per gram mole.

Typically the viscosity of the dispersants of the present invention is from about 5 to 1500 cP in the un-neutralized form measured at 20° C. with a 20 to 50 weight percent solids composition using a Brookfield Viscometer with a number 2 spindle at 60 revolutions per minute. The molecular weight of the dispersants of the present invention is typically from about $10^3$ to $10^6$, preferably from about 5,000 to 10,000 grams per gram mole. Typically, the particle size of the dispersant is from about 0.05 to 1.0 microns, preferably from about 0.1 to 0.4 microns and more preferably from about 0.1 to 0.3 microns. The Tg of the dispersants of the present invention is typically from about 0 to 90° C. preferably from about 5 to 60° C. and more preferably from about 15 to 35° C.

The dispersants useful in the present invention contain 0.5 to 50% by weight, preferably 20 to 35% by weight, based on the total weight of the dispersant polymer, of at least one monomer having latent crosslinking functionality.

Thickeners

Any suitable alkali soluble thickeners may be utilized in accordance with the present invention. Such alkali soluble thickeners are disclosed, for example, in U.S. Pat. Nos. 4,514,552, 4,722,962, 5,292,828 and 5,292,843, which are incorporated herein by reference. The alkali soluble thickeners typically comprise the aqueous emulsion reaction product of an unsaturated carboxylic acid monomer, e.g., methacrylic acid; a monoethylenically unsaturated monomer different from the carboxylic acid monomer, e.g. ethyl acrylate; a macromonomer comprising a hydrophobic portion and an alkoxylated portion which is polymerizable with the other monomers; and a monomer having latent crosslinking functionality. The unsaturated carboxylic acid monomer, monoethylenically unsaturated monomer different from the carboxylic acid monomer, macromonomer and latent crosslinking monomer used to polymerize the thickener can include those such as described above with reference to the binder polymer and dispersant. Often, the macromonomer is a urethane monomer which is the urethane reaction product of a monohydric surfactant and a monoethylenically unsaturated monoisocyanate. Typically, the monohydric surfactant comprises an ethyloxated or propoxylated aliphatic alcohol or alkyl phenol.

In a preferred aspect of the present invention, the thickeners are prepared in accordance using monomers such as those described above with respect to the preferred dispersants. Typically, the amount of the macromonomer is from about 1 to 20 weight percent, perferably from about 5 to 15 weight percent based on the total weight of the polymer.

Typically, the viscosity of the thickeners of the present invention is from about 5 to 1500 cP in the un-neutralized form measured at 20° C. with a 20 to 50 weight percent solids composition using a Brookfield Viscometer with a number 2 spindle at 60 revolutions per minute. The molecular weight of the thickeners of the present invention is typically from about $10^4$ to $10^7$, preferably from about 20,000 to 200,000 grams per gram mole. Typically, the particle size of the thickeners is from about 0.05 to 1.0 microns, preferably from about 0.1 to 0.4 microns and more preferably from about 0.1 to 0.3 microns. The Tg of the thickeners of the present invention is typically from about 0 to 90° C., preferably from about 5 to 60° C., and more preferably from about 15 to 55° C.

The thickeners useful in the present invention contain 0.5 to 35% by weight, preferably 1 to 5% by weight, based on the total weight of the thickener polymer, of at least one monomer having latent crosslinking functionality.

The binders, dispersants and thickeners of the present invention are typically in colloidal form, i.e., aqueous dispersions, or in solution and can be prepared by emulsion polymerization in the presence of a chain transfer agent and an initiator. Specific details concerning procedures and conditions for emulsion polymerization are known to those skilled in the art. Typically, however, the polymerization is carried out in an aqueous medium at a temperature of from about 35 to 90° C. The pressure is not critical and is dependent upon the nature of the monomers employed as can be determined by one skilled in the art.

A chain transfer agent is preferably present during the polymerization reaction at a concentration of from about 0.01 to 5 weight percent, preferably from about 0.1 to 2 weight percent based on the total monomer content. Both water-insoluble and water-soluble chain transfer agents can be employed. Illustrative of substantially water-soluble chain transfer agents are alkyl and aryl mercaptans such as butyl mercaptan, mercaptoacetic acid, mercaptoethanol, 3-mercaptol-1,2-propanediol and 2-methyl-2-propanethiol. Illustrative of the substantially water-insoluble chain transfer agents include, for example, t-dodecyl mercaptan, phenyl mercaptan, pentaerythritol tetramercaptopropionate, octyldecyl mercaptan, tetradecyl mercaptan and 2-ethylhexyl-3-mercaptopropionate.

In carrying out the emulsion polymerization, an initiator (also referred to in the art as a catalyst) is preferably used at a concentration sufficient to catalyze the polymerization reaction. This will typically vary from about 0.01 to 3 weight percent based on the weight of monomers charged. However, the concentration of initiator is preferably from about 0.05 to 2 weight percent and, most preferably, from about 0.1 to 1 weight percent of the monomers charged. The particular concentration used in any instance will depend upon the specific monomer mixture undergoing reaction and the specific initiator employed, which details are known to those skilled in the art. Illustrative of suitable initiators include hydrogen peroxide, peracetic acid, t-butyl hydroperoxide, di-t-butyl hydroperoxide, dibenzoyl peroxide, benzoyl hydroperoxide, 2,4-dicholorbenzoyl peroxide, 2,5-dimethyl-2,5-bis(hydroperoxy) hexane, perbenzoic acid, t-butyl peroxypivalate, t-butyl peracetate, dilauroyl peroxide, dicapryloyl peroxide, distearoyl peroxide, dibenzoyl peroxide, diisopropyl peroxydicarbonate, didecyl peroxydicarbonate, dicicosyl peroxydicarbonate, di-t-butyl perbenzoate, 2,2'-azobis-2,4-dimethylvaleronitrile, ammonium persulfate, potassium persulfate, sodium persulfate, sodium perphosphate, azobisisobutyronitrile, as well as any of the other known initiators. Also useful are the redox catalyst systems such as sodium persulfate-sodium formaldehyde sulfoxylate, cumene hydroperoxide-sodium metabisulfite, hydrogen peroxide-ascorbic acid, and other known redox systems. Moreover, as known by those skilled in the art, traces of metal ions can be added as activators to improve the rate of polymerization, if desired.

The particular surfactant useful for conducting the polymerization reaction is not critical to the present invention. Typical surfactants include anionic surfactants such as sodium lauryl sulfate, sodium tridecylether sulfate, diester sulfosuccinates and sodium salts of alkyl aryl polyether sulfonates; and nonionic surfactants such as alkyl aryl polyether alcohols and ethylene oxide condensates of propylene oxide, propylene glycol adducts.

The reaction products of the polymerizations comprising the binders, dispersants or thickeners of the present invention typically have a solids, i.e., polymer, content of from about 15 to 65 weight percent, preferably from about 20 to 65 weight percent and more preferably from about 25 to 60 weight percent based on the weight of the latex and water.

EXAMPLES

The following examples are provided for illustrative purposes and are not intended to limit the scope of the claims which follow.

Example M1

Preparation of Macromonomer with Small Hydrophobe

To a one-liter glass reactor fitted with a thermometer, heating mantle, thermoregulator, stirrer, nitrogen sparge, and condenser including a Dean-Stark trap was charged 930 grams of a 40 mole ethoxylate of nonyl phenol, i.e., a small hydrophobe. The reactor contents were heated, with nitrogen sparging, to 110° C. and held for two hours while trace moisture was removed and collected in the Dean-Stark Trap (typically less than 1 g). The reactor contents were then cooled to 80° C., the Dean Stark trap was replaced with a condenser, and the nitrogen sparge was switched to an air sparge for 15 minutes. With continued air sparging, 0.02 g methoxy-hydroquinone inhibitor, 0.50 g dibutyl tin dilaurate catalyst, and 99.7 g of alpha, alpha-dimethyl-m-isopropenyl benzyl isocyanate (m-TMI, a product of CYTEC, Stamford, Conn.) were charged in order to the reactor. After a rapid initial exotherm which increased the reaction temperature about 8° C., the contents were maintained at 80° C. for an additional two hours. The product was then cooled to room temperature. The final product was a white wax in appearance with residual isocyanate content of 0.5% and with 98% of the original ethylenic unsaturation retained.

Example M2

Preparation of Macromonomer with Large Hydrophobe

A macromonomer was prepared substantially in accordance with Example M1, except that a 20 mole ethoxylate of bis-nonylphenoxy ethanol (large hydrophobe) was used in place of the nonylphenol (small hydrophobe) and the amounts of the reacts used were adjusted to maintain a molar ration of 1:1.

Example A

Acrylic Latex Binder Preparation

A monomer mixture was prepared by charging 460 g of butyl acrylate, 520 g of methyl methacrylate, 9.8 g diacetone acrylamide (DAAM), 5.4 g of methacrylic acid, 40 g of Rhodacal DS-4 (a dodecyl benzene sulfonate surfactant available from CYTEC) and 365 g of water to a two liter monomer feed cylinder. A two liter jacketed resin flask equipped with a four-bladed stainless steel mechanical stirrer, Claisen connecting tube, Friedrichs water condenser, nitrogen sparge and bubble trap, thermometer, and monomer addition inlets were used to charge 560 f of water. An initial oxidizer solution, prepared by dissolving 4 g of ammonium persulfate in 20 g of water, was prepared in a separate container. Under nitrogen purge, the reactor was heated to 80° C. by circulating temperature controlled water through the reactor jacket. After the temperature of the reactor charge had reached 80° C., the initial oxidizer solution was added to the reactor. Two minutes later, the monomer feed was conveyed to the reaction vessel over a 3 hour period by FMI (Fluid Metering Inc.) pumps using ⅛ inch Teflon tubing with continuous stirring while the reaction temperature was held between 79° and 81° C. The reaction was allowed to proceed at 80° C. for an additional hour after completion of the monomer feed. To the product was added 15% ammonium hydroxide solution to a pH of 9. To the cooled product was added 36.8 g of a 10% solution of adipic dihydrazide.

Example B

Styrene Acrylic Latex Binder Preparation

A first monomer mixture was prepared by charging 365 grams of butyl acrylate (BA), 470 grams of methyl methacrylate (MMA), 130 grams of styrene, 5.4 grams of methacrylic acid (MAA), 40 grams of diacetone acrylamide (DAAM), 40 grams of TRITON GR-9M (a disodium ethoxylated lauryl alcohol half ester of sulfosuccinic acid surfactant available from Union Carbide Corporation, Danbury, Conn.) and 450 grams of water to a 2-liter monomer feed cylinder. A two liter jacketed resin flask equipped with a four-blade stainless steel mechanical stirrer, Claisen connecting tube, Friedrichs water condenser, nitrogen sparge and bubble trap, thermometer, and monomer addition inlets was used as the reactor. To the reactor was charged 600 grams of water. An initial oxidizer solution, prepared by dissolving 4 grams of ammonium persulfate in 20 grams of water, was prepared in a separate container. Under nitrogen purge, the reactor was heated to 80° C. by circulating temperature controlled water through the reactor jacket. After the temperature of the reactor charge had reached 80° C., the initial oxidizer solution was added to the reactor. Two minutes later, the monomer feed was conveyed to the reaction vessel over a 3 hour period by FMI (Fluid Metering Inc.) pumps using ⅛ inch Teflon tubing with continuous stirring while the reaction temperature was held between 79° and 81° C. The reaction was allowed to proceed at 80° C. for an additional hour after completion of the monomer feed.

A second monomer mixture was prepared by charging 36 grams of methacrylic acid (MAA), 72 grams of methyl methacrylate, 120 grams of styrene, 12.5 grams diacetone acrylamide, 1.2 grams of ethylhexyl-3-mercaptopropionate as a chain transfer agent (CTA), 12.5 grams of the macromonomer of Example M1 and 12.5 grams of the macromonomer alpha, alpha-dimethyl-m-isopropenylbenzylisocyanate adduct with Bis-nonylphenoxy-propylpoly(ethyleneoxy) ethanol (large hydrophobe macromonomer of Example M2), 4 grams of Rhodacal DS-4 and 245 grams of water to a one 2-liter monomer feed cylinder. An additional 4 grams of ammonium persulfate in 20 grams of water, was prepared in a separate container and added to the reactor. The monomer feed was conveyed to the reaction vessel over a 3 hour period with continuous stirring while the reaction temperature was held between 79° and 81° C. The reaction was allowed to proceed at 80° C. for an additional hour after completion of the monomer feed.

To the product was added 15% ammonium hydroxide solution to a pH of 9. To the cooled product was added 0.75 molar amounts of adipic dihydrazide.

Table 1 below sets forth a variety of latexes made with the monomers as listed in accordance with the procedure of Example B. Ingredients are listed in grams.

TABLE 1

| Example | 1st Stage DAAM | 2nd Stage M1 | 2nd Stage M2 | 2nd Stage DAAM | 2nd Stage MAA | CTA |
|---|---|---|---|---|---|---|
| B1 | 40 | 0 | 0 | 12.5 | 30 | 0 |
| B2 | 15 | 0 | 12.5 | 5 | 36 | 1.2 |
| B3 | 40 | 12.5 | 0 | 12.5 | 36 | 0 |
| B4 | 15 | 12.5 | 12.5 | 5 | 36 | 0 |
| B5 | 15 | 12.5 | 12.5 | 5 | 30 | 1.2 |
| B6 | 15 | 12.5 | 0 | 5 | 36 | 1.2 |
| B7 | 40 | 0 | 0 | 12.5 | 36 | 1.2 |
| B8 | 40 | 12.5 | 0 | 12.5 | 30 | 1.2 |
| B9 | 15 | 12.5 | 0 | 5 | 30 | 0 |
| B10 | 40 | 12.5 | 12.5 | 12.5 | 30 | 0 |
| B11 | 15 | 0 | 12.5 | 5 | 30 | 0 |
| B12 | 15 | 0 | 0 | 5 | 36 | 0 |
| B13 | 15 | 0 | 0 | 5 | 30 | 1.2 |
| B14 | 40 | 0 | 12.5 | 12.5 | 30 | 1.2 |
| B15 | 40 | 12.5 | 12.5 | 12.5 | 36 | 1.2 |
| B16 | 40 | 0 | 12.5 | 12.5 | 36 | 0 |
| B17 | 100 | 0 | 0 | 25 | 48 | 1.2 |
| B18 | 50 | 0 | 5 | 12.5 | 48 | 1.2 |
| B19 | 100 | 0 | 5 | 25 | 36 | 1.2 |
| B20 | 50 | 0 | 0 | 12.5 | 36 | 1.2 |
| B21 | 50 | 0 | 5 | 12.5 | 36 | 1.2 |
| B22 | 100 | 0 | 0 | 25 | 36 | 1.2 |
| B23 | 100 | 0 | 5 | 25 | 48 | 1.2 |
| B24 | 50 | 0 | 0 | 12.5 | 48 | 1.2 |
| B25[1] | 50 | 0 | 0 | 12.5 | 15 | 1.2 |
| B26[1] | 50 | 0 | 0 | 12.5 | 15 | 1.2 |
| B27[2] | 50 | 0 | 0 | 12.5 | 15 | 1.2 |
| B28[2]* | 50 | 0 | 0 | 12.5 | 15 | 1.2 |
| B29[2]* | 50 | 0 | 0 | 12.5 | 15 | 1.2 |

[1]Methylmethacrylate substituted for styrene monomer in stage1 and stage 2.
[2]Veo Val0 substituted for BA and styrene in stage 1 and stage2.
[3]MMA substituted for styrene and acrylonitrile substituted for 10% by weight of MMA in stage 1 and stage 2.
*Surfactant used was Rhodafac RE-610

Example C

Latex Binder Preparation

A monomer mixture was prepared by charging 615 grams of VeoVa 10 (a vinyl versatate ester having 10 carbon atoms in the acid portion, commercially available from Shell Chemical), 368 grams of methyl methacrylate (MMA), 9.8 grams diacetone acrylamide (DAAM), 11 grams of methacrylic: acid (MAA), 40 grams of Rhodafac 610 (a nonylphenol ethoxylated phosphate ester surfactant available from Rhodia) and 365 grams of water to a 2-liter monomer feed cylinder. A two liter jacketed resin flask equipped with a four-bladed stainless steel mechanical stirrer, Claisen connecting tube, Freidrichs water condenser, nitrogen sparge and bubble trap, thermometer, and monomer addition inlets was used as the reactor. To the reactor was charged 560 grams of water. An initial oxidizer solution, prepared by dissolving 4 grams of ammonium persulfate in 20 grams of water, was prepared in a separate container. Under nitrogen purge, the reactor was heated to 80° C. by circulating temperature controlled water through the reactor jacket. After the temperature of the reactor charge had reached 80° C., the initial oxidizer solution was added to the reactor. Two minutes later, the monomer feed was conveyed to the reaction vessel over a 3 hour period by FMI pumps using 1/8" Teflon tubing with continuous stirring while the reaction temperature was held between 79° and 81° C. The reaction was allowed to proceed at 80° C. for an additional hour after completion of the monomer feed. To the product was added 15% ammonium hydroxide solution to a pH of 9. To the cooled product was added 0.75 molar amounts of adipic dihydrazide.

Table 2 below sets forth other latexes made with monomers as listed in accordance with the procedure of Example C. Ingredients are listed in grams.

TABLE 2

| Example | Veo Val0 | MMA | MAA | Surfactant |
|---|---|---|---|---|
| C1 | 615 | 368 | 11 | Rhodafac RE-610 |
| C2 | 487 | 497 | 11 | Rhodafac RE-610 |

Example D

Acrylic Latex Binder Preparation

A monomer mixture was prepared by charging 530 grams ("g") of butyl acrylate, 600 g of methyl methacrylate, 23 g diacetone acrylamide (DAAM), 5.4 g of methacrylic acid (MAA), 40 g of Rhodacal DS-4 (a surfactant available from Rhone-Poulenc) and 450 g of water to a one 2-liter monomer feed cylinder. A two liter jacketed resin flask equipped with a four-bladed stainless steel mechanical stirrer, Claisen connecting tube, Friedrichs water condenser, nitrogen sparge and bubble trap, thermometer, and monomer addition inlets were used to charge 800 g of water. An initial oxidizer solution, prepared by dissolving 4 g of ammonium persulfate in 20 g of water, was prepared in a separate container. Under nitrogen purge, the reactor was heated to 80° C. by circulating temperature controlled water through the reactor jacket. After the temperature of the reactor charge had reached 80° C., the initial oxidizer solution was added to the reactor. Two minutes later, the monomer feed was conveyed to the reaction vessel over a 3 hour period by FMI (Fluid Metering Inc.) pumps using 1/8" Teflon tubing with continuous stirring while the reaction temperature was held between 79 and 81° C. The reaction was allowed to proceed at 80° C. for an additional hour after completion of the monomer feed.

A second monomer mixture was prepared by charging 7.35 grams of methacrylic acid (MAA), 21 grams of butyl acrylate, 7.5 grams diacetone acrylamide (DAAM), 7.35 grams of the macromonomer M1, 4 grams of Rhodacal DS-4 and 10 grams of ammonium persulfate in 20 grams of water, was prepared in a separate container and added to the reactor. The monomer feed was conveyed to the reaction vessel over a 3 hour period with continuous stirring while the reaction temperature was held between 79 and 81° C. The reaction was allowed to proceed at 80° C. for an additional hour after completion of the monomer feed.

To the product was added 15% ammonium hydroxide solution to a pH of 9. To the cooled product was added 0.75 molar amounts of adipic dihydrazide.

Table 3 sets forth a variety of latexes made with the monomers as listed in accordance with the procedure of Example D. Ingredients are listed in grams.

TABLE 3

| Example | 1st Stage DAAM | 2nd Stage M1 | 2nd Stage DAAM | 2nd Stage MAA |
|---|---|---|---|---|
| D1 | 23 | 7.35 | 7.3 | 7.5 |
| D2 | 58 | 1.8 | 1.8 | 15 |
| D3 | 58 | 7.35 | 1.8 | 15 |
| D4 | 23 | 1.8 | 7.3 | 7.5 |
| D5 | 23 | 7.35 | 7.3 | 15 |
| D6 | 58 | 1.8 | 1.8 | 7.5 |
| D7 | 23 | 1.8 | 7.3 | 15 |
| D8 | 58 | 7.35 | 1.8 | 7.5 |

Example E

Preparation of Crosslinkable Thickener

A monomer mixture (300 grams) was prepared by charging ethyl acrylate, methacrylic acid, diacetone acrylamide, macromonomer M1, 13 grams of a 75% solution of Aerosol® OT surfactant (American Cyanamid) and 3 grams of distilled deionized water to a bottle, and dispersing the contents with vigorous shaking. The ethyl acrylate, methacrylic acid, diacetone acrylamide and macromonomer M1 were added in amounts identified in Table 4 below. A catalyst feed mixture comprised of 0.53 grams of sodium persulfate and 52.47 grams of water was prepared in another container. To a 2 liter resin flask that had been immersed in a thermostated water bath and equipped with a 4-bladed stainless steel mechanical stirrer, Claisen connecting tube, water condenser, nitrogen sparge and bubble trap, thermometer and monomer and catalyst addition inlets, 1.20 grams of the sodium salt of vinyl sulfonic acid and 658.5 grams of water were charged. The monomer mixture was charged to a 1-liter graduated monomer feed cylinder, and the catalyst solution was charged to a 125 milliliter graduated catalyst feed cylinder. Under nitrogen purge, the reactor was heated to 70° C., whereupon 33 milliliters of the monomer mixture and 3 milliliters of the catalyst feed mixture were charged to the reaction vessel. The reaction vessel was subsequently heated to 80° C. After allowing the monomers to react for 20 minutes to form a seed product, the monomer and catalyst feed mixtures were conveyed to the reaction vessel by FMI pumps via ⅛ inch teflon tubing at a rate of 1.94 and 0.27 milliters/minute, respectively, under continuous stirring at a reaction temperature held between 76° and 82° C. The reaction was allowed to proceed for another hour, after which the product was cooled and filtered with a 200 mesh nylon cloth. The coagulum was collected from the reaction vessel and filter cloth. The product is a low viscosity latex of solids content of about 40% and pH of about 2.5.

Table 4 sets forth a variety of thickeners made with the monomers as listed, in accordance with the procedure of Example E. Ingredients are listed in percentages by weight based on the total weight of the polymer.

TABLE 4

| Example | M1 | M2 | MAA | EA | DAAM | Surfactant |
|---|---|---|---|---|---|---|
| E1 | 15 |  | 40 | 35 | 10 | Rhodafac RE-610 |
| E2 | 5 |  | 40 | 45 | 10 | Rhodafac RE-610 |
| E3 | 15 |  | 40 | 40 | 5 | Rhodafac RE-610 |
| E4 | 5 |  | 40 | 50 | 5 | Triton GR-9M |
| E5 |  | 5 | 40 | 50 | 5 | Triton GR-9M |
| E6 |  | 5 | 40 | 45 | 10 | Triton GR-9M |
| E7 | 15 |  | 40 | 35 | 10 | Triton GR-9M |
| E8 | 15 |  | 40 | 40 | 5 | Triton GR-9M |

Example F

Preparation of Crosslinkable Dispersant

A monomer mixture (300 grams) was prepared by charging ethyl acrylate, methacrylic acid, diacetone acrylamide, macromonomer M1, 13 grams of a 75% solution of Aerosol® OT surfactant (American Cyanamid) and 3 grams of distilled deionized water to a bottle, and dispersing the, contents with vigorous shaking. The ethyl acrylate, methacrylic acid, diacetone acrylamide and macromonomer M1 were added in amounts identified in Table 5 below. A catalyst feed mixture comprised of 0.53 grams of sodium persulfate and 52.47 grams of water was prepared in another container. To a 2 liter resin flask that had been immersed in a thermostated water bath and equipped with a 4-beaded stainless steel mechanical stirrer, Claisen connecting tube, water condenser, nitrogen sparge and bubble trap, thermometer and monomer and catalyst addition inlets, 1.20 grams of the sodium salt of vinyl sulfonic acid and 658.5 grams of water were charged. The monomer mixture was charged to a 1-liter graduated monomer feed cylinder, and the catalyst solution was charged to a 125 milliliter graduated catalyst feed cylinder. Under nitrogen purge, the reactor was heated to 70° C., whereupon 33 milliliters of the monomer mixture and 3 milliliters of the catalyst feed mixture were charged to the reaction vessel. The reaction vessel was subsequently heated to 80° C. After allowing the monomers to react for 20 minutes to form a seed product, the monomer and catalyst feed mixtures were conveyed to the reaction vessel by FMI pumps via ⅛ inch teflon tubing at a rate of 1.94 and 0.27 milliters/minute, respectively, under continuous stirring at a reaction temperature held between 76° and 82° C. The reaction was allowed to proceed for another hour, after which the product was cooled and filtered with a 200 mesh nylon cloth. The coagulum was collected from the reaction vessel and filter cloth. The product is a low viscosity latex of solids content of about 25%. The product was subsequently neutralized to a pH of about 9.0.

Table 5 sets forth a variety of dispersants made with the monomers as listed, in accordance with the procedure of Example F. Ingredients are listed in percentages by weight based on the total weight of the polymer.

TABLE 5

| Example | M1 | M2 | MAA | EA | DAAM | Surfactant |
|---|---|---|---|---|---|---|
| F1 |  |  | 40 | 32.5 | 20 | Rhodafac RE-610 |
| F2 |  | 30 | 17.5 | 47.5 | 5 | Triton GR-9M |
| F3 | 30 |  | 17.5 | 17.5 | 35 | Triton GR-9M |
| F4 | 30 |  | 17.5 | 32.5 | 20 | Triton GR-9M |

TABLE 5-continued

| Example | M1 | M2 | MAA | EA | DAAM | Surfactant |
|---|---|---|---|---|---|---|
| F5 | 37.5 | | 17.5 | 25 | 20 | Rhodafac RE-610 |
| F6 | 37.5 | | 17.5 | 10 | 35 | Triton GR-9M |
| F7 | 45 | | 17.5 | 32.5 | 5 | Triton GR-9M |
| F8 | | 37.5 | 17.5 | 40 | 5 | Triton GR-9M |
| F9 | | 37.5 | 17.5 | 25 | 20 | Triton GR-9M |
| F10 | | 45 | 17.5 | 17.5 | 20 | Triton GR-9M |
| F11 | | 45 | 17.7 | 2.5 | 35 | Triton GR-9M |
| F12 | 30 | | 25 | 35 | 10 | Triton GR-9M |
| F13 | 30 | | 25 | 25 | 20 | Triton GR-9M |
| F14 | 30 | | 40 | 20 | 10 | Triton GR-9M |
| F15 | 30 | | 25 | 40 | 5 | Triton GR-9M |
| F16 | 30 | | 17.5 | 25 | 5 | Triton GR-9M |

The binders, thickeners and dispersants described above were used in the formulation of paints as described below. The paint formulations may, in addition to the polymers described herein, contain conventional additives, such as pigments, fillers, wetting agents, coalescants, biocides and anti-foaming agents and the like.

Example G

Preparation of Latex Paint

A pigment grind is prepared by adding the following ingredients in sequence: 54.96 grams of water, 5.92 grams of a 28% aqueous ammonia solution and 2.76 grams of Dispersant F9 to a HSD-type grinding apparatus with low agitation. Slowly added are 200.8 grams of TiPure R-706 titanium dioxide pigment (DuPont) while the agitation is increased. The mixture is ground for approximately 1 hour, or until a fineness of grind of 8 Hegman is obtained. The agitation is reduced and 25.6 grams of ethylene glycol and 1.8 grams of BYK 035 defoamer is added.

A thickener premix is prepared by adding 10.32 grams of water to a mix tank and under agitation, adding 0.25 grams of Thickener E5 and 0.05 grams of 28% aqueous ammonia solution to the tank.

The paint is prepared by adding 568.72 grams of Binder resin C2 to the grind mixture under agitation. After this mixture is agitated for about 30 minutes, the following ingredients are added in order: 21.64 grams of Exxate 1000 (Exxon), 5.44 grams of Arcosolve DPNB (dipropylene glycol n-butyl ether from Arco Chemicals) and 11.64 grams of Exxate 900 (oxononyl acetate from Exxon). The thickener premix is then added under agitation. Flash X-150 flash rust inhibitor (Halox) in an amount of 2.6 grams is then added, followed by 1.48 grams of Surfynol 104BC defoamer (Air Products) and 1.48 grams of Byk 307 (wetting agent from BYK-Chemie). Dispersant F9 is then added in an amount of 2.76 grams. The paint is mixed until it is homogeneous and then reduced with 54.57 grams of water to the desired application viscosity.

Example H

Preparation of Paint

A pigment grind is prepared by adding the following ingredients in sequence: 54.96 grams of water, 5.92 grams of a 28% aqueous ammonia solution and 2.55 grams of Dispersant F5 to a HSD-type grinding apparatus with low agitation. Slowly added are 200.8 grams of TiPure R-706 titanium dioxide pigment (DuPont) while the agitation is increased. The mixture is ground for approximately 1 hour, or until a fineness of grind of 8 Hegman is obtained. The agitation is reduced and 25.6 grams of ethylene glycol and 1.8 grams of BYK 035 defoamer is added.

A thickener premix is prepared by adding 10.32 grams of water to a mix tank and under agitation, adding 0.25 grams of Thickener E5 and 0.05 grams of 28% aqueous ammonia solution to the tank.

The paint is prepared by adding 581.48 grams of Binder resin B29 to the grind mixture under agitation. After this mixture is agitated for about 30 minutes, the following ingredients are added in order: 21.64 grams of Texanol (Eastman Chemicals), 5.44 grams of Arcosolve DPNB (dipropylene glycol n-butyl ether from Arco Chemicals) and 12.73 grams of Exxate 900 (oxononyl acetate from Exxon). The thickener premix is then added under agitation. Flash X-150 flash rust inhibitor in an amount of 2.6 grams is then added, followed by 1.48 grams of Surfynol 104BC defoamer (Air Products) and 1.48 grams of Byk 307 (wetting agent from BYK-Chemie). Dispersant F9 is then added in an amount of 2.76 grams. The paint is mixed until it is homogeneous and then reduced with 45.5 grams of water to the desired application viscosity.

Examples 1–88 were prepared substantially in accordance with the procedure of Example G. The following criteria were used to evaluate the quality of the coatings 1–88. For evaluation of the coatings for ambient cure chemical coating applications, each coating was applied to Bonderite 100 substrates. Adhesion was evaluated by applying the coatings to treated aluminum, Lexan, ABS, Noryl and Styron substrates. QUV evaluations were conducted on coatings applied to aluminum substrates. Table 7 shows the results of the evaluations of the coatings for ambient cure chemical coating applications. These coatings were compared to commercially available polyurethane coatings, Polane® 700T, a one-component waterborne polyurethane and Polane®HS Plus, a two-component solvent borne polyurethane.

For the evaluation of the coatings for industrial maintenance applications, the coatings were applied to cold rolled steel substrates. Adhesion was evaluated by applying the coatings to weathered aluminum and weathered galvanized steel substrates. Corrosion, humidity, salt spray and 24 hour water soak were evaluated by applying the coatings on biased steel panels. QUV evaluations were conducted on coatings applied to aluminum substrates. Table 8 shows the results of the evaluations of the coatings for industrial maintenance applications. These coatings were compared to commercially available coatings, Polylon® 1900, a two-component solvent borne polyurethane coating, Centurion™, a two-component waterborne polyurethane coating, and Sher-cryl™, an acrylic enamel coating.

For the evauation of the coatings for oven bake applications, the coatings were applied to Bonderite 1000 substrates. Adhesion was evaluated by applying the coatings to weathered aluminum and weathered galvanized steel substrates. QUV evaluations were conducted on coatings applied to aluminum substrates. Table 9 shows the results of the evaluations of the coatings for oven bake applications. These coatings were compared to commercially available coatings Kem Aqua® 1700T and Kem Aqua® 1400, both water reducible enamel coatings.

| Property | Test Method | Measurement |
|---|---|---|
| | AMBIENT CURE | |
| Chemical Resistance | ASTM D3912-80 24 hr. exposure Key Chemicals: 1. Formula 409 2. isopropanol 3. MEK 4. Toluene 5. 10% NaOH 6. 10% sulfuric acid 7. Deep Woods Off Spray 8. Coppertone 30 | rating 1. Total Failure 2. severe Failure 3. slight failure 4. minimal failure 5. no effect |
| Pencil Hardness | ASTM D3363 | Use film breakthrough |
| Salt Spray | ASTM B117 | 200 hours |
| MEK Rubs | | Until substrate shows |
| Gloss | | 60°, 20° |
| Reverse Impact Test | ASTM D2794 | Until film breakage |
| Impact Resistance | ASTM D2794 | Until film breakage |
| QUV | ASTM D4587-91 Method B | 1000 hours |
| Storage Stability | 4 weeks at 120° F. | 4 weeks, check viscosity and settling |
| Adhesion | ASTM D3359 Key substrates: 1. Treated Aluminum 2. Lexan 3. ABS 4. Noryl 5. Styron | Tape adhesion |

-continued

| Property | Test Method | Measurement |
|---|---|---|
| 48 hr. Water Immersion | | Blister, Rust, Tape adhesion |
| | OVEN BAKE | |
| Chemical Resistance | ASTM D3912-80 24 hr. exposure | rating 1. Total Failure 2. severe Failure 3. slight failure 4. minimal failure 5. no effect |
| QUV | ASTM D4587-91 Method B | 1000 hours |
| Pencil Hardness | ASTM D3363 | Use film breakthrough |
| Gloss | | 60°, 20° |
| Corrosion-Weathering | ASTM D5894-96 | 6 cycles |
| Salt Spray | ASTM B117 | 500 hrs. |
| Reverse Impact Test | ASTM D2794 | Until film breakage |
| Impact Resistance | ASTM D2794 | Until film breakage |
| Storage Stability | for 4 weeks at 140° F. | Check Viscosity and Settling |
| Early Blister Resistance | 2, 4, and 6 hrs after application | Blister and Rust |
| Adhesion | ASTM D3359 Key Substrates: 1. Weathered Aluminum 2. Weathered Hotdipped Galvanized | Tape Adhesion |

TABLE 7

AMBIENT CURE

| Formula | Resin | Dispersant | Dispersant amount | Thickener | Film build | 20 gloss | 60 gloss | Chemical Resistance ||||||||
|---|---|---|---|---|---|---|---|---|---|---|---|---|---|---|---|
| | | | | | | | | Coppertone | Toluene | IPA | MEK | DWO | 10% Sulf | 10% NaOH | F409 |
| 001 | 3 | 2 | 1 | 3 | 1.76 | 5.9 | 29.4 | 1 | 3 | 3 | 3 | 2 | 5 | 3 | 5 |
| 002 | 3 | 8 | 1 | 5 | 1.95 | 23.5 | 58.6 | 3 | 3 | 2 | 2 | 2 | 3 | 3 | 5 |
| 003 | 3 | 7 | 1 | 5 | 2.01 | 30.3 | 64.6 | 5 | 3 | 3 | 5 | 2.5 | 4 | 3 | 5 |
| 004 | 3 | 2 | 1 | 6 | 2.24 | 4.3 | 24.8 | 4 | 3 | 3 | 3 | 2.5 | 5 | 3 | 5 |
| 005 | 3 | 11 | 1 | 7 | 1.95 | 26.4 | 61.9 | 5 | 2 | 2 | 2 | 2 | 4 | 2 | 5 |
| 006 | 3 | 3 | 1 | 7 | 1.71 | 16.5 | 51.3 | 5 | 2 | 3 | 3 | 2 | 4.5 | 3 | 5 |
| 007 | 4 | 1 | 2 | 7 | 2.03 | 34.3 | 67.8 | 5 | 4 | 5 | 5 | 3.75 | 5 | 4 | 5 |
| 008 | 4 | 5 | 2 | 5 | 1.77 | 33.4 | 67.9 | 4.5 | 3 | 5 | 5 | 3.5 | 5 | 4 | 5 |
| 009 | 4 | 3 | 2 | 3 | 1.82 | 31.5 | 65.0 | 5 | 3 | 4 | 4 | 3.75 | 5 | 3 | 3.5 |
| 010 | 4 | 10 | 2 | 2 | 2.04 | 13.3 | 48.0 | 5 | 3 | 5 | 3 | 2.5 | 5 | 4 | 4 |
| 011 | 4 | 10 | 2 | 2 | 1.78 | 7.1 | 35.5 | 4 | 3.5 | 5 | 4 | 3.5 | 5 | 4 | 5 |
| 012 | 4 | 3 | 2 | 7 | 1.74 | 20.8 | 56.6 | 4 | 3 | 4.5 | 3 | 2 | 5 | 4 | 5 |
| 013 | 4 | 8 | 2 | 7 | 1.89 | 11.7 | 43.0 | 4 | 3 | 5 | 3 | 2 | 5 | 4 | 5 |
| 014 | 4 | 11 | 2 | 8 | 2.01 | 28.1 | 64.5 | 4 | 3.5 | 4 | 3.5 | 2 | 5 | 3 | 5 |
| 015 | 4 | 1 | 1 | 2 | 1.8 | 30.7 | 64.8 | 4.5 | 3.5 | 5 | 3 | 2 | 5 | 3.5 | 4 |
| 016 | 4 | 5 | 1 | 3 | 1.56 | 37.9 | 68.7 | 5 | 3 | 5 | 3 | 2 | 4 | 3 | 5 |
| 017 | 4 | 1 | 1 | 8 | 1.84 | 21.4 | 57.8 | 4.5 | 3.5 | 5 | 3.5 | 2 | 5 | 3 | 5 |
| 018 | 4 | 2 | 1 | 4 | 1.69 | 33.5 | 66.9 | 4.5 | 3 | 5 | 5 | 2 | 5 | 3 | 5 |
| 019 | 4 | 7 | 1 | 1 | 1.73 | 13.4 | 46.3 | 5 | 3 | 4 | 3.5 | 2 | 5 | 4.5 | 5 |
| 020 | 4 | 11 | 1 | 4 | 1.76 | 31.4 | 66.0 | 4 | 3 | 3 | 3 | 2 | 1 | 3.5 | 5 |
| 021 | 4 | 3 | 1 | 6 | 1.8 | 33.1 | 67.4 | 5 | 3 | 4 | 4 | 2 | 5 | 3.5 | 5 |
| 022 | 4 | 11 | 1 | 2 | 1.78 | 30.0 | 65.2 | 5 | 3 | 5 | 5 | 2 | 5 | 4 | 5 |
| 023 | 4 | 3 | 1 | 7 | 2.06 | 39.1 | 69.1 | 5 | 3.5 | 5 | 3 | 2 | 4 | 5 | 5 |
| 031 | 2 | 2 | 2 | 1 | 1.98 | 22.4 | 56.7 | 5 | 2 | 3 | 2 | 2 | 4 | 3 | 4 |
| 032 | 2 | 3 | 2 | 6 | 1.82 | 37.4 | 67.9 | 4.5 | 2 | 3 | 2 | 2 | 4 | 2 | 3 |
| 033 | 2 | 4 | 2 | 8 | 1.99 | 13.0 | 44.8 | 4.5 | 2 | 2.5 | 2 | 2 | 3 | 2 | 5 |

TABLE 7-continued

AMBIENT CURE

| | | | | | | | | | | | | | | | |
|---|---|---|---|---|---|---|---|---|---|---|---|---|---|---|---|
| 034 | 2 | 1 | 1 | 7 | 1.88 | 25.2 | 59.9 | 5 | 2 | 3 | 2 | 2 | 4.5 | 2 | 4.5 |
| 035 | 2 | 1 | 1 | 5 | 1.91 | 15.6 | 48.9 | 4 | 2 | 3 | 2 | 2 | 5 | 2.5 | 4.5 |
| 036 | 2 | 3 | 1 | 4 | 2.09 | 16.1 | 50.2 | 4 | 2 | 3 | 2 | 2 | 4 | 2.5 | 5 |
| 037 | 2 | 8 | 1 | 4 | 2.06 | 15.4 | 48.5 | 4 | 1 | 3 | 1 | 2 | 4.5 | 2 | 4 |
| 038 | 2 | 11 | 1 | 2 | 1.98 | 34.5 | 67.1 | 4 | 2 | 2 | 2 | 2 | 5 | 2 | 3 |
| 039 | 2 | 2 | 1 | 8 | 1.85 | 24.2 | 58.7 | 4 | 2 | 3 | 2 | 2 | 3 | 2 | 4.5 |
| 040 | 2 | 7 | 1 | 8 | 1.72 | 27.2 | 62.3 | 4.5 | 2 | 2 | 2 | 2 | 5 | 2 | 4 |
| 041 | 2 | 7 | 1 | 6 | 2.16 | 23.6 | 58.7 | 4 | 2 | 3 | 2 | 2 | 5 | 2 | 4.5 |
| 042 | 3 | 1 | 2 | 4 | 1.78 | 23.5 | 59.2 | 4 | 2 | 2 | 2 | 2 | 2 | 2 | 4 |
| 043 | 3 | 1 | 2 | 1 | 1.52 | 19.6 | 54.2 | 4 | 2 | 3 | 2 | 2 | 5 | 2 | 5 |
| 044 | 3 | 1 | 2 | 7 | 1.72 | 9.1 | 38.4 | 4 | 2 | 2 | 2 | 2 | 4 | 3 | 4.5 |
| 045 | 3 | 5 | 2 | 8 | 1.50 | 26.3 | 62.0 | 4 | 2 | 2 | 2 | 2 | 3 | 2 | 4.5 |
| 046 | 3 | 8 | 2 | 3 | 1.45 | 7.2 | 32.5 | 4.5 | 2 | 3 | 2 | 2 | 5 | 2 | 5 |
| 047 | 3 | 7 | 2 | 1 | 1.74 | 28.0 | 62.5 | 4 | 2 | 3 | 2 | 2 | 5 | 2 | 4 |
| 048 | 3 | 11 | 2 | 3 | 1.70 | 25.6 | 61.0 | 4 | 2 | 3 | 3 | 2 | 4 | 2 | 5 |
| 049 | 3 | 8 | 2 | 6 | 1.64 | 26.8 | 63.6 | 4.5 | 2 | 3 | 2 | 2 | 3 | 2 | 5 |
| 050 | 3 | 3 | 2 | 5 | 1.75 | 15.5 | 49.9 | 4 | 2 | 2 | 2 | 2 | 5 | 2 | 5 |
| 051 | 3 | 5 | 1 | 4 | 2.30 | 29.1 | 63.6 | 4 | 2 | 5 | 2 | 2 | 5 | 2 | 5 |
| 052 | 3 | 9 | 1 | 1 | 2.18 | 25.2 | 59.4 | 5 | 2 | 2.5 | 2 | 2 | 4 | 2 | 5 |
| 053 | 3 | 9 | 1 | 2 | 2.34 | 22.6 | 57.9 | 4 | 2 | 3 | 2 | 2 | 5 | 3 | 5 |
| 054 | 2 | 8 | 1 | 4 | 3.53 | 15.0 | 48.9 | 5 | 3 | 3 | 2 | 2.5 | 5 | 3 | 5 |
| 055 | 3 | 8 | 2 | 4 | 1.77 | 8.6 | 35.8 | 4 | 3 | 3 | 3 | 1 | 5 | 5 | 5 |
| 067 | 1 | 5 | 2 | 3 | 1.64 | 27.7 | 65.0 | 5 | 5 | 5 | 5 | 2.5 | 3 | 2 | 5 |
| 068 | 1 | 1 | 2 | 6 | 1.60 | 36.5 | 70.8 | 3 | 3 | 4 | 4 | 2.5 | 2 | 2 | 4 |
| 069 | 1 | 8 | 2 | 2 | 1.61 | 37.8 | 71.3 | 4 | 4 | 5 | 3 | 3.5 | 3 | 2 | 5 |
| 070 | 1 | 3 | 2 | 2 | 1.68 | 34.7 | 69.8 | 4.5 | 3.5 | 5 | 3.5 | 3 | 2 | 2 | 5 |
| 071 | 1 | 3 | 2 | 2 | 1.64 | 32.2 | 87.5 | 4 | 4 | 5 | 3 | 2 | 3 | 2 | 3 |
| 072 | 1 | 11 | 2 | 5 | 1.48 | 36.4 | 69.8 | 4.5 | 5 | 5 | 5 | 2.5 | 3 | 2 | 5 |
| 073 | 1 | 7 | 2 | 6 | 1.58 | 32.7 | 69.3 | 5 | 4 | 5 | 5 | 2 | 3 | 2 | 5 |
| 074 | 1 | 2 | 2 | 5 | 1.76 | 33.0 | 67.8 | 4.5 | 4 | 5 | 3 | 2 | 2 | 3 | 4 |
| 075 | 1 | 5 | 1 | 2 | 2.10 | 30.6 | 67.1 | 5 | 3 | 5 | 5 | 2 | 3 | 2 | 5 |
| 076 | 1 | 6 | 1 | 1 | 2.03 | 21.9 | 59.2 | 5 | 3 | 5 | 3 | 2 | 3 | 2 | 4.5 |
| 077 | 1 | 9 | 1 | 5 | 2.00 | 30.8 | 66.5 | 4.5 | 3.5 | 4 | 3 | 2 | 3 | 2 | 4.5 |
| 078 | 1 | 9 | 1 | 4 | 1.62 | 28.0 | 65.8 | 4.5 | 3 | 4.5 | 3 | 2 | 3 | 2 | 5 |
| 079 | 1 | 2 | 1 | 1 | 1.89 | 28.4 | 62.9 | 4 | 3.5 | 4 | 4 | 2 | 3 | 2 | 5 |
| 080 | 1 | 3 | 1 | 8 | 1.93 | 32.4 | 67.7 | 5 | 3.5 | 3 | 3 | 2 | 3 | 1 | 5 |
| 081 | 1 | 7 | 1 | 3 | 1.88 | 32.4 | 67.0 | 4 | 3.5 | 4.5 | 3 | 2 | 4 | 2 | 5 |
| 082 | 1 | 10 | 1 | 1 | 1.82 | 27.8 | 62.5 | 4.5 | 2 | 5 | 2 | 2.5 | 4 | 2 | 5 |
| 083 | 1 | 9 | 1 | 5 | 1.56 | 34.6 | 68.8 | 4.5 | 3 | 4 | 3 | 2.5 | 3 | 2 | 3 |
| 084 | 1 | 3 | 1 | 6 | 2.06 | 35.4 | 69.0 | 5 | 3 | 4.5 | 3 | 2 | 3 | 2 | 5 |
| 085 | 2 | 1 | 2 | 3 | 1.70 | 30.9 | 64.6 | 5 | 2 | 3 | 2 | 2.5 | 3.5 | 2 | 4 |
| 086 | 2 | 5 | 2 | 7 | 1.38 | 24.0 | 60.2 | 5 | 2 | 2 | 2 | 2 | 5 | 2 | 2 |
| 087 | 2 | 5 | 2 | 7 | 1.67 | 33.8 | 66.5 | 4 | 2 | 3 | 2 | 2 | 5 | 2 | 3 |
| 088 | 2 | 8 | 2 | 4 | 1.90 | 17.8 | 53.6 | 4 | 2 | 3 | 2 | 2 | 4 | 2 | 3 |
| 700T | | | | | 2.08 | 2.5 | 29.5 | 2.5 | 2 | 3 | 4.5 | 1 | 3.5 | 2.5 | 2 |
| HS+ | | | | | 1.96 | 89.8 | 90.1 | 4 | 5 | 5 | 5 | 4 | 5 | 5 | 5 |

| | | Humidity 200 hours | | | | | Salt Spray-100 Hours | | | | Salt Spray-200 hours | | | |
|---|---|---|---|---|---|---|---|---|---|---|---|---|---|---|
| Formula | Pencil Hardness | Blister size | Blister density | Rust | Flash rust- Y or N | Gloss | % change gloss | Blister size | Blister density | Rust | Scribe | Blister size | Blister density | Rust | Scribe |
| 001 | 4 | 8 | 4 | 8 | no | 23.8 | −19.05% | 2 | 2 | 6 | 9 | 2 | 2 | 6 | 9 |
| 002 | 4 | 8 | 3 | 6 | yes | 46.2 | −21.16% | 2 | 1 | 5 | 9 | 2 | 1 | 5 | 9 |
| 003 | 5 | 8 | 2 | 4 | yes | 42.7 | −33.90% | 2 | 2 | 5 | 9 | 2 | 2 | 5 | 9 |
| 004 | 4 | 8 | 4 | 10 | no | 24.4 | −1.61% | 2 | 2 | 7 | 9 | 2 | 2 | 7 | 9 |
| 005 | 4 | 8 | 4 | 7 | no | 54.4 | −12.12% | 2 | 2 | 5 | 9 | 2 | 2 | 5 | 9 |
| 006 | 3 | 6 | 4 | 7 | no | 42.3 | −17.54% | 2 | 2 | 6 | 9 | 2 | 2 | 6 | 9 |
| 007 | 4 | 8 | 1 | 5 | yes | 16 | −78.40% | 2 | 2 | 7 | 9 | 2 | 2 | 7 | 9 |
| 008 | 6 | 4 | 1 | 6 | yes | 16.8 | −75.26% | 2 | 3 | 8 | 5 | 2 | 3 | 8 | 5 |
| 009 | 5 | 6 | 1 | 6 | yes | 15.4 | −76.31% | 2 | 3 | 7 | 6 | | | | |
| 010 | 5 | 8 | 1 | 6 | yes | 16.7 | −85.21% | 2 | 3 | 8 | 9 | 2 | 3 | 8 | 9 |
| 011 | 5 | 8 | 1 | 6 | yes | 11.7 | −67.04% | 2 | 4 | 9 | 4 | 2 | 4 | 9 | 4 |
| 012 | 5 | 6 | 1 | 8 | yes | 15.2 | −73.14% | 2 | 3 | 7 | 6 | 2 | 3 | 7 | 6 |
| 013 | 4 | 8 | 1 | 7 | yes | 21.3 | −50.47% | 2 | 4 | 9 | 6 | 2 | 4 | 9 | 6 |
| 014 | 5 | 6 | 1 | 7 | yes | 16.1 | −75.04% | 2 | 3 | 8 | 6 | 2 | 2 | 8 | 6 |
| 015 | 4 | 6 | 1 | 8 | yes | 17.8 | −72.53% | 2 | 3 | 8 | 7 | 2 | 3 | 8 | 7 |
| 016 | 5 | 4 | 2 | 7 | yes | 18.9 | −72.49% | 4 | 3 | 7 | 6 | 4 | 3 | 7 | 6 |
| 017 | 6 | 8 | 1 | 6 | yes | 29.4 | −49.13% | 4 | 3 | 8 | 6 | 4 | 3 | 8 | 6 |
| 018 | 4 | 8 | 1 | 8 | yes | 27 | −59.64% | 4 | 4 | 9 | 7 | 4 | 4 | 9 | 7 |
| 019 | 4 | 8 | 1 | 7 | yes | 17.5 | −62.20% | 4 | 3 | 7 | 6 | 4 | 3 | 7 | 6 |
| 020 | 5 | 6 | 1 | 8 | yes | 16 | −75.78% | 4 | 3 | 7 | 7 | 4 | 3 | 7 | 7 |
| 021 | 4 | 6 | 1 | 8 | yes | 19.1 | −71.66% | 4 | 3 | 7 | 6 | 4 | 3 | 7 | 6 |
| 022 | 4 | 6 | 1 | 9 | yes | 17.3 | −73.47% | 4 | 4 | 9 | 6 | 4 | 4 | 9 | 6 |
| 023 | 4 | 4 | 4 | 9 | yes | 23.2 | −66.43% | 2 | 3 | 9 | 7 | 2 | 3 | 9 | 7 |
| 031 | 4 | 8 | 2 | 5 | yes | 42.4 | −25.22% | 2 | 1 | 6 | 9 | 2 | 1 | 6 | 9 |
| 032 | 4 | 8 | 2 | 6 | yes | 61.5 | −9.43% | 2 | 1 | 6 | 9 | 2 | 1 | 8 | 9 |

TABLE 7-continued

AMBIENT CURE

| | | | | | | | | | | | | | | | |
|---|---|---|---|---|---|---|---|---|---|---|---|---|---|---|---|
| 033 | 5 | 8 | 3 | 5 | yes | 38 | −15.18% | 2 | 1 | 7 | 9 | 2 | 1 | 7 | 9 |
| 034 | 4 | 6 | 4 | 9 | yes | 49.9 | −16.69% | 2 | 1 | 7 | 9 | 2 | 1 | 7 | 9 |
| 035 | 4 | 8 | 4 | 5 | yes | 43.5 | −11.04% | 2 | 1 | 5 | 9 | 2 | 1 | 5 | 9 |
| 036 | 5 | 8 | 3 | 6 | yes | 42.6 | −15.14% | 2 | 1 | 5 | 9 | 2 | 1 | 6 | 9 |
| 037 | 4 | 8 | 3 | 6 | yes | 38.4 | −20.82% | 2 | 1 | 4 | 9 | 2 | 1 | 4 | 9 |
| 038 | 4 | 6 | 2 | 7 | no | 49.6 | −26.08% | 2 | 2 | 6 | 9 | 2 | 2 | 6 | 9 |
| 039 | 4 | 8 | 2 | 8 | no | 39.5 | −32.71% | 2 | 2 | 8 | 9 | 2 | 2 | 8 | 9 |
| 040 | 5 | 8 | 3 | 5 | yes | 49 | −21.35% | 2 | 2 | 7 | 9 | 2 | 2 | 7 | 9 |
| 041 | 4 | 8 | 3 | 7 | yes | 47.3 | −19.42% | 2 | 1 | 7 | 9 | 2 | 2 | 7 | 9 |
| 042 | 4 | 8 | 4 | 9 | yes | 51.4 | −13.18% | 2 | 1 | 6 | 9 | 2 | 1 | 6 | 9 |
| 043 | 4 | 8 | 4 | 8 | no | 46.2 | −14.76% | 2 | 1 | 6 | 9 | 2 | 1 | 6 | 9 |
| 044 | 5 | 8 | 4 | 9 | no | 35.2 | −8.33% | 2 | 1 | 6 | 9 | 2 | 1 | 6 | 9 |
| 045 | 4 | 8 | 4 | 7 | yes | 45.6 | −26.45% | 2 | 1 | 6 | 7 | 2 | 1 | 6 | 7 |
| 046 | 2 | 8 | 3 | 7 | no | 25.7 | −20.92% | 2 | 1 | 6 | 9 | 2 | 1 | 6 | 9 |
| 047 | 5 | 8 | 2 | 9 | no | 43.7 | #REFI | 4 | 2 | 6 | 9 | 4 | 2 | 6 | 9 |
| 048 | 5 | 8 | 4 | 8 | yes | 40.1 | −35.84% | 4 | 1 | 6 | 9 | 4 | 1 | 6 | 9 |
| 049 | 4 | 8 | 4 | 9 | yes | 48.4 | −20.66% | 4 | 2 | 6 | 9 | 4 | 2 | 6 | 9 |
| 050 | 5 | 8 | 4 | 9 | no | 39.5 | −20.84% | 2 | 2 | 6 | 9 | 2 | 2 | 6 | 9 |
| 051 | 4 | 8 | 3 | 9 | yes | 44.4 | −30.19% | 2 | 2 | 8 | 9 | 2 | 2 | 8 | 9 |
| 052 | 4 | 8 | 3 | 9 | yes | 44.8 | −24.58% | 2 | 2 | 6 | 7 | 2 | 2 | 6 | 7 |
| 053 | 4 | 8 | 4 | 8 | yes | 51.1 | −11.74% | 4 | 3 | 1 | 9 | 4 | 3 | 8 | 9 |
| 054 | 4 | 8 | 4 | 7 | yes | 41.1 | −15.95% | 2 | 1 | 6 | 9 | 2 | 1 | 6 | 9 |
| 055 | 4 | 8 | 4 | 6 | no | 31.3 | −12.57% | 4 | 1 | 2 | 9 | 4 | 1 | 2 | 9 |
| 067 | 2 | 8 | 2 | 5 | yes | 27.8 | −57.23% | 6 | 1 | 2 | 9 | 6 | 1 | 2 | 9 |
| 068 | 3 | 8 | 3 | 5 | yes | 29.7 | −58.05% | 4 | 2 | 2 | 9 | 4 | 2 | 2 | 9 |
| 069 | 2 | 8 | 4 | 6 | yes | 22.1 | −69.00% | 6 | 1 | 2 | 9 | 6 | 1 | 2 | 9 |
| 070 | 2 | 8 | 3 | 4 | yes | 26.6 | −61.60% | 4 | 2 | 3 | 9 | 4 | 2 | 3 | 9 |
| 071 | 4 | 8 | 3 | 4 | yes | 28.3 | −58.07% | 4 | 1 | 3 | 9 | 4 | 1 | 3 | 9 |
| 072 | 4 | 8 | 3 | 4 | yes | 30 | −57.02% | 6 | 1 | 8 | 9 | 6 | 1 | 8 | 9 |
| 073 | 4 | 8 | 2 | 5 | yes | 29.4 | −57.58% | 4 | 2 | 7 | 9 | 4 | 2 | 7 | 9 |
| 074 | 4 | 8 | 3 | 7 | no | 33.8 | −50.15% | 4 | 2 | 7 | 9 | 4 | 2 | 7 | 9 |
| 075 | 4 | 8 | 2 | 6 | yes | 25 | −62.74% | 4 | 1 | 6 | 9 | 4 | 1 | 6 | 9 |
| 076 | 2 | 8 | 2 | 6 | yes | 27.5 | −53.55% | 4 | 2 | 6 | 9 | 4 | 2 | 6 | 9 |
| 077 | 2 | 8 | 3 | 8 | yes | 28.4 | −57.29% | 4 | 2 | 7 | 9 | 4 | 2 | 7 | 9 |
| 078 | 4 | 8 | 3 | 7 | yes | 28.3 | −56.99% | 4 | 1 | 8 | 7 | 4 | 1 | 8 | 7 |
| 079 | 4 | 8 | 4 | 7 | yes | 20.9 | −86.77% | 6 | 2 | 8 | 8 | 6 | 2 | 8 | 8 |
| 080 | 3 | 8 | 3 | 6 | yes | 18.6 | −72.53% | 4 | 2 | 7 | 9 | 4 | 2 | 7 | 9 |
| 081 | 3 | 8 | 4 | 8 | yes | 37.1 | −44.63% | 6 | 2 | 8 | 9 | 6 | 2 | 8 | 9 |
| 082 | 4 | 8 | 2 | 8 | yes | 24.2 | −61.28% | 2 | 2 | 8 | 7 | 2 | 2 | 8 | 7 |
| 083 | 3 | 8 | 3 | 7 | yes | 25.1 | −63.52% | 4 | 1 | 7 | 7 | 4 | 1 | 7 | 7 |
| 084 | 2 | 8 | 3 | 6 | yes | 18.8 | −75.65% | 4 | 2 | 7 | 9 | 4 | 2 | 7 | 9 |
| 085 | 4 | 6 | 3 | 5 | yes | 50.8 | −21.36% | 2 | 1 | 2 | 9 | 2 | 1 | 2 | 9 |
| 086 | 4 | 6 | 3 | 5 | yes | 47.6 | −20.93% | 2 | 1 | 6 | 9 | 2 | 1 | 2 | 9 |
| 087 | 3 | 8 | 2 | 7 | yes | 49.7 | −25.26% | 2 | 1 | 6 | 9 | 2 | 1 | 6 | 9 |
| 088 | 3 | 8 | 2 | 5 | yes | 44 | −17.91% | 2 | 1 | 6 | 9 | 2 | 1 | 6 | 9 |
| 700T | 6 | none | none | none | no | 36.6 | 24.07% | 6 | 3 | 7 | 6 | 6 | 3 | 7 | 6 |
| HS+ | 6 | none | none | none | no | 68.5 | −23.97% | 10 | 5 | 10 | 9 | 10 | 5 | 10 | 9 |

| | Impact | | | Adhesion | | | | | 48 Hr. Water Soak | | | |
|---|---|---|---|---|---|---|---|---|---|---|---|---|
| Formula | Forward | Reverse | MEK rubs | Treated aluminum | Noryl | ABS | Lexan | Styron | Blister size | Blister density | Rust | Adhesion |
| 001 | 36 | 4 | 132 | 3 | 0 | 0 | 1 | 0 | 10 | 5 | 10 | 4 |
| 002 | 40 | 4 | 50 | 4 | 0 | 0 | 2 | 1 | 6 | 4 | 10 | 3 |
| 003 | 44 | 8 | 100 | 3 | −1 | 0 | 1 | −1 | 8 | 3 | 10 | 3 |
| 004 | 40 | 4 | 50 | 3 | 0 | 3 | 3 | 2 | 10 | 5 | 10 | 4 |
| 005 | 40 | 8 | 50 | 3 | −1 | 0 | 0 | −1 | 10 | 5 | 10 | 4 |
| 006 | 40 | 8 | 150 | 3 | −1 | 1 | 0 | 0 | 10 | 5 | 10 | 4 |
| 007 | >168 | >168 | 150 | 3 | −1 | 0 | 0 | −1 | 4 | 3 | 3 | 0 |
| 008 | >168 | >168 | 750 | 3 | −1 | 0 | 0 | −1 | 6 | 2 | 3 | 1 |
| 009 | 140 | >168 | 400 | 4 | −1 | 0 | 0 | −1 | 6 | 1 | 1 | 0 |
| 010 | >168 | >168 | 46 | 4 | −1 | 0 | 0 | −1 | 6 | 4 | 10 | 4 |
| 011 | >168 | >168 | 49 | 4 | −1 | 0 | 0 | −1 | 10 | 5 | 10 | 5 |
| 012 | >168 | >168 | 1000 | 2 | 0 | 0 | 0 | 0 | 8 | 1 | 4 | 3 |
| 013 | >168 | >168 | 40 | 5 | −1 | 0 | 0 | −1 | 10 | 5 | 10 | 4 |
| 014 | >168 | >168 | 46 | 5 | −1 | 0 | 0 | −1 | 8 | 2 | 9 | 4 |
| 015 | >168 | >168 | 45 | 4 | −1 | −1 | 0 | 0 | 8 | 1 | 8 | 2 |
| 016 | >168 | >168 | 50 | 2 | 0 | 0 | 0 | −1 | 8 | 1 | 10 | 3 |
| 017 | >168 | >168 | 187 | 3 | −1 | 0 | 0 | −1 | 8 | 3 | 10 | 3 |
| 018 | >168 | >168 | 45 | 3 | −1 | 0 | 0 | −1 | 8 | 2 | 6 | 3 |
| 019 | >168 | >168 | 47 | 3 | −1 | 0 | 0 | −1 | 8 | 2 | 10 | 4 |
| 020 | >168 | >168 | 500 | 4 | −1 | 0 | 0 | −1 | 8 | 1 | 10 | 3 |
| 021 | >168 | >168 | 750 | 3 | −1 | 0 | 0 | −1 | 8 | 1 | 10 | 3 |
| 022 | >168 | >168 | 150 | 3 | −1 | 0 | 0 | −1 | 8 | 2 | 10 | 3 |
| 023 | >168 | >168 | 150 | 3 | −1 | 2 | 0 | −1 | 8 | 1 | 4 | 1 |
| 031 | 36 | <4 | 200 | 3 | −1 | 0 | 3 | 2 | 8 | 1 | 10 | 1 |
| 032 | 36 | <4 | 50 | 3 | 0 | 0 | 2 | 0 | 6 | 2 | 3 | 0 |

TABLE 7-continued

| AMBIENT CURE | | | | | | | | | | | | | |
|---|---|---|---|---|---|---|---|---|---|---|---|---|---|
| 033 | 32 | <4 | 400 | 4 | 0 | 0 | 0 | 3 | 8 | 1 | 3 | 0 | |
| 034 | 32 | <4 | 29 | 3 | −1 | 0 | 1 | 1 | 6 | 2 | 10 | 1 | |
| 035 | 36 | <4 | 130 | 4 | −1 | 3 | −1 | 3 | 8 | 1 | 10 | 0 | |
| 036 | 32 | <4 | 100 | 3 | −1 | 0 | 0 | 3 | 6 | 3 | 10 | 1 | |
| 037 | 32 | <4 | 46 | 4 | −1 | 0 | 0 | 0 | 6 | 4 | 10 | 1 | |
| 038 | 36 | 8 | 300 | 4 | −1 | −1 | 0 | 0 | 6 | 2 | 10 | 1 | |
| 039 | 40 | 4 | 650 | 3 | 0 | 0 | 0 | 0 | 6 | 3 | 10 | 2 | |
| 040 | 32 | <4 | 42 | 3 | −1 | 0 | 0 | 2 | 8 | 1 | 10 | 1 | |
| 041 | 32 | <4 | 38 | 4 | 0 | 0 | 2 | 0 | 8 | 1 | 10 | 1 | |
| 042 | 56 | 8 | 75 | 4 | −1 | 0 | 0 | 0 | 6 | 1 | 10 | 0 | |
| 043 | 40 | 4 | 45 | 4 | −1 | 0 | 0 | 0 | 10 | 5 | 10 | 2 | |
| 044 | 40 | 4 | 150 | 4 | 0 | 0 | 1 | −1 | 8 | 4 | 10 | 4 | |
| 045 | 40 | 8 | 48 | 4 | 1 | 0 | 0 | −1 | 8 | 2 | 10 | 3 | |
| 046 | 28 | <4 | 50 | 3 | 0 | 0 | 0 | −1 | 8 | 1 | 10 | 3 | |
| 047 | 40 | 8 | 39 | 3 | −1 | 0 | 0 | −1 | 8 | 3 | 10 | 3 | |
| 048 | 44 | 8 | 146 | 3 | 0 | 0 | 0 | 2 | 8 | 3 | 10 | 3 | |
| 049 | 92 | 40 | 100 | 4 | 0 | 0 | 3 | 0 | 8 | 1 | 10 | 0 | |
| 050 | 76 | 12 | 300 | 3 | 0 | 0 | 2 | 0 | 8 | 1 | 10 | 2 | |
| 051 | 56 | 6 | 48 | 3 | 0 | 0 | 0 | 0 | 6 | 3 | 10 | 3 | |
| 052 | 36 | 8 | 42 | 3 | −1 | −1 | 0 | −1 | 6 | 3 | 10 | 3 | |
| 053 | 36 | 4 | 200 | 3 | −1 | 0 | 0 | 0 | 10 | 5 | 10 | 3 | |
| 054 | 44 | 4 | 200 | 3 | 1 | 0 | 2 | 1 | 8 | 2 | 9 | 3 | |
| 055 | 36 | 4 | 150 | 3 | 0 | 0 | 3 | 1 | 8 | 2 | 10 | 3 | |
| 067 | 56 | 12 | 800 | 3 | 0 | 0 | 0 | 3 | 10 | 5 | 10 | 4 | |
| 068 | 64 | 20 | 100 | 3 | 2 | 0 | 0 | 2 | 10 | 5 | 10 | 4 | |
| 069 | 84 | 20 | 800 | 3 | 4 | −1 | 2 | 3 | 10 | 5 | 10 | 5 | |
| 070 | 56 | 12 | 200 | 3 | 2 | 0 | 2 | 2 | 10 | 5 | 10 | 3 | |
| 071 | 68 | 16 | 100 | 3 | 5 | 0 | 0 | 4 | 10 | 5 | 10 | 3 | |
| 072 | 52 | 8 | 1000 | 3 | 4 | 0 | −1 | 4 | 10 | 5 | 10 | 3 | |
| 073 | 60 | 8 | 250 | 3 | 2 | 0 | 0 | 3 | 10 | 5 | 10 | 4 | |
| 074 | 64 | 4 | 300 | 3 | 3 | 0 | 0 | −1 | 10 | 5 | 10 | 4 | |
| 075 | 56 | 8 | 43 | 3 | 0 | 0 | 0 | −1 | 10 | 5 | 10 | 4 | |
| 076 | 56 | 4 | 50 | 3 | 0 | 0 | 3 | 4 | 10 | 5 | 10 | 4 | |
| 077 | 56 | 8 | 700 | 3 | 0 | 0 | 0 | 3 | 10 | 5 | 10 | 3 | |
| 078 | 60 | 12 | 100 | 3 | 0 | 0 | 2 | 4 | 10 | 5 | 10 | 3 | |
| 079 | 52 | 8 | 100 | 3 | 0 | 0 | −1 | 3 | 10 | 5 | 10 | 3 | |
| 080 | 56 | 4 | 1000 | 3 | 3 | 0 | 0 | 3 | 10 | 5 | 10 | 3 | |
| 081 | 52 | 8 | 350 | 3 | 0 | 0 | 0 | 2 | 10 | 5 | 10 | 4 | |
| 082 | 60 | 8 | 300 | 3 | 4 | 0 | 0 | 4 | 10 | 5 | 10 | 4 | |
| 083 | 56 | 4 | 1000 | 3 | 0 | 0 | −1 | 3 | 10 | 5 | 10 | 3 | |
| 084 | 60 | 12 | 350 | 3 | 0 | 0 | 0 | 4 | 10 | 5 | 10 | 4 | |
| 085 | 36 | <4 | 37 | 4 | 0 | 0 | 0 | 0 | 6 | 2 | 3 | 1 | |
| 086 | 36 | <4 | 250 | 4 | 0 | 0 | 1 | 2 | 6 | 2 | 1 | 1 | |
| 087 | 32 | 4 | 246 | 3 | −1 | 0 | 0 | 0 | 6 | 1 | 1 | 1 | |
| 088 | 32 | <4 | 100 | 3 | 0 | 0 | −1 | 1 | 4 | 3 | 10 | 0 | |
| 700T | >168 | >168 | 150 | 3 | −1 | 5 | 5 | −1 | 8 | 4 | 10 | 4 | |
| HS+ | 68 | 8 | 1000 | 3 | −1 | 5 | 5 | 5 | 10 | 5 | 10 | 4 | |

| | QUV-500 hours | | | | | | | | | QUV-1000 hrs. | | | | | |
|---|---|---|---|---|---|---|---|---|---|---|---|---|---|---|---|
| | Gloss (60 degree) | | | Delta E | | | Delta b | | | Gloss (60 degree) | | Delta E | | Delta b | |
| | at | | | at | | | at | | | 1000 | | | | | |
| Formula | Initial | 500 hrs | % change | Initial | 500 hrs | change | Initial | 500 hrs | change | hour | % change | Delta E | change | Delta b | change |
| 001 | 32.60 | 21.10 | −35.28 | 0.94 | 3.23 | 2.29 | −0.85 | 1.55 | 2.40 | 17.90 | −45.09 | 2.88 | 1.94 | 1.13 | 1.98 |
| 002 | 58.50 | 40.10 | −29.03 | 2.69 | 5.10 | 2.41 | 0.41 | 2.79 | 2.38 | 37.10 | −34.34 | 5.70 | 3.01 | 2.95 | 2.54 |
| 003 | 65.70 | 50.70 | −22.83 | 1.81 | 2.72 | 0.91 | 0.79 | 1.42 | 0.63 | 46.20 | −26.64 | 3.02 | 1.21 | 1.25 | 0.46 |
| 004 | 49.60 | 29.80 | −39.92 | 1.17 | 2.66 | 1.49 | −1.00 | 1.36 | 2.36 | 26.50 | −46.57 | 2.66 | 1.49 | 0.93 | 1.93 |
| 005 | 61.00 | 47.00 | −22.95 | 2.05 | 3.44 | 1.39 | −0.36 | 1.92 | 2.28 | 45.60 | −25.25 | 4.04 | 1.99 | 1.84 | 2.20 |
| 006 | 51.00 | 35.80 | −29.80 | 1.34 | 3.16 | 1.82 | −0.46 | 1.76 | 2.22 | 32.80 | −35.69 | 3.62 | 2.28 | 1.70 | 2.16 |
| 007 | 69.40 | 33.30 | −52.02 | 1.81 | 2.49 | 0.68 | 0.04 | 1.43 | 1.39 | 21.90 | −68.44 | 4.09 | 2.28 | 2.22 | 2.18 |
| 008 | 70.30 | 30.50 | −56.61 | 1.17 | 1.41 | 0.24 | −0.32 | 0.83 | 1.15 | 21.20 | −69.84 | 2.58 | 1.41 | 1.22 | 1.54 |
| 009 | 68.30 | 21.90 | −67.94 | 1.06 | 1.98 | 0.92 | −0.31 | 1.06 | 1.37 | 15.20 | −77.75 | 2.44 | 1.38 | 1.09 | 1.40 |
| 010 | 52.00 | 13.80 | −73.48 | 1.05 | 3.14 | 2.09 | 0.01 | 1.83 | 1.82 | 9.80 | −81.15 | 4.00 | 2.95 | 2.07 | 2.06 |
| 011 | 40.60 | 10.40 | −74.38 | 0.26 | 3.03 | 2.77 | −0.13 | 1.75 | 1.88 | 7.50 | −81.53 | 3.85 | 3.59 | 1.97 | 2.10 |
| 012 | 59.30 | 16.50 | −72.18 | 0.73 | 1.95 | 1.22 | −0.45 | 0.95 | 1.40 | 12.70 | −78.58 | 2.75 | 2.02 | 1.17 | 1.62 |
| 013 | 46.80 | 15.00 | −67.95 | 1.31 | 2.83 | 1.52 | 0.05 | 1.60 | 1.55 | 12.30 | −73.72 | 3.40 | 2.09 | 1.79 | 1.74 |
| 014 | 69.10 | 19.60 | −71.64 | 1.10 | 2.45 | 1.35 | −0.32 | 1.38 | 1.70 | 15.90 | −76.99 | 3.01 | 1.91 | 1.56 | 1.88 |
| 015 | 66.10 | 18.20 | −72.47 | 1.00 | 2.01 | 1.01 | −0.29 | 1.03 | 1.32 | 15.50 | −76.55 | 2.29 | 1.29 | 1.12 | 1.41 |
| 016 | 70.70 | 19.70 | −72.14 | 1.39 | 1.88 | 0.49 | −0.44 | 0.94 | 1.38 | 18.10 | −74.40 | 2.36 | 0.97 | 1.12 | 1.56 |
| 017 | 59.30 | 14.50 | −75.55 | 0.61 | 1.80 | 1.19 | −0.46 | 0.66 | 1.32 | 12.30 | −79.26 | 2.40 | 1.79 | 0.96 | 1.42 |
| 018 | 69.00 | 19.00 | −72.46 | 0.92 | 2.01 | 1.09 | −0.26 | 1.10 | 1.38 | 15.90 | −76.96 | 2.58 | 1.66 | 1.24 | 1.50 |
| 019 | 49.20 | 12.90 | −73.78 | 0.45 | 2.25 | 1.89 | −0.30 | 1.16 | 1.46 | 10.40 | −78.86 | 2.54 | 2.09 | 1.20 | 1.50 |
| 020 | 68.70 | 21.10 | −69.29 | 1.37 | 2.09 | 0.72 | −0.29 | 1.17 | 1.46 | 16.40 | −76.13 | 2.72 | 1.35 | 1.32 | 1.61 |
| 021 | 70.70 | 22.00 | −68.88 | 1.57 | 2.34 | 0.77 | −0.10 | 1.24 | 1.34 | 14.90 | −78.93 | 2.87 | 1.30 | 1.44 | 1.54 |

TABLE 7-continued

AMBIENT CURE

| | | | | | | | | | | | | | | | |
|---|---|---|---|---|---|---|---|---|---|---|---|---|---|---|---|
| 022 | 67.80 | 21.70 | −67.99 | 1.31 | 2.79 | 1.46 | 0.06 | 1.63 | 1.57 | 16.00 | −76.40 | 3.51 | 2.20 | 1.82 | 1.76 |
| 023 | 71.80 | 22.10 | −69.22 | 1.31 | 1.87 | 0.56 | 0.06 | 0.95 | 0.89 | 23.20 | −67.69 | 2.59 | 1.28 | 1.22 | 1.16 |
| 031 | 57.70 | 37.50 | −35.01 | 1.65 | 1.38 | 0.27 | −0.98 | 0.65 | 1.63 | 35.90 | −37.78 | 1.42 | 0.23 | 0.60 | 1.58 |
| 032 | 68.70 | 47.10 | −31.44 | 1.61 | 0.77 | 0.84 | −1.33 | 0.15 | 1.48 | 54.90 | −20.09 | 0.75 | 0.86 | 0.02 | 1.35 |
| 033 | 47.10 | 29.00 | −38.43 | 1.38 | 2.19 | 0.81 | −0.69 | 1.24 | 2.13 | 26.10 | −44.59 | 1.93 | 0.55 | 1.06 | 1.95 |
| 034 | 60.90 | 44.40 | −27.09 | 1.88 | 1.79 | 0.09 | −0.61 | 0.86 | 1.47 | 47.80 | −21.51 | 2.51 | 0.63 | 1.24 | 1.85 |
| 035 | 52.50 | 36.00 | −31.43 | 1.42 | 0.73 | 0.69 | −1.18 | 0.21 | 1.39 | 36.70 | −30.10 | 1.33 | 0.09 | 0.41 | 1.59 |
| 036 | 53.00 | 40.00 | −24.53 | 1.29 | 1.18 | 0.11 | −0.86 | 0.59 | 1.45 | 39.20 | −26.04 | 1.63 | 0.34 | 0.82 | 1.68 |
| 037 | 51.80 | 41.70 | −19.50 | 1.78 | 2.45 | 0.67 | −0.82 | 1.40 | 2.22 | 43.60 | −15.83 | 2.30 | 0.52 | 1.08 | 1.90 |
| 038 | 66.80 | 57.30 | −14.22 | 1.40 | 1.36 | 0.04 | −0.81 | 0.65 | 1.46 | 58.70 | −12.13 | 1.81 | 0.41 | 0.90 | 1.71 |
| 039 | 60.00 | 48.30 | −19.50 | 1.86 | 1.61 | 0.25 | −0.80 | 0.82 | 1.62 | 50.70 | −15.50 | 1.89 | 0.03 | 0.92 | 1.72 |
| 040 | 63.20 | 47.60 | −24.68 | 1.49 | 1.37 | 0.12 | −1.05 | 0.71 | 1.76 | 49.40 | −21.84 | 1.54 | 0.05 | 0.76 | 1.81 |
| 041 | 60.50 | 43.40 | −28.26 | 1.63 | 1.49 | 0.14 | −0.83 | 0.81 | 1.64 | 44.80 | −25.95 | 2.12 | 0.49 | 1.19 | 2.02 |
| 042 | 60.70 | 40.50 | −33.28 | 1.29 | 1.82 | 0.53 | −0.95 | 0.89 | 1.84 | 40.00 | −34.10 | 2.09 | 0.80 | 0.90 | 1.85 |
| 043 | 55.20 | 36.20 | −34.42 | 1.36 | 2.38 | 1.02 | −0.88 | 1.20 | 2.08 | 31.80 | −42.39 | 2.67 | 1.31 | 1.34 | 2.22 |
| 044 | 41.70 | 23.80 | −42.93 | 1.17 | 2.51 | 1.34 | −1.00 | 1.21 | 2.21 | 20.10 | −51.80 | 3.09 | 1.92 | 1.33 | 2.33 |
| 045 | 63.20 | 46.90 | −25.79 | 1.48 | 1.87 | 0.39 | −1.15 | 0.60 | 1.95 | 43.40 | −31.33 | 1.79 | 0.31 | 0.74 | 1.89 |
| 046 | 38.40 | 25.60 | −33.33 | 1.14 | 2.33 | 1.19 | −1.03 | 1.04 | 2.07 | 25.20 | −34.38 | 2.27 | 1.13 | 0.89 | 1.92 |
| 047 | 63.00 | 48.80 | −22.54 | 1.52 | 1.85 | 0.33 | −1.15 | 0.81 | 1.96 | 49.30 | −21.75 | 1.47 | 0.05 | 0.49 | 1.64 |
| 048 | 61.10 | 42.50 | −30.44 | 1.13 | 2.28 | 1.15 | −1.04 | 1.02 | 2.06 | 40.80 | −33.22 | 2.13 | 1.00 | 0.77 | 1.81 |
| 049 | 64.60 | 45.00 | −30.34 | 1.43 | 2.24 | 0.81 | −1.25 | 0.72 | 1.97 | 42.00 | −34.98 | 1.81 | 0.38 | 0.41 | 1.66 |
| 050 | 51.80 | 30.10 | −41.89 | 1.37 | 2.28 | 0.91 | −1.14 | 0.80 | 1.94 | 28.70 | −44.59 | 2.18 | 0.81 | 0.67 | 1.81 |
| 051 | 61.70 | 44.90 | −27.23 | 1.41 | 2.00 | 0.59 | −1.09 | 0.85 | 1.94 | 45.00 | −27.07 | 1.69 | 0.28 | 0.54 | 1.63 |
| 052 | 58.00 | 42.40 | −26.90 | 1.44 | 2.83 | 1.39 | −0.72 | 1.35 | 2.07 | 43.50 | −25.00 | 2.64 | 1.20 | 1.16 | 1.88 |
| 053 | 58.00 | 40.40 | −30.34 | 1.20 | 2.79 | 1.59 | −0.87 | 1.35 | 2.22 | 39.40 | −32.07 | 2.69 | 1.49 | 1.17 | 2.04 |
| 054 | 48.10 | 30.60 | −36.38 | 1.28 | 2.50 | 1.22 | −1.11 | 1.05 | 2.16 | 29.10 | −39.50 | 2.18 | 0.90 | 0.76 | 1.87 |
| 055 | 37.50 | 27.00 | −28.00 | 0.98 | 3.18 | 2.20 | −0.75 | 1.56 | 2.33 | 25.70 | −31.47 | 3.08 | 2.10 | 1.49 | 2.24 |
| 067 | 67.80 | 39.00 | −42.48 | 1.21 | 0.98 | 0.23 | −1.08 | 0.45 | 1.53 | 26.40 | −61.06 | 1.92 | 0.71 | 0.73 | 1.81 |
| 068 | 72.60 | 42.90 | −40.91 | 1.38 | 1.78 | 0.40 | −0.56 | 0.98 | 1.54 | 36.10 | −50.28 | 2.75 | 1.37 | 1.46 | 2.02 |
| 069 | 73.70 | 43.70 | −40.71 | 1.61 | 1.33 | 0.28 | −0.92 | 0.63 | 1.55 | 42.70 | −42.06 | 2.00 | 0.39 | 1.00 | 1.92 |
| 070 | 73.10 | 40.50 | −44.60 | 1.15 | 1.23 | 0.08 | −0.81 | 0.71 | 1.52 | 30.10 | −58.82 | 2.28 | 1.13 | 1.16 | 1.97 |
| 071 | 70.40 | 34.40 | −51.14 | 1.18 | 1.22 | 0.04 | −0.89 | 0.65 | 1.54 | 32.40 | −53.98 | 2.03 | 0.85 | 1.00 | 1.89 |
| 072 | 72.00 | 39.80 | −44.72 | 1.43 | 0.86 | 0.57 | −1.04 | 0.39 | 1.43 | 33.50 | −53.47 | 1.62 | 0.19 | 0.75 | 1.79 |
| 073 | 70.90 | 33.40 | −52.89 | 1.23 | 0.95 | 0.28 | −1.10 | 0.35 | 1.45 | 34.30 | −51.62 | 1.71 | 0.48 | 0.62 | 1.72 |
| 074 | 71.80 | 35.70 | −50.28 | 1.43 | 1.16 | 0.27 | −0.63 | 0.67 | 1.50 | 29.40 | −59.05 | 1.98 | 0.55 | 0.94 | 1.77 |
| 075 | 69.70 | 35.30 | −49.35 | 1.06 | 1.00 | 0.06 | −0.86 | 0.57 | 1.43 | 36.80 | −47.20 | 1.61 | 0.55 | 0.67 | 1.53 |
| 076 | 59.40 | 37.50 | −36.87 | 1.38 | 1.56 | 0.18 | −0.82 | 0.94 | 1.76 | 43.50 | −26.77 | 2.26 | 0.88 | 1.09 | 1.91 |
| 077 | 70.00 | 34.60 | −50.57 | 1.37 | 1.76 | 0.39 | −0.77 | 0.93 | 1.70 | 30.80 | −56.00 | 2.18 | 0.81 | 1.02 | 1.79 |
| 078 | 69.20 | 33.30 | −51.88 | 1.46 | 1.70 | 0.24 | −0.82 | 0.90 | 1.72 | 30.10 | −56.50 | 2.03 | 0.57 | 1.19 | 2.01 |
| 079 | 68.50 | 33.60 | −49.47 | 1.61 | 1.48 | 0.13 | −0.88 | 0.99 | 1.67 | 31.60 | −52.48 | 2.07 | 0.46 | 1.07 | 1.75 |
| 080 | 69.70 | 33.20 | −52.37 | 1.42 | 1.64 | 0.22 | −0.82 | 0.76 | 1.58 | 32.00 | −54.09 | 1.66 | 0.24 | 0.80 | 1.62 |
| 081 | 69.70 | 33.80 | −51.61 | 1.48 | 1.46 | 0.02 | −0.90 | 0.78 | 1.68 | 32.10 | −53.95 | 1.97 | 0.49 | 1.02 | 1.92 |
| 082 | 64.90 | 30.20 | −53.47 | 1.43 | 1.81 | 0.38 | −0.95 | 0.92 | 1.87 | 29.10 | −55.16 | 2.34 | 0.91 | 1.27 | 2.22 |
| 083 | 72.10 | 32.40 | −55.06 | 1.33 | 1.67 | 0.34 | −0.77 | 0.90 | 1.67 | 26.20 | −63.66 | 1.86 | 0.53 | 0.92 | 1.69 |
| 084 | 72.40 | 33.10 | −54.26 | 1.57 | 2.02 | 0.45 | −0.70 | 1.00 | 1.70 | 32.70 | −54.83 | 2.26 | 0.69 | 1.20 | 1.90 |
| 085 | 64.90 | 40.30 | −37.90 | 1.61 | 0.92 | 0.69 | −1.11 | 0.34 | 1.45 | 45.30 | −30.20 | 0.86 | 0.75 | 0.32 | 1.43 |
| 086 | 62.20 | 37.30 | −40.03 | 1.55 | 1.08 | 0.47 | −1.24 | 0.43 | 1.67 | 37.10 | −40.35 | 0.99 | 0.56 | 0.28 | 1.52 |
| 087 | 68.60 | 40.40 | −39.34 | 1.51 | 0.66 | 0.85 | −1.26 | 0.19 | 1.45 | 40.70 | −38.89 | 0.83 | 0.68 | 0.21 | 1.47 |
| 088 | 54.40 | 35.50 | −34.74 | 1.54 | 0.87 | 0.67 | −1.12 | 0.36 | 1.48 | 36.50 | −32.90 | 1.21 | 0.33 | −0.46 | 0.66 |
| 700T | 31.80 | 13.30 | −58.18 | 0.14 | 0.45 | 0.31 | 0.11 | −0.41 | −0.52 | 11.20 | −64.78 | 0.52 | 0.38 | −0.10 | −0.21 |
| HS+ | 86.50 | 69.80 | −19.31 | 3.04 | 4.02 | 0.98 | 3.89 | 2.53 | −1.36 | 82.90 | −4.16 | 4.11 | 1.07 | 2.59 | −1.30 |

| Viscosity, settling, and pH Stability (4 weeks at 120° F.) | | | | | | | | | | |
|---|---|---|---|---|---|---|---|---|---|---|
| Formula | Initial KU | final KU | % change | Initial ICI | final ICI | % change | Initial pH | final pH | % change | settling amount settling type |
| 001 | 96 | gelled | | 1.6 | gelled | | 9.58 | n/a | | n/a |
| 002 | 140 | gelled | | 1.18 | gelled | | 9.59 | n/a | | n/a |
| 003 | 94 | gelled | | 1.16 | gelled | | 9.43 | n/a | | n/a n/a |
| 004 | 79 | gelled | | 1.88 | gelled | | 9.65 | n/a | | n/a n/a |
| 005 | 136 | no sampl | | 0.69 | no sampl | | 9.61 | n/a | | n/a n/a |
| 006 | 108 | gelled | | 1.83 | gelled | | 9.3 | n/a | | n/a n/a |
| 007 | 91 | gelled | | 1.88 | gelled | | 9.48 | n/a | | n/a n/a |
| 008 | 95 | gelled | | 1.88 | gelled | | 9.32 | n/a | | n/a n/a |
| 009 | 68 | gelled | | 1.11 | gelled | | 9.42 | n/a | | n/a n/a |
| 010 | 85 | 98 | 15.29 | 0.492 | 0.39 | −20.33 | 9.09 | 8.43 | −7.26 | 30 med-hard |
| 011 | 83 | 85 | 2.41 | 9.42 | 0.48 | −94.87 | 9.14 | n/a | | 20 med-hard |
| 012 | 69 | gelled | | 0.66 | gelled | | 9.45 | n/a | | n/a n/a |
| 013 | 74 | gelled | | 0.77 | gelled | | 9.32 | n/a | | n/a n/a |
| 014 | 88 | no sampl | | 0.56 | no sampl | | 9.56 | n/a | | n/a n/a |
| 015 | 61 | gelled | | 1.17 | gelled | | 9.52 | n/a | | n/a n/a |
| 016 | 68 | gelled | | 1.12 | gelled | | 9.38 | n/a | | n/a n/a |
| 017 | 61 | gelled | | 1.63 | gelled | | 9.52 | n/a | | n/a n/a |
| 018 | 58 | gelled | | 0.68 | gelled | | 1.697 | n/a | | n/a n/a |
| 019 | 63 | no sampl | | 1.28 | no sampl | | 9.47 | n/a | | n/a n/a |
| 020 | 78 | gelled | | 2.34 | gelled | | 9.64 | n/a | | n/a n/a |
| 021 | 69 | gelled | | 1.19 | gelled | | 9.53 | n/a | | n/a n/a |

TABLE 7-continued

AMBIENT CURE

| | | | | | | | | | | | |
|---|---|---|---|---|---|---|---|---|---|---|---|
| 022 | 80 | gelled | | 0.78 | gelled | | 9.65 | n/a | | n/a | n/a |
| 023 | 70 | gelled | | 0.88 | gelled | | 9.48 | n/a | | n/a | n/a |
| 031 | 93 | gelled | | 1.37 | gelled | | 9.57 | n/a | | n/a | n/a |
| 032 | 72 | gelled | | 1.5 | gelled | | 9.24 | n/a | | n/a | n/a |
| 033 | 86 | 71 | −17.44 | 0.9 | 0.45 | −49.56 | 9.01 | 8.31 | −7.77 | 10 | soft |
| 034 | 90 | gelled | | 1.13 | gelled | | 9.44 | n/a | | n/a | n/a |
| 035 | 83 | 105 | 26.51 | 1.95 | 1.67 | −14.31 | 9.44 | 8.9 | −5.72 | 40 | med |
| 036 | 88 | no sampl | | 1.17 | no sampl | | 9.33 | n/a | | n/a | n/a |
| 037 | 92 | gelled | | 0.85 | gelled | | 9.23 | n/a | | n/a | n/a |
| 038 | 86 | gelled | | 1.38 | gelled | | 9.55 | n/a | | n/a | n/a |
| 039 | 101 | gelled | | 0.77 | gelled | | 9.56 | n/a | | n/a | n/a |
| 040 | 86 | gelled | | 0.54 | gelled | | 9.4 | n/a | | n/a | n/a |
| 041 | 92 | no sampl | | 1.79 | no sampl | | 9.39 | n/a | | n/a | n/a |
| 042 | 85 | gelled | | 0.86 | gelled | | 9.44 | n/a | | n/a | n/a |
| 043 | 81 | gelled | | 0.7 | gelled | | 9.5 | n/a | | n/a | n/a |
| 044 | 85 | gelled | | 1.35 | gelled | | 9.49 | n/a | | n/a | n/a |
| 045 | 75 | gelled | | 1.16 | gelled | | 9.3 | n/a | | n/a | n/a |
| 046 | 73 | gelled | | 1.11 | gelled | | 9.22 | n/a | | n/a | n/a |
| 047 | 84 | no sampl | | 0.7 | no sampl | | 9.37 | n/a | | n/a | n/a |
| 048 | 80 | gelled | | 1.34 | gelled | | 9.53 | n/a | | n/a | n/a |
| 049 | 86 | gelled | | 1.66 | gelled | | 9.07 | n/a | | n/a | n/a |
| 050 | 68 | gelled | | 0.63 | gelled | | 9.4 | n/a | | n/a | n/a |
| 051 | 64 | gelled | | 2.68 | gelled | | 9.43 | n/a | | n/a | n/a |
| 052 | 138 | gelled | | 1.62 | gelled | | 9.65 | n/a | | n/a | n/a |
| 053 | 78 | gelled | | 1.34 | gelled | | 9.65 | n/a | | n/a | n/a |
| 054 | 58 | gelled | | 1.48 | gelled | | 9.72 | n/a | | n/a | n/a |
| 055 | 87 | gelled | | 1.74 | gelled | | 9.32 | n/a | | n/a | n/a |
| 067 | 89 | 122 | 37.08 | 0.85 | 0.76 | −10.82 | 9.81 | 9.25 | −5.71 | 80 | medium |
| 068 | 87 | 97 | 11.49 | 0.51 | 0.83 | 62.55 | 9.7 | 9.13 | −5.88 | 70 | medium |
| 069 | 98 | 119 | 21.43 | 0.51 | 0.95 | 85.49 | 9.71 | 9.33 | −3.91 | 90 | medium |
| 070 | 77 | 89 | 15.58 | 0.73 | 1.34 | 83.84 | 9.75 | 9.16 | −6.05 | 60 | medium |
| 071 | 85 | 81 | −4.71 | 1.55 | 0.87 | −44.06 | 9.76 | 9.21 | −5.64 | 30 | soft |
| 072 | 96 | 93 | −3.13 | 0.52 | 0.55 | 5.77 | 9.8 | 9.25 | −5.61 | slight | soft |
| 073 | 90 | 107 | 18.89 | 0.41 | 0.63 | 53.41 | 9.73 | 9.35 | −3.91 | 80 | medium |
| 074 | 90 | 132 | 46.67 | 0.85 | 0.72 | −15.18 | 9.91 | 9.34 | −5.75 | 80 | soft |
| 075 | 90 | 107 | 18.89 | 0.8 | 0.71 | −11.50 | 9.73 | 9.13 | −6.17 | 80 | soft |
| 076 | 84 | 76 | −9.52 | 0.84 | 0.33 | −60.36 | 9.67 | 9.11 | −5.79 | none | n/a |
| 077 | 96 | 114 | 18.75 | 0.69 | 1.10 | 60.00 | 9.9 | 9.38 | −5.25 | 90 | med-hard |
| 078 | 94 | 113 | 20.21 | 0.63 | 0.76 | 21.11 | 9.9 | 9.39 | −5.15 | 80 | soft |
| 079 | 77 | 105 | 36.36 | 1.1 | 0.73 | −33.36 | 9.92 | 9.48 | −4.44 | none | n/a |
| 080 | 85 | 88 | 3.53 | 0.97 | 1.00 | 2.89 | 9.78 | 9.24 | −5.52 | 40 | soft |
| 081 | 94 | 138 | 46.81 | 1.06 | 0.92 | −13.49 | 9.8 | 9.35 | −4.59 | 35 | medium |
| 082 | 83 | 86 | 3.61 | 0.71 | 0.81 | 14.51 | 9.67 | 9.23 | −4.55 | 10 | soft |
| 083 | 91 | 111 | 21.98 | 1.1 | 0.65 | −40.55 | 9.82 | 9.23 | −6.01 | 90 | medium |
| 084 | 83 | 105 | 26.51 | 0.74 | 0.71 | −4.32 | 9.78 | 9.23 | −5.62 | 90 | soft |
| 085 | 87 | gelled | | 0.84 | gelled | | 9.01 | n/a | | n/a | n/a |
| 086 | 72 | 88 | 22.22 | 1.05 | 1.09 | 3.82 | 9.33 | 8.83 | −7.50 | 20 | medium |
| 087 | 83 | 106 | 27.71 | 0.78 | 1.69 | 116.41 | 9.35 | 8.66 | −7.38 | 80 | soft |
| 088 | 90 | gelled | | 0.95 | gelled | | 9.18 | n/a | | n/a | n/a |
| 700T HS+ | | | | % settling is the relative ht on stirring stick that adheres w/o easily falling away | | | | | | | |

TABLE 8

INDUSTRIAL MAINTENANCE

| Formula | Resin | Dispersant | Dispersant Amount | Thickener | Film Thickness | 20 Gloss | 60 Gloss | Toluene | Ethanol | MEK | 10% Sulf | 10% NaOH | DL Water | Pencil hardness |
|---|---|---|---|---|---|---|---|---|---|---|---|---|---|---|
| 001 | 3 | 2 | 1 | 3 | 2.61 | 6.6 | 31.2 | 1 | 3 | 1 | 5 | 3 | 4.5 | 1 |
| 002 | 3 | 8 | 1 | 5 | 2.69 | 23.6 | 59.6 | 1 | 3 | 1 | 5 | 2 | 4 | 0 |
| 003 | 3 | 7 | 1 | 5 | 2.37 | 28.8 | 63.6 | 1 | 3 | 1.5 | 5 | 3 | 4 | 1 |
| 004 | 3 | 2 | 1 | 6 | 2.75 | 4.6 | 25.7 | 1 | 4 | 1.5 | 5 | 3 | 5 | 1 |
| 005 | 3 | 11 | 1 | 7 | 2.36 | 25.6 | 61.6 | 1 | 3 | 1.5 | 5 | 2 | 3 | 1 |
| 006 | 3 | 3 | 1 | 7 | 2.60 | 17.2 | 52.7 | 1.5 | 4.5 | 1.6 | 4.5 | 3 | 4.5 | 1 |
| 007 | 4 | 1 | 2 | 7 | 2.72 | 34.7 | 67.9 | 4 | 4 | 1.6 | 5 | 2 | 3 | 0 |
| 008 | 4 | 5 | 2 | 5 | 2.80 | 35.9 | 68.3 | 4 | 4 | 1.6 | 4 | 3 | 3 | 0 |
| 009 | 4 | 3 | 2 | 3 | 2.34 | 30.8 | 65.5 | 3 | 4 | 1.5 | 3 | 3 | 3 | 0 |
| 010 | 4 | 10 | 2 | 2 | 2.28 | 13.9 | 49.8 | 3 | 4 | 1 | 3 | 3 | 3 | 1 |
| 011 | 4 | 10 | 2 | 2 | 2.30 | 8.0 | 37.9 | 4 | 4.5 | 1.5 | 5 | 4 | 5 | 0 |
| 012 | 4 | 3 | 2 | 7 | 2.43 | 20.1 | 57.9 | 1.5 | 3 | 1.5 | 4.5 | 3 | 3 | 0 |
| 013 | 4 | 8 | 2 | 7 | 2.58 | 11.7 | 44.4 | 1 | 4 | 1.5 | 4 | 3 | 3 | 0 |
| 014 | 4 | 11 | 2 | 8 | 2.49 | 29.6 | 65.4 | 4 | 3 | 1.6 | 5 | 3 | 3 | 0 |
| 015 | 4 | 1 | 1 | 2 | 2.55 | 28.9 | 63.7 | 1.5 | 4.5 | 2 | 5 | 1.5 | 5 | 0 |
| 016 | 4 | 5 | 1 | 3 | 2.76 | 36.0 | 67.5 | 3 | 3 | 2 | 3 | 4.5 | 3 | 0 |
| 017 | 4 | 1 | 1 | 8 | 2.63 | 21.2 | 57.2 | 1.5 | 4.5 | 2 | 5 | 4.5 | 3 | 0 |
| 018 | 4 | 2 | 1 | 4 | 2.51 | 33.7 | 66.8 | 1.5 | 3 | 1.5 | 4.5 | 2 | 3 | 0 |
| 019 | 4 | 7 | 1 | 1 | 2.70 | 14.3 | 48.0 | 1.5 | 4 | 1 | 4 | 3 | 3 | 0 |
| 020 | 4 | 11 | 1 | 4 | 2.65 | 33.5 | 67.2 | 4 | 3 | 1.5 | 4.5 | 3 | 3 | 0 |
| 021 | 4 | 3 | 1 | 6 | 2.71 | 34.2 | 69.0 | 3 | 3 | 1.5 | 4.5 | 4 | 3 | 0 |
| 022 | 4 | 11 | 1 | 2 | 2.60 | 30.8 | 66.3 | 3 | 4 | 2 | 5 | 3 | 3 | 0 |
| 023 | 4 | 3 | 1 | 7 | 2.51 | 36.9 | 68.1 | 3 | 1.5 | 3 | 5 | 3 | 3 | 0 |
| 031 | 2 | 2 | 2 | 1 | 2.38 | 21.5 | 56.1 | 1.5 | 4 | 1.5 | 5 | 3 | 5 | 0 |
| 032 | 2 | 3 | 2 | 6 | 1.93 | 31.0 | 66.9 | 1.5 | 3.5 | 1.5 | 5 | 3 | 2 | 0 |
| 033 | 2 | 4 | 2 | 8 | 2.09 | 12.5 | 44.7 | 1.5 | 3.5 | 1.5 | 4 | 3 | 2 | 0 |
| 034 | 2 | 1 | 1 | 7 | 2.49 | 25.4 | 60.2 | 1.5 | 4 | 1.6 | 5 | 3 | 2 | 0 |
| 035 | 2 | 1 | 1 | 5 | 2.47 | 15.4 | 49.3 | 1.5 | 4 | 1.5 | 5 | 3 | 2 | 0 |
| 036 | 2 | 3 | 1 | 4 | 2.51 | 16.6 | 51.2 | 1.5 | 3 | 1 | 5 | 2 | 2 | 0 |
| 037 | 2 | 8 | 1 | 4 | 2.54 | 15.1 | 49.1 | 1 | 2 | 1 | 4 | 2 | 5 | 0 |
| 038 | 2 | 11 | 1 | 2 | 2.43 | 33.0 | 67.3 | 1.5 | 3 | 1.6 | 5 | 2 | 2.5 | 0 |
| 039 | 2 | 2 | 1 | 8 | 2.61 | 21.7 | 58.5 | 1.5 | 3 | 1.6 | 5 | 2 | 2 | 0 |
| 040 | 2 | 7 | 1 | 8 | 2.32 | 27.4 | 62.5 | 1.5 | 3 | 1 | 5 | 2 | 2 | 0 |
| 041 | 2 | 7 | 2 | 6 | 2.49 | 23.8 | 59.4 | 1.5 | 3 | 1.5 | 5 | 2 | 2 | 0 |
| 042 | 3 | 1 | 2 | 4 | 3.01 | 25.7 | 61.0 | 1 | 3 | 1.5 | 5 | 2 | 5 | 0 |
| 043 | 3 | 1 | 2 | 1 | 2.34 | 18.9 | 54.4 | 1 | 3 | 1.5 | 5 | 2 | 3 | 0 |
| 044 | 3 | 1 | 2 | 7 | 2.34 | 9.7 | 39.9 | 1 | 3 | 1 | 4 | 2 | 5 | 1 |
| 045 | 3 | 5 | 2 | 8 | 2.36 | 26.6 | 62.4 | 1.5 | 3 | 1 | 4 | 2 | 4.5 | 1 |
| 046 | 3 | 8 | 2 | 3 | 2.09 | 6.9 | 31.5 | 1.5 | 3 | 1.5 | 5 | 3 | 5 | 1 |
| 047 | 3 | 7 | 2 | 1 | 1.94 | 25.0 | 61.4 | 1 | 3 | 1.5 | 5 | 2 | 2.5 | 1 |
| 048 | 3 | 11 | 2 | 3 | 2.15 | 23.6 | 59.8 | 1 | 3 | 1.5 | 5 | 2 | 3 | 1 |
| 049 | 3 | 8 | 2 | 6 | 2.02 | 24.9 | 63.6 | 1.5 | 4 | 1.5 | 5 | 4 | 4 | 2 |
| 050 | 3 | 3 | 2 | 5 | 2.20 | 15.4 | 50.3 | 1 | 3 | 1.5 | 5 | 2 | 4.5 | 1 |
| 051 | 3 | 5 | 1 | 4 | 2.56 | 26.3 | 63.0 | 1 | 3.5 | 1 | 5 | 2 | 3 | 0 |
| 052 | 3 | 9 | 1 | 1 | 2.54 | 22.6 | 57.7 | 4 | 1 | 1 | 5 | 2 | 2 | 1 |

TABLE 8-continued

INDUSTRIAL MAINTENANCE

| Formula | Blister size | Blister density | Rust | | | | | | | | | | | | |
|---|---|---|---|---|---|---|---|---|---|---|---|---|---|---|---|
| 053 | 3 | 9 | 1 | | | 2 | 21.7 | 2.47 | 2 | 1 | 3 | 1 | 6 | 2 | 2 | 1 |
| 054 | 2 | 8 | 1 | | | 4 | 14.9 | 2.47 | 2 | 1 | 3 | 1 | 4.5 | 2.5 | 2 | 1 |
| 055 | 3 | 8 | 2 | | | 4 | 8.9 | 2.79 | 2 | 1 | 3 | 1 | 4.5 | 3 | 4.5 | 1 |
| 067 | 1 | 5 | 2 | | | 3 | 29.1 | 2.40 | 2 | 1.5 | 4 | 1 | 3 | 2 | 3 | 0 |
| 068 | 1 | 1 | 2 | | | 6 | 37.0 | 2.28 | 2 | 1.5 | 3 | 1 | 4 | 3 | 3 | 0 |
| 069 | 1 | 8 | 2 | | | 2 | 38.6 | 2.38 | 2 | 1.5 | 3 | 1 | 3 | 2 | 3 | 0 |
| 070 | 1 | 3 | 2 | | | 2 | 36.1 | 2.38 | 2 | 1.5 | 3 | 1 | 4 | 3 | 3 | 0 |
| 071 | 1 | 3 | 2 | | | 2 | 32.0 | 2.24 | 2 | 1.5 | 3 | 1 | 3 | 2 | 2 | 0 |
| 072 | 1 | 11 | 2 | | | 5 | 35.9 | 2.09 | 2 | 1.5 | 5 | 1 | 4 | 3 | 3 | 0 |
| 073 | 1 | 7 | 2 | | | 6 | 32.2 | 2.19 | 2 | 1.5 | 2 | 1 | 3 | 2 | 4 | 0 |
| 074 | 1 | 7 | 2 | | | 5 | 33.7 | 2.57 | 2 | 1.5 | 3.5 | 1 | 4 | 3 | 3 | 0 |
| 075 | 1 | 2 | 1 | | | 2 | 32.2 | 2.44 | 2 | 1.5 | 5 | 1 | 4.5 | 3 | 4 | 0 |
| 076 | 1 | 5 | 1 | | | 1 | 24.3 | 2.49 | 1 | 1.5 | 5 | 1 | 4 | 2 | 4 | 0 |
| 077 | 1 | 6 | 1 | | | 6 | 31.9 | 2.40 | 6 | 1.5 | 4 | 1 | 4 | 2 | 4.5 | 0 |
| 078 | 1 | 9 | 1 | | | 4 | 30.4 | 2.25 | 4 | 1.5 | 4 | 1 | 4.5 | 2 | 4 | 0 |
| 079 | 1 | 2 | 1 | | | 1 | 28.2 | 2.87 | 1 | 1.5 | 4 | 1 | 4 | 2 | 3 | 0 |
| 080 | 1 | 3 | 1 | | | 8 | 33.8 | 2.55 | 2 | 2 | 3 | 1 | 3 | 3 | 2 | 0 |
| 081 | 1 | 7 | 1 | | | 3 | 34.5 | 2.94 | 3 | 1.5 | 4 | 2 | 4 | 4 | 4 | 0 |
| 082 | 1 | 10 | 1 | | | 1 | 28.8 | 2.95 | 1 | 1.5 | 5 | 1.5 | 4 | 3 | 5 | 0 |
| 083 | 1 | 9 | 1 | | | 5 | 36.2 | 2.88 | 4 | 1.5 | 4 | 1.5 | 3 | 2 | 2 | 0 |
| 084 | 1 | 3 | 1 | | | 6 | 38.0 | 3.24 | 2 | 1.5 | 2 | 1 | 3 | 2 | 2 | 0 |
| 085 | 2 | 2 | 2 | | | 3 | 27.0 | 1.95 | 2 | 1 | 3 | 1.5 | 5 | 3 | 2 | 0 |
| 086 | 2 | 5 | 2 | | | 3 | 24.7 | 2.34 | 2 | 1.5 | 3 | 1.5 | 5 | 3 | 2 | 0 |
| 087 | 2 | 6 | 2 | | | 7 | 30.9 | 2.52 | 2 | 1.5 | 3 | 1.5 | 4.5 | 3 | 2 | 0 |
| 088 | 2 | 8 | 2 | | | 4 | 17.5 | 2.43 | 2 | 1.5 | 4.5 | 1.5 | 5 | 4 | 5 | 5 |
| Polylon 1900 | Control #1 | | | | | | 83.3 | 3.30 | 2 | 1.5 | 1.5 | 1.5 | 4 | 4.5 | 4.5 | 5 |
| Centurion | Control #2 | | | | | | 72.8 | 3.66 | 2 | 1 | 1.5 | 1.5 | 5 | 5 | 5 | 4 |
| Sher-cryl | Control #3 | | | | | | 46.3 | 1.97 | 2 | 1.5 | 3 | 1.5 | 5 | 4 | 4 | 4 |

| | Humidity | | | | | Salt Spray (200 hours) | | | | Salt Spray (375 hours) | | | | Forward | Reverse |
|---|---|---|---|---|---|---|---|---|---|---|---|---|---|---|---|
| Formula | Blister size | Blister density | Rust | Gloss | % Change gloss | Blister size | Blister density | Rust | Scribe | Blister size | Blister density | Rust | Scribe | Impact | Impact |
| 001 | 4 | 2 | 9 | 19.9 | −36.22% | 2 | 2 | 10 | 8 | 2 | 2 | 9 | 7 | 40 | <4 |
| 002 | 6 | 3 | 10 | 40.2 | −32.78% | 2 | 2 | 9 | 8 | 2.5 | 2 | 8 | 7 | 44 | 4 |
| 003 | 8 | 2 | 9 | 46.3 | −27.43% | 2 | 2 | 6 | 8 | 3 | 2 | 7 | 7 | 36 | 4 |
| 004 | 4 | 2 | 7 | 15.4 | −40.08% | 2 | 2 | 9 | 8 | 3 | 3 | 8 | 7 | 40 | <4 |
| 005 | 8 | 3 | 8 | 47.9 | −22.24% | 6 | 3 | 8 | 8 | 4 | 3 | 8 | 7 | 44 | <4 |
| 006 | 8 | 3 | 9 | 41.6 | −21.06% | 2 | 2 | 8 | 8 | 3 | 2 | 8 | 8 | 40 | 4 |
| 007 | 6 | 2 | 1 | 26.5 | −60.97% | 2 | 3 | 8 | 8 | 4 | 3 | 7 | 8 | >168 | >168 |
| 008 | 6 | 2 | 9 | 20.5 | −69.99% | 6 | 4 | 10 | 8 | 4 | 4 | 9 | 8 | >168 | >168 |
| 009 | 6 | 2 | 6 | 26.0 | −60.31% | 6 | 6 | 10 | 8 | 4 | 3 | 9 | 8 | >168 | >168 |
| 010 | 8 | 1 | 1 | 19.6 | −60.64% | 6 | 4 | 6 | 8 | 3 | 2 | 8 | 7 | >168 | >168 |
| 011 | 4 | 3 | 5 | 16.9 | −55.41% | 6 | 4 | 8 | 8 | 3 | 4 | 8 | 6 | >168 | >168 |
| 012 | 6 | 2 | 4 | 25.6 | −73.65% | 6 | 2 | 9 | 7 | 3 | 2 | 8 | 5 | >168 | >168 |
| 013 | 2 | 2 | 10 | 11.7 | −86.24% | 6 | 4 | 7 | 8 | 3 | 4 | 9 | 7 | >168 | >168 |
| 014 | 4 | 1 | 1 | 9.0 | −71.43% | 6 | 3 | 9 | 7 | 3 | 4 | 8 | 7 | >168 | >168 |
| 015 | 4 | 1 | 8 | 18.2 | −73.65% | 2 | 4 | 7 | 8 | 5 | 5 | 9 | 6 | >168 | >168 |
| 016 | 4 | 2 | 6 | 36.3 | −46.22% | 6 | 4 | 9 | 7 | 3 | 2 | 8 | 6 | >168 | >168 |
| 017 | 4 | 1 | 9 | 10.0 | −82.52% | 6 | 4 | 8 | 8 | 3 | 3 | 8 | 6 | >168 | >168 |

TABLE 8-continued

INDUSTRIAL MAINTENANCE

| | | | | | | | | | | | | | | | |
|---|---|---|---|---|---|---|---|---|---|---|---|---|---|---|---|
| 018 | 4 | 1 | 8 | 10.5 | −54.28% | 6 | 4 | 8 | 8 | 2 | 3 | 8 | 7 | >168 | >168 |
| 019 | 2 | 1 | 8 | 7.8 | −83.75% | 6 | 4 | 8 | 8 | 4 | 3 | 9 | 6 | >168 | >168 |
| 020 | 4 | 2 | 8 | 16.6 | −75.00% | 6 | 4 | 8 | 8 | 4 | 3 | 8 | 7 | >168 | >168 |
| 021 | 4 | 2 | 4 | 23.9 | −65.36% | 6 | 4 | 8 | 8 | 4 | 3 | 8 | 7 | >168 | >168 |
| 022 | 4 | 1 | 2 | 20.7 | −68.78% | 6 | 4 | 9 | 8 | 6 | 2 | 7 | 7 | >168 | >168 |
| 023 | 2 | 1 | 6 | 8.4 | −87.67% | 2 | 2 | 9 | 8 | 6 | 3 | 9 | 7 | >168 | >168 |
| 031 | 4 | 1 | 5 | 31.0 | −44.74% | 2 | 2 | 8 | 8 | 2 | 2 | 7 | 7 | 35 | <4 |
| 032 | 6 | 3 | 9 | 43.5 | −34.98% | 2 | 2 | 6 | 9 | 2 | 1 | 6 | 7 | 28 | 4 |
| 033 | 6 | 2 | 5 | 31.0 | −30.65% | 2 | 2 | 6 | 8 | 2 | 1 | 5 | 8 | 28 | <4 |
| 034 | 4 | 2 | 9 | 33.5 | −44.35% | 2 | 2 | 8 | 6 | 2 | 1 | 7 | 8 | 24 | <4 |
| 035 | 4 | 2 | 5 | 24.0 | −51.32% | 2 | 2 | 6 | 9 | 2 | 1 | 4 | 8 | 28 | <4 |
| 036 | 4 | 2 | 7 | 30.3 | −40.82% | 2 | 2 | 7 | 9 | 2 | 1 | 6 | 9 | 28 | <4 |
| 037 | 4 | 3 | 8 | 23.8 | −51.53% | 2 | 1 | 8 | 8 | 2 | 1 | 6 | 7 | 24 | 4 |
| 038 | 4 | 3 | 9 | 36.4 | −45.91% | 2 | 2 | 7 | 8 | 2 | 1 | 6 | 7 | 28 | 4 |
| 039 | 4 | 2 | 7 | 26.3 | −51.62% | 2 | 2 | 10 | 8 | 2 | 1 | 7 | 7 | 40 | <4 |
| 040 | 4 | 2 | 9 | 25.2 | −59.68% | 2 | 2 | 7 | 8 | 2 | 1 | 5 | 7 | 28 | 4 |
| 041 | 6 | 2 | 7 | 33.0 | −44.44% | 2 | 2 | 8 | 8 | 2 | 1 | 7 | 7 | 24 | <4 |
| 042 | 4 | 2 | 8 | 37.0 | −39.34% | 2 | 2 | 6 | 8 | 2 | 1 | 6 | 6 | 96 | 16 |
| 043 | 6 | 2 | 9 | 32.1 | −40.99% | 2 | 2 | 8 | 8 | 2 | 1 | 8 | 7 | 40 | 4 |
| 044 | 6 | 2 | 7 | 28.0 | −29.82% | 2 | 2 | 8 | 8 | 2 | 1 | 8 | 7 | 36 | 4 |
| 045 | 8 | 2 | 10 | 40.1 | −35.74% | 2 | 2 | 9 | 6 | 2 | 1 | 7 | 6 | 40 | <4 |
| 046 | 6 | 2 | 6 | 22.5 | −28.57% | 2 | 2 | 9 | 8 | 2 | 1 | 8 | 7 | 36 | 8 |
| 047 | 8 | 2 | 9 | 43.3 | −29.48% | 2 | 2 | 8 | 8 | 2 | 1 | 7 | 7 | 36 | 4 |
| 048 | 8 | 3 | 8 | 42.2 | −29.43% | 2 | 2 | 7 | 8 | 2 | 1 | 5 | 7 | 40 | 4 |
| 049 | 8 | 2 | 9 | 33.2 | −47.80% | 2 | 2 | 5 | 7 | 2 | 1 | 5 | 7 | 40 | 4 |
| 050 | 8 | 3 | 10 | 32.6 | −35.19% | 2 | 1 | 6 | 8 | 2 | 1 | 5 | 7 | 60 | 16 |
| 051 | 8 | 3 | 9 | 48.2 | −23.49% | 2 | 2 | 9 | 8 | 2 | 1 | 6 | 8 | 48 | <4 |
| 052 | 8 | 3 | 9 | 46.5 | −18.41% | 2 | 2 | 8 | 8 | 2 | 1 | 8 | 8 | 48 | 4 |
| 053 | 8 | 3 | 10 | 46.3 | −19.20% | 2 | 2 | 7 | 7 | 2 | 2 | 6 | 8 | 32 | 4 |
| 054 | 8 | 3 | 10 | 35.3 | −28.11% | 2 | 3 | 5 | 8 | 2 | 2 | 8 | 7 | 36 | <4 |
| 055 | 4 | 2 | 9 | 28.5 | −23.59% | 2 | 2 | 7 | 7 | 2 | 3 | 9 | 7 | 32 | <4 |
| 067 | 6 | 2 | 10 | 21.2 | −67.63% | 2 | 2 | 9 | 8 | 2 | 2 | 7 | 7 | 28 | 4 |
| 068 | 6 | 2 | 9 | 28.8 | −59.38% | 2 | 3 | 10 | 8 | 4 | 3 | 8 | 7 | 44 | 8 |
| 069 | 4 | 1 | 10 | 16.7 | −73.85% | 10 | 4 | 9 | 8 | 2 | 2 | 8 | 8 | 44 | 4 |
| 070 | 8 | 2 | 9 | 32.6 | −53.03% | 2 | 3 | 9 | 7 | 2 | 4 | 9 | 8 | 56 | 8 |
| 071 | 6 | 2 | 9 | 27.8 | −58.69% | 2 | 3 | 10 | 8 | 2 | 2 | 9 | 8 | 52 | 8 |
| 072 | 6 | 2 | 9 | 26.8 | −61.27% | 2 | 3 | 10 | 8 | 2 | 2 | 8 | 8 | 40 | 12 |
| 073 | 4 | 1 | 9 | 20.6 | −69.44% | 2 | 1 | 10 | 7 | 2 | 2 | 9 | 7 | 48 | 12 |
| 074 | 4 | 2 | 9 | 29.7 | −56.45% | 2 | 3 | 9 | 8 | 2 | 2 | 8 | 8 | 64 | 4 |
| 075 | 4 | 2 | 9 | 19.6 | −71.05% | 2 | 2 | 10 | 8 | 2 | 2 | 8 | 8 | 44 | 12 |
| 076 | 4 | 2 | 10 | 30.9 | −48.24% | 2 | 5 | 10 | 8 | 2 | 4 | 9 | 8 | 64 | 16 |
| 077 | 4 | 2 | 10 | 13.6 | −79.82% | 2 | 3 | 10 | 7 | 2 | 4 | 9 | 8 | 52 | 8 |
| 078 | 4 | 2 | 10 | 22.7 | −65.97% | 2 | 3 | 10 | 8 | 2 | 3 | 9 | 8 | 56 | 8 |
| 079 | 6 | 2 | 9 | 22.8 | −64.32% | 2 | 3 | 9 | 8 | 2 | 2 | 9 | 7 | 36 | 12 |
| 080 | 6 | 2 | 9 | 19.9 | −70.52% | 2 | 3 | 9 | 8 | 2 | 3 | 8 | 8 | 48 | 4 |
| 081 | 8 | 2 | 10 | 22.4 | −68.37% | 2 | 3 | 9 | 8 | 2 | 3 | 8 | 7 | 64 | 16 |
| 082 | 4 | 2 | 10 | 26.4 | −57.21% | 2 | 1 | 9 | 8 | 2 | 1 | 8 | 8 | 44 | 8 |
| 083 | 4 | 2 | 10 | 22.1 | −68.16% | 2 | 3 | 9 | 8 | 2 | 2 | 9 | 9 | 60 | 8 |
| 084 | 8 | 2 | 10 | 16.5 | −76.33% | 2 | 2 | 9 | 9 | 2 | 2 | 9 | 8 | 52 | 24 |
| 085 | 4 | 2 | 9 | 17.9 | −71.81% | 2 | 2 | 8 | 9 | 2 | 2 | 8 | 9 | 28 | <4 |

TABLE 8-continued

INDUSTRIAL MAINTENANCE

| | Corrosion Weathering (4 cycles) | | | | | | | | |
|---|---|---|---|---|---|---|---|---|---|
| | Blister size | Blister density | Rust | Scribe | | | | | |
| 086 | 4 | 2 | 9 | 23.0 | −61.92% | 2 | 2 | 8 | 9 | 2 | 7 | 9 | 32 | 4 |
| 087 | 6 | 2 | 9 | 22.6 | −65.50% | 2 | 2 | 6 | 8 | 1 | 6 | 7 | 28 | <4 |
| 088 | 6 | 2 | 9 | 26.3 | −50.09% | 2 | 2 | 6 | 9 | 1 | 6 | 7 | 40 | <4 |
| Polylon 1900 | 2 | 3 | 10 | 90.5 | −4.13% | 10 | 5 | 10 | 9 | 5 | 10 | 3 | 36 | <4 |
| Centurion | 4 | 2 | 10 | 31.2 | −64.86% | 10 | 5 | 9 | 8 | 5 | 9 | 8 | >168 | >168 |
| Sher-cryl | 8 | 2 | 9 | 30.2 | −61.28% | 10 | 5 | 9 | 8 | 5 | 7 | 7 | >168 | >168 |

| | Corrosion Weathering (4 cycles) | | | | Adhesion | | | 24 Hr. Water Soak | | | | |
|---|---|---|---|---|---|---|---|---|---|---|---|---|
| Formula | Blister size | Blister density | Rust | Scribe | Weathered aluminum | Weathered HD galvanized | Blister size | Blister density | Rust | Adhesion | Mandrel bend |
| 001 | 10 | 5 | 10 | 5 | 4 | 3 | 10 | 6 | 10 | 4 | PASS |
| 002 | 10 | 5 | 10 | 8 | 4 | 4 | 6 | 3 | 10 | 4 | PASS |
| 003 | 10 | 5 | 10 | 8 | 4 | 3 | 6 | 4 | 9 | 4 | PASS |
| 004 | 10 | 5 | 10 | 8 | 5 | 2 | 10 | 5 | 10 | 5 | PASS |
| 005 | 10 | 5 | 10 | 6 | 3 | 0 | 6 | 4 | 9 | 4 | PASS |
| 006 | 10 | 5 | 10 | 9 | 4 | 1 | 10 | 5 | 10 | 4 | PASS |
| 007 | 10 | 5 | 10 | 8 | 5 | 3 | 10 | 5 | 10 | 5 | PASS |
| 008 | 10 | 5 | 10 | 7 | 5 | 3 | 10 | 5 | 9 | 0 | PASS |
| 009 | 10 | 5 | 10 | 8 | 5 | 3 | 10 | 5 | 9 | 4 | PASS |
| 010 | 6 | 4 | 9 | 8 | 5 | 2 | 6 | 3 | 9 | 5 | PASS |
| 011 | 10 | 5 | 10 | 8 | 5 | 0 | 8 | 4 | 10 | 4 | PASS |
| 012 | 10 | 5 | 10 | 9 | 5 | 1 | 6 | 3 | 9 | 5 | PASS |
| 013 | 10 | 5 | 10 | 8 | 5 | 3 | 10 | 5 | 10 | 2 | PASS |
| 014 | 10 | 5 | 10 | 8 | 5 | 2 | 8 | 2 | 10 | 5 | PASS |
| 015 | 10 | 5 | 9 | 8 | 5 | 3 | 8 | 3 | 10 | 5 | PASS |
| 016 | 10 | 5 | 10 | 9 | 5 | 2 | 8 | 4 | 10 | 1 | PASS |
| 017 | 10 | 5 | 10 | 9 | 5 | 3 | 8 | 4 | 10 | 5 | PASS |
| 018 | 10 | 5 | 10 | 9 | 5 | 3 | 8 | 4 | 9 | 5 | PASS |
| 019 | 10 | 5 | 10 | 9 | 5 | 3 | 8 | 3 | 9 | 2 | PASS |
| 020 | 10 | 5 | 10 | 8 | 5 | 3 | 10 | 5 | 9 | 3 | PASS |
| 021 | 10 | 5 | 10 | 7 | 4 | 4 | 8 | 3 | 10 | 0 | PASS |
| 022 | 10 | 5 | 10 | 7 | 5 | 3 | 10 | 5 | 10 | 0 | PASS |
| 023 | 10 | 5 | 9 | 8 | 5 | 2 | 10 | 5 | 10 | 1 | PASS |
| 031 | 10 | 5 | 10 | 7 | 5 | 4 | 6 | 1 | 10 | 3 | PASS |
| 032 | 10 | 5 | 10 | 9 | 5 | 4 | 6 | 2 | 9 | 4 | PASS |
| 033 | 10 | 5 | 10 | 9 | 5 | 3 | 6 | 3 | 8 | 3 | PASS |
| 034 | 10 | 5 | 10 | 9 | 5 | 4 | 4 | 2 | 10 | 4 | PASS |
| 035 | 10 | 5 | 10 | 9 | 5 | 3 | 6 | 2 | 10 | 3 | PASS |
| 036 | 10 | 5 | 10 | 6 | 5 | 4 | 6 | 1 | 10 | 4 | PASS |
| 037 | 10 | 5 | 10 | 9 | 3 | 2 | 8 | 3 | 10 | 3 | PASS |
| 038 | 10 | 5 | 10 | 8 | 5 | 1 | 6 | 2 | 10 | 3 | PASS |
| 039 | 10 | 5 | 10 | 8 | 4 | 1 | 4 | 1 | 10 | 4 | PASS |
| 040 | 10 | 5 | 10 | 5 | 5 | 0 | 6 | 3 | 9 | 3 | PASS |
| 041 | 10 | 5 | 10 | 8 | 4 | 0 | 6 | 2 | 9 | 3 | PASS |
| 042 | 10 | 5 | 10 | 8 | 4 | 0 | 4 | 3 | 9 | 4 | PASS |
| 043 | 10 | 5 | 10 | 8 | 4 | 0 | 6 | 2 | 8 | 4 | PASS |
| 044 | 10 | 5 | 10 | 8 | 0 | 0 | 8 | 3 | 10 | 3 | PASS |
| 045 | 10 | 5 | 10 | 8 | 4 | 0 | 4 | 3 | 9 | 3 | PASS |
| 046 | 10 | 5 | 10 | 7 | 4 | 0 | 6 | 4 | 9 | 4 | PASS |

TABLE 8-continued

INDUSTRIAL MAINTENANCE

| Formula | Gloss (60 degree) | | | QUV-500 hours | | | | | | | |
|---|---|---|---|---|---|---|---|---|---|---|---|
| | Initial | at 500 hrs | % change | | | Delta E | | | Delta b | | |
| | | | | | Initial | at 500 hrs | change | Initial | at 500 hrs | change | |
| 047 | 32.60 | 21.10 | −35.26 | 5 | 9 | 7 | 3 | | | | 0 | 6 | 4 | 9 | 4 | PASS |
| 048 | 56.50 | 40.10 | −29.03 | 5 | 10 | 6 | 4 | | | | 1 | 10 | 5 | 9 | 4 | PASS |
| 049 | 65.70 | 50.70 | −22.83 | 5 | 10 | 8 | 4 | | | | 1 | 6 | 4 | 9 | 3 | PASS |
| 050 | 49.60 | 29.60 | −39.92 | 5 | 10 | 7 | 2 | | | | 0 | 6 | 4 | 10 | 4 | PASS |
| 051 | | | | 5 | 10 | 9 | 4 | | | | 0 | 6 | 3 | 9 | 3 | PASS |
| 052 | 61.00 | 47.00 | −22.95 | 5 | 10 | 9 | 4 | | | | 0 | 10 | 5 | 10 | 4 | PASS |
| 053 | | | | 5 | 10 | 9 | 1 | | | | 0 | 8 | 4 | 10 | 5 | PASS |
| 054 | 51.00 | 35.80 | −29.80 | 5 | 10 | 7 | 4 | | | | 3 | 10 | 5 | 9 | 4 | PASS |
| 055 | | | | 5 | 8 | 7 | 1 | | | | 4 | 10 | 3 | 9 | 3 | PASS |
| 067 | 69.40 | 33.30 | −52.02 | 5 | 10 | 8 | 4 | | | | 1 | 6 | 3 | 10 | 5 | PASS |
| 068 | | | | 5 | 9 | 8 | 4 | | | | 1 | 6 | 2 | 9 | 3 | PASS |
| 069 | | | | 5 | 10 | 9 | 4 | | | | 2 | 8 | 2 | 10 | 3 | PASS |
| 070 | | | | 5 | 10 | 8 | 4 | | | | 2 | 6 | 3 | 10 | 3 | PASS |
| 071 | | | | 5 | 10 | 7 | 4 | | | | 1 | 8 | 3 | 10 | 3 | PASS |
| 072 | | | | 5 | 10 | 8 | 4 | | | | 2 | 6 | 2 | 9 | 0 | PASS |
| 073 | | | | 5 | 10 | 8 | 4 | | | | 2 | 6 | 3 | 10 | 0 | PASS |
| 074 | | | | 5 | 10 | 6 | 4 | | | | 1 | 8 | 1 | 9 | 0 | PASS |
| 075 | | | | 5 | 10 | 8 | 4 | | | | 2 | 6 | 3 | 10 | 4 | PASS |
| 076 | | | | 5 | 10 | 8 | 4 | | | | 0 | 6 | 3 | 10 | 4 | PASS |
| 077 | | | | 5 | 10 | 7 | 3 | | | | 1 | 4 | 2 | 9 | 3 | PASS |
| 078 | | | | 5 | 10 | 6 | 4 | | | | 3 | 4 | 2 | 9 | 0 | PASS |
| 079 | | | | 5 | 10 | 8 | 4 | | | | 2 | 6 | 3 | 9 | 0 | PASS |
| 080 | | | | 5 | 10 | 8 | 4 | | | | 2 | 6 | 0 | 10 | 0 | PASS |
| 081 | | | | 5 | 10 | 8 | 4 | | | | 3 | 6 | 3 | 9 | 0 | PASS |
| 082 | | | | 5 | 10 | 8 | 4 | | | | 3 | 6 | 3 | 10 | 3 | PASS |
| 083 | | | | 5 | 10 | 8 | 4 | | | | 3 | 6 | 3 | 10 | 3 | PASS |
| 084 | | | | 5 | 10 | 7 | 4 | | | | 4 | 4 | 1 | 10 | 3 | PASS |
| 085 | | | | 5 | 10 | 9 | 4 | | | | 3 | 4 | 2 | 10 | 2 | PASS |
| 086 | | | | 5 | 10 | 9 | 5 | | | | 3 | 4 | 2 | 10 | 3 | PASS |
| 087 | | | | 5 | 10 | 9 | −1 | | | | 2 | 4 | 5 | 10 | 0 | PASS |
| 088 | | | | 5 | 10 | 5 | 5 | | | | 0 | 10 | 5 | 10 | 2 | FAIL |
| Polylon 1900 | | | | 5 | 10 | 7 | 5 | | | | 2 | 10 | 5 | 10 | 2 | PASS |
| Centurion | | | | 5 | 10 | 7 | 5 | | | | 0 | 10 | 5 | 10 | 2 | PASS |
| Sher-cryl | | | | 4 | 9 | 6 | 4 | | | | 2 | 10 | 5 | 9 | 0 | FAIL |

| Formula | Gloss (60 degree) | | | QUV-1000 hrs. | | | | |
|---|---|---|---|---|---|---|---|---|
| | 1000 hour | % change | | Delta E | change | Delta b | change | |
| 001 | 17.90 | −45.09 | | 2.88 | 1.94 | 1.13 | 1.98 | |
| 002 | 37.10 | −34.34 | | 5.70 | 3.01 | 2.95 | 2.54 | |
| 003 | 48.20 | −26.64 | | 3.02 | 1.21 | 1.25 | 0.46 | |
| 004 | 26.50 | −46.57 | | 2.66 | 1.49 | 0.93 | 1.93 | |
| 005 | 45.60 | −25.25 | | 4.04 | 1.89 | 1.84 | 2.20 | |
| 006 | 32.80 | −35.69 | | 3.62 | 2.28 | 1.70 | 2.16 | |
| 007 | 21.90 | −68.44 | | 4.09 | 2.28 | 2.22 | 2.16 | |
| 008 | 21.20 | −69.84 | | 2.58 | 1.41 | 1.22 | 1.54 | |
| 009 | 15.20 | −77.75 | | 2.44 | 1.38 | 1.09 | 1.40 | |

Initial values column (QUV-500): 0.94, 2.69, 1.61, 1.17, 2.05, 1.34, 1.61, 1.17, 1.06 for rows 001-009; Delta E at 500 hrs: 3.23, 5.10, 2.72, 2.66, 3.44, 3.16, 2.49, 1.41, 1.98; change: 2.29, 2.41, 0.91, 1.49, 1.39, 1.82, 0.68, 0.24, 0.92; Delta b Initial: −0.85, 0.41, 0.79, −1.00, −0.36, −0.46, 0.04, −0.32, −0.31; at 500 hrs: 1.65, 2.79, 1.42, 1.36, 1.92, 1.76, 1.43, 0.83, 1.06; change: 2.40, 2.38, 0.63, 2.38, 2.28, 2.22, 1.39, 1.15, 1.37.

TABLE 8-continued

INDUSTRIAL MAINTENANCE

| | | | | | | | | | | | | |
|---|---|---|---|---|---|---|---|---|---|---|---|---|
| 010 | 52.00 | 13.60 | −73.46 | 1.05 | 3.14 | 2.09 | 0.01 | 1.83 | 1.82 | 9.80 | −51.15 | 4.00 | 2.95 | 2.07 | 2.06 |
| 011 | 40.60 | 10.40 | −74.38 | 0.26 | 3.03 | 2.77 | −0.13 | 1.75 | 1.88 | 7.50 | −81.53 | 3.85 | 3.59 | 1.97 | 2.10 |
| 012 | 59.30 | 16.50 | −72.18 | 0.73 | 1.95 | 1.22 | −0.45 | 0.95 | 1.40 | 12.70 | −78.58 | 2.75 | 2.02 | 1.17 | 1.62 |
| 013 | 46.80 | 15.00 | −67.95 | 1.31 | 2.83 | 1.52 | 0.05 | 1.60 | 1.55 | 12.30 | −73.72 | 3.40 | 2.09 | 1.79 | 1.74 |
| 014 | 69.10 | 19.60 | −71.64 | 1.10 | 2.45 | 1.35 | −0.32 | 1.38 | 1.70 | 15.90 | −76.99 | 3.01 | 1.91 | 1.56 | 1.88 |
| 015 | 66.10 | 18.20 | −72.47 | 1.00 | 2.01 | 1.01 | −0.29 | 1.03 | 1.32 | 15.50 | −76.55 | 2.29 | 1.29 | 1.12 | 1.41 |
| 016 | 70.70 | 19.70 | −72.14 | 1.39 | 1.88 | 0.49 | −0.44 | 0.94 | 1.36 | 18.10 | −74.40 | 2.36 | 0.97 | 1.12 | 1.56 |
| 017 | 59.30 | 14.50 | −75.55 | 0.61 | 1.80 | 1.19 | −0.48 | 0.66 | 1.32 | 12.30 | −79.26 | 2.40 | 1.79 | 0.96 | 1.42 |
| 018 | 69.00 | 19.00 | −72.46 | 0.92 | 2.01 | 1.09 | −0.28 | 1.10 | 1.35 | 15.90 | −76.96 | 2.58 | 1.66 | 1.24 | 1.50 |
| 019 | 49.20 | 12.90 | −73.78 | 0.45 | 2.25 | 1.80 | −0.30 | 1.16 | 1.46 | 10.40 | −78.86 | 2.54 | 2.09 | 1.20 | 1.50 |
| 020 | 68.70 | 21.10 | −69.29 | 1.37 | 2.09 | 0.72 | −0.29 | 1.17 | 1.46 | 16.40 | −78.13 | 2.72 | 1.35 | 1.32 | 1.61 |
| 021 | 70.70 | 22.00 | −68.88 | 1.57 | 2.34 | 0.77 | −0.10 | 1.24 | 1.34 | 14.90 | −78.93 | 2.87 | 1.30 | 1.44 | 1.54 |
| 022 | 67.80 | 21.70 | −67.99 | 1.31 | 2.79 | 1.48 | 0.06 | 1.63 | 1.57 | 16.00 | −76.40 | 3.51 | 2.20 | 1.82 | 1.76 |
| 023 | 71.80 | 22.10 | −69.22 | 1.31 | 1.87 | 0.56 | 0.06 | 0.95 | 0.89 | 23.20 | −67.69 | 2.59 | 1.28 | 1.22 | 1.16 |
| 031 | 57.70 | 37.60 | −35.01 | 1.65 | 1.38 | 0.27 | −0.98 | 0.65 | 1.63 | 35.90 | −37.78 | 1.42 | 0.23 | 0.60 | 1.58 |
| 032 | 68.70 | 47.10 | −31.44 | 1.61 | 0.77 | 0.84 | 1.33 | 0.15 | 1.45 | 54.90 | −20.09 | 0.75 | 0.86 | 0.02 | 1.35 |
| 033 | 47.10 | 29.00 | −38.43 | 1.38 | 2.19 | 0.81 | −0.89 | 1.24 | 2.13 | 26.10 | −44.59 | 1.93 | 0.86 | 1.06 | 1.95 |
| 034 | 60.90 | 44.40 | −27.09 | 1.88 | 1.79 | 0.09 | −0.61 | 0.86 | 1.47 | 47.80 | −21.51 | 2.51 | 0.63 | 1.24 | 1.65 |
| 035 | 52.50 | 38.00 | −31.43 | 1.42 | 0.73 | 0.69 | −1.18 | 0.21 | 1.39 | 38.70 | −30.10 | 1.33 | 0.09 | 0.41 | 1.59 |
| 036 | 53.00 | 40.00 | −24.53 | 1.29 | 1.18 | 0.11 | −0.86 | 0.59 | 1.45 | 39.20 | −26.04 | 1.63 | 0.34 | 0.82 | 1.66 |
| 037 | 51.80 | 41.70 | −19.50 | 1.78 | 2.45 | 0.67 | −0.82 | 1.40 | 2.22 | 43.60 | −15.83 | 2.30 | 0.52 | 1.08 | 1.90 |
| 038 | 68.80 | 57.30 | −14.22 | 1.40 | 1.36 | 0.04 | −0.81 | 0.65 | 1.46 | 58.70 | −12.13 | 1.81 | 0.41 | 0.90 | 1.71 |
| 039 | 60.00 | 48.30 | −19.50 | 1.86 | 1.61 | 0.25 | −0.80 | 0.82 | 1.82 | 50.70 | −15.50 | 1.89 | 0.03 | 0.92 | 1.72 |
| 040 | 63.20 | 47.60 | −24.68 | 1.49 | 1.37 | 0.12 | −1.05 | 0.71 | 1.76 | 49.40 | −21.84 | 1.54 | 0.05 | 0.76 | 1.81 |
| 041 | 60.50 | 43.40 | −28.26 | 1.63 | 1.49 | 0.14 | −0.83 | 0.81 | 1.64 | 44.80 | −25.95 | 2.12 | 0.49 | 1.19 | 1.81 |
| 042 | 60.70 | 40.50 | −33.28 | 1.29 | 1.82 | 0.53 | −0.95 | 0.89 | 1.64 | 40.00 | −34.10 | 2.09 | 0.80 | 0.90 | 2.02 |
| 043 | 55.20 | 36.20 | −34.42 | 1.36 | 2.38 | 1.02 | −0.88 | 1.20 | 2.08 | 31.80 | −52.39 | 2.67 | 1.31 | 1.34 | 1.85 |
| 044 | 41.70 | 23.80 | −42.93 | 1.17 | 2.51 | 1.34 | −1.00 | 1.21 | 2.21 | 20.10 | −51.80 | 3.09 | 1.92 | 1.33 | 2.22 |
| 045 | 63.20 | 46.90 | −25.79 | 1.48 | 1.87 | 0.39 | −1.15 | 0.80 | 1.95 | 43.40 | −31.33 | 1.79 | 0.31 | 0.74 | 2.33 |
| 046 | 38.40 | 25.60 | −33.33 | 1.14 | 2.33 | 1.19 | −1.03 | 1.04 | 2.07 | 25.20 | −34.38 | 2.27 | 1.13 | 0.89 | 1.89 |
| 047 | 63.00 | 48.60 | −22.54 | 1.52 | 1.85 | 0.33 | −1.15 | 0.61 | 1.96 | 49.30 | −21.75 | 1.47 | 0.05 | 0.49 | 1.92 |
| 048 | 61.10 | 42.50 | −30.44 | 1.13 | 2.28 | 1.15 | −1.04 | 1.02 | 2.06 | 40.80 | −33.22 | 2.13 | 1.00 | 0.77 | 1.64 |
| 049 | 64.60 | 45.00 | −30.34 | 1.43 | 2.24 | 0.81 | −1.25 | 0.72 | 1.97 | 42.00 | −34.98 | 1.81 | 0.38 | 0.41 | 1.81 |
| 050 | 51.80 | 30.10 | −41.89 | 1.37 | 2.28 | 0.91 | −1.14 | 0.60 | 1.94 | 28.70 | −44.59 | 2.18 | 0.81 | 0.67 | 1.66 |
| 051 | 61.70 | 44.90 | −27.23 | 1.41 | 2.00 | 0.69 | −1.09 | 0.85 | 1.94 | 45.00 | −27.07 | 1.69 | 0.26 | 0.54 | 1.81 |
| 052 | 58.00 | 42.40 | −26.90 | 1.44 | 2.83 | 1.39 | −0.72 | 1.35 | 2.07 | 43.50 | −25.00 | 2.64 | 1.20 | 1.16 | 1.63 |
| 053 | 58.00 | 40.40 | −30.34 | 1.20 | 2.79 | 1.59 | −0.87 | 1.35 | 2.22 | 39.40 | −32.07 | 2.69 | 1.49 | 1.17 | 1.88 |
| 054 | 48.10 | 30.60 | −36.38 | 1.28 | 2.50 | 1.22 | −1.11 | 1.05 | 2.16 | 29.10 | −39.50 | 2.18 | 0.90 | 0.76 | 2.04 |
| 055 | 37.50 | 27.00 | −28.00 | 0.98 | 3.18 | 2.20 | −0.75 | 1.58 | 2.33 | 25.70 | −31.47 | 3.08 | 2.10 | 1.49 | 1.87 |
| 067 | 67.60 | 39.00 | −42.48 | 1.21 | 0.98 | 0.23 | −1.08 | 0.45 | 1.53 | 26.40 | −61.06 | 1.92 | 0.71 | 0.73 | 2.24 |
| 068 | 72.60 | 42.90 | −40.91 | 1.38 | 1.78 | 0.40 | −0.58 | 0.98 | 1.54 | 36.10 | −50.28 | 2.75 | 1.37 | 1.46 | 1.81 |
| 069 | 73.70 | 43.70 | −40.71 | 1.61 | 1.33 | 0.28 | −0.92 | 0.83 | 1.55 | 42.70 | −42.06 | 2.00 | 0.39 | 1.00 | 2.02 |
| 070 | 73.10 | 40.50 | −44.60 | 1.15 | 1.23 | 0.08 | −0.81 | 0.71 | 1.52 | 30.10 | −58.82 | 2.28 | 1.13 | 1.16 | 1.92 |
| 071 | 70.40 | 34.40 | −51.14 | 1.18 | 1.22 | 0.04 | −0.89 | 0.65 | 1.54 | 32.40 | −53.98 | 2.03 | 0.85 | 1.00 | 1.97 |
| 072 | 72.00 | 39.80 | −44.72 | 1.43 | 0.86 | 0.57 | −1.04 | 0.39 | 1.43 | 33.50 | −53.47 | 1.62 | 0.19 | 0.75 | 1.89 |
| 073 | 70.90 | 33.40 | −52.69 | 1.23 | 0.95 | 0.28 | −1.10 | 0.35 | 1.45 | 34.30 | −51.62 | 1.71 | 0.48 | 0.62 | 1.79 |
| 074 | 71.80 | 35.70 | −50.28 | 1.43 | 1.16 | 0.27 | −0.83 | 0.67 | 1.50 | 29.40 | −59.05 | 1.98 | 0.55 | 0.94 | 1.72 |
| 075 | 69.70 | 35.30 | −49.35 | 1.06 | 1.00 | 0.06 | −0.86 | 0.87 | 1.43 | 36.60 | −47.20 | 1.61 | 0.55 | 0.67 | 1.77 |
| 076 | 59.40 | 37.50 | −36.67 | 1.38 | 1.56 | 0.18 | −0.82 | 0.94 | 1.76 | 43.50 | −26.77 | 2.26 | 0.88 | 1.09 | 1.53 |
| 077 | 70.00 | 34.60 | −50.57 | 1.37 | 1.76 | 0.39 | −0.77 | 0.93 | 1.70 | 30.80 | −56.00 | 2.16 | 0.81 | 1.02 | 1.91 |

TABLE 8-continued

INDUSTRIAL MAINTENANCE

| Formula | | | | | | | | | | | | | | | |
|---|---|---|---|---|---|---|---|---|---|---|---|---|---|---|---|
| 078 | 89.20 | 33.30 | −51.88 | 1.46 | 1.70 | 0.24 | −0.82 | 0.90 | 1.72 | 30.10 | −56.50 | 2.03 | 0.57 | 1.19 | 2.01 |
| 079 | 66.50 | 33.60 | −49.47 | 1.61 | 1.48 | 0.13 | −0.68 | 0.99 | 1.67 | 31.60 | −52.48 | 2.07 | 0.46 | 1.07 | 1.75 |
| 080 | 69.70 | 33.20 | −52.37 | 1.42 | 1.64 | 0.22 | −0.82 | 0.78 | 1.58 | 32.00 | −54.09 | 1.68 | 0.24 | 0.80 | 1.62 |
| 081 | 69.70 | 33.80 | −51.51 | 1.48 | 1.48 | 0.02 | −0.90 | 0.78 | 1.68 | 32.10 | −53.95 | 1.97 | 0.49 | 1.02 | 1.92 |
| 082 | 64.90 | 30.20 | −53.47 | 1.43 | 1.46 | 0.38 | −0.95 | 0.92 | 1.87 | 29.10 | −55.16 | 2.34 | 0.91 | 1.27 | 2.22 |
| 083 | 72.10 | 32.40 | −55.06 | 1.33 | 1.81 | 0.34 | −0.77 | 0.90 | 1.67 | 26.20 | −63.66 | 1.86 | 0.53 | 0.92 | 1.89 |
| 084 | 72.40 | 33.10 | −54.28 | 1.57 | 1.67 | 0.45 | −0.70 | 1.00 | 1.70 | 32.70 | −54.83 | 2.26 | 0.69 | 1.20 | 1.90 |
| 085 | 64.90 | 40.30 | −37.90 | 1.61 | 2.02 | 0.69 | −1.11 | 0.34 | 1.45 | 45.30 | −30.20 | 0.88 | 0.75 | 0.32 | 1.43 |
| 086 | 62.20 | 37.30 | −40.03 | 1.55 | 0.92 | 0.47 | −1.24 | 0.43 | 1.67 | 37.10 | −40.35 | 0.99 | 0.56 | 0.28 | 1.52 |
| 087 | 66.60 | 40.40 | −39.34 | 1.51 | 1.08 | 0.85 | −1.26 | 0.19 | 1.45 | 40.70 | −38.89 | 0.83 | 0.68 | 0.21 | 1.47 |
| 088 | 54.40 | 35.50 | −34.74 | 1.64 | 0.66 | 0.67 | −1.12 | 0.36 | 1.48 | 36.50 | −32.90 | 1.21 | 0.33 | −0.46 | 0.66 |
| Polyon 1900 | 94.50 | 94.50 | 0.00 | 4.40 | 0.87 | 0.40 | 0.14 | 0.73 | 0.59 | 91.60 | −3.07 | 4.96 | 0.56 | 0.70 | 0.56 |
| Centurion | 56.20 | 17.70 | −68.51 | 10.09 | 4.80 | 1.33 | 0.81 | 3.56 | 2.75 | 12.30 | −78.11 | 11.92 | 1.63 | 3.42 | 2.61 |
| Sher-cryl | 80.60 | 72.30 | −10.30 | 5.76 | 11.42 | 0.49 | 2.43 | 1.53 | −0.90 | 51.90 | −35.61 | 6.34 | 0.58 | 1.22 | −1.21 |
| 700T | 31.80 | 13.30 | −56.18 | 0.14 | 6.25 | 0.31 | 0.11 | −0.41 | −0.52 | 11.20 | −64.78 | 0.52 | 0.36 | −0.10 | −0.21 |
| HS+ | 86.50 | 69.80 | −19.31 | 3.04 | 0.45 | 0.98 | 3.89 | 2.63 | −1.38 | 82.90 | −4.16 | 4.11 | 1.07 | 2.59 | −1.30 |

Early Blister Resistance

| Formula | 2 Hour | | | 4 Hour | | | 5 Hour | | | Corrosion Weathering (5 cycle) | | | | Corrosion Weathering (6 cycles) | | | |
|---|---|---|---|---|---|---|---|---|---|---|---|---|---|---|---|---|---|
| | Blister Size | Blister Density | Rust | Blister Size | Blister Density | Rust | Blister Size | Blister Density | Rust | Blister Size | Blister Density | Rust | Scribe | Blister Size | Blister Density | Rust | Scribe |
| 001 | 4 | 3 | 2 | 2 | 2 | 3 | 4 | 2 | 4 | 10 | 5 | 8 | 7 | 10 | 5 | 10 | 6 |
| 002 | 2 | 3 | 1 | 2 | 2 | 3 | 10 | 5 | 3 | 10 | 5 | 10 | 7 | 10 | 5 | 10 | 8 |
| 003 | 10 | 5 | 1 | 2 | 3 | 2 | 2 | 3 | 2 | 10 | 5 | 9 | 7 | 10 | 5 | 10 | 6 |
| 004 | 6 | 3 | 2 | 4 | 4 | 4 | 6 | 1 | 1 | 10 | 5 | 10 | 8 | 10 | 3 | 9 | 6 |
| 005 | 10 | 5 | 1 | 4 | 3 | 4 | 4 | 3 | 2 | 10 | 5 | 8 | 6 | 6 | 5 | 10 | 6 |
| 006 | 4 | 3 | 1 | 2 | 3 | 2 | 6 | 3 | 2 | 10 | 5 | 9 | 8 | 10 | 5 | 10 | 7 |
| 007 | 10 | 5 | 9 | 10 | 5 | 9 | 6 | 4 | 8 | 10 | 5 | 8 | 7 | 10 | 5 | 10 | 7 |
| 008 | 10 | 5 | 9 | 10 | 5 | 9 | 2 | 2 | 10 | 10 | 5 | 8 | 7 | 10 | 4 | 9 | 7 |
| 009 | 10 | 5 | 8 | 10 | 5 | 8 | 6 | 3 | 8 | 10 | 4 | 8 | 7 | 6 | 5 | 9 | 7 |
| 010 | 10 | 5 | 8 | 10 | 5 | 9 | 2 | 2 | 8 | 10 | 5 | 6 | 6 | 10 | 5 | 9 | 7 |
| 011 | 4 | 4 | 3 | 4 | 3 | 3 | 6 | 3 | 8 | 10 | 5 | 9 | 8 | 10 | 5 | 10 | 9 |
| 012 | 10 | 5 | 4 | 10 | 5 | 9 | 4 | 2 | 9 | 10 | 5 | 9 | 7 | 10 | 5 | 10 | 6 |
| 013 | 4 | 2 | 4 | 4 | 4 | 10 | 4 | 3 | 9 | 10 | 5 | 9 | 7 | 10 | 5 | 10 | 9 |
| 014 | 4 | 4 | 6 | 6 | 4 | 9 | 4 | 2 | 8 | 10 | 5 | 8 | 7 | 10 | 4 | 10 | 8 |
| 015 | 10 | 5 | 6 | 10 | 5 | 9 | 6 | 3 | 8 | 10 | 5 | 9 | 7 | 10 | 5 | 10 | 8 |
| 016 | 10 | 5 | 8 | 10 | 5 | 9 | 6 | 2 | 8 | 10 | 5 | 8 | 7 | 10 | 5 | 10 | 8 |
| 017 | 10 | 5 | 8 | 10 | 5 | 9 | 4 | 2 | 8 | 10 | 5 | 7 | 7 | 10 | 5 | 9 | 7 |
| 018 | 10 | 5 | 9 | 10 | 5 | 9 | 6 | 3 | 10 | 10 | 5 | 9 | 7 | 10 | 5 | 10 | 8 |
| 019 | 10 | 5 | 9 | 10 | 5 | 9 | 4 | 1 | 7 | 10 | 5 | 9 | 6 | 10 | 5 | 10 | 8 |
| 020 | 10 | 5 | 6 | 6 | 3 | 6 | 6 | 3 | 3 | 10 | 5 | 7 | 7 | 10 | 5 | 10 | 9 |
| 021 | 10 | 5 | 6 | 6 | 3 | 6 | 4 | 3 | 7 | 10 | 5 | 7 | 7 | 10 | 4 | 10 | 9 |
| 022 | 10 | 5 | 9 | 10 | 5 | 8 | 4 | 1 | 8 | 10 | 5 | 9 | 7 | 8 | 5 | 10 | 8 |
| 023 | 10 | 5 | 2 | 10 | 5 | 2 | 4 | 3 | 6 | 10 | 5 | 8 | 7 | 10 | 5 | 10 | 8 |
| 031 | 2 | 2 | 2 | 2 | 1 | 2 | 4 | 1 | 5 | 10 | 5 | 8 | 8 | 10 | 5 | 10 | 7 |
| 032 | 4 | 2 | 2 | 4 | 2 | 2 | 2 | 2 | 5 | 10 | 5 | 8 | 7 | 10 | 5 | 10 | 6 |
| 033 | 2 | 3 | 2 | 2 | 2 | 2 | 2 | 3 | 5 | 10 | 5 | 10 | 8 | 10 | 5 | 10 | 6 |

TABLE 8-continued

INDUSTRIAL MAINTENANCE

| Sample | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| 034 | 2 | 2 | 1 | 2 | 2 | 1 | 6 | 2 | 1 | 10 | 5 | 5 | 9 | 7 | 10 | 5 | 10 | 8 |
| 035 | 2 | 3 | 1 | 2 | 2 | 1 | 4 | 1 | 5 | 10 | 5 | 5 | 9 | 8 | 10 | 5 | 10 | 7 |
| 036 | 2 | 2 | 2 | 2 | 2 | 2 | 5 | 6 | 6 | 10 | 5 | 5 | 9 | 6 | 8 | 3 | 10 | 7 |
| 037 | 2 | 2 | 1 | 2 | 2 | 1 | 3 | 2 | 10 | 10 | 5 | 5 | 9 | 8 | 10 | 5 | 10 | 8 |
| 038 | 8 | 3 | 3 | 3 | 2 | 1 | 5 | 2 | 6 | 10 | 5 | 5 | 9 | 8 | 10 | 5 | 10 | 8 |
| 039 | 2 | 1 | 2 | 2 | 4 | 1 | 3 | 2 | 7 | 10 | 5 | 5 | 7 | 7 | 10 | 5 | 10 | 6 |
| 040 | 2 | 3 | 1 | 2 | 2 | 1 | 4 | 1 | 5 | 10 | 5 | 5 | 7 | 6 | 10 | 5 | 10 | 7 |
| 041 | 2 | 3 | 3 | 2 | 4 | 1 | 5 | 2 | 4 | 10 | 5 | 5 | 8 | 8 | 10 | 5 | 10 | 4 |
| 042 | 6 | 3 | 1 | 2 | 2 | 3 | 2 | 4 | 3 | 10 | 5 | 5 | 8 | 8 | 9 | 5 | 9 | 9 |
| 043 | 4 | 2 | 1 | 4 | 3 | 3 | 1 | 3 | 3 | 10 | 5 | 5 | 9 | 7 | 10 | 5 | 10 | 6 |
| 044 | 4 | 3 | 2 | 2 | 2 | 2 | 2 | 2 | 3 | 10 | 5 | 5 | 9 | 7 | 10 | 5 | 9 | 7 |
| 045 | 2 | 2 | 1 | 2 | 2 | 1 | 2 | 2 | 4 | 10 | 5 | 5 | 9 | 6 | 10 | 5 | 9 | 7 |
| 046 | 6 | 3 | 1 | 6 | 4 | 2 | 2 | 2 | 3 | 10 | 5 | 5 | 7 | 6 | 10 | 5 | 10 | 5 |
| 047 | 2 | 2 | 1 | 4 | 2 | 2 | 2 | 2 | 3 | 10 | 5 | 5 | 6 | 7 | 10 | 5 | 9 | 6 |
| 048 | 4 | 3 | 1 | 4 | 3 | 3 | 3 | 4 | 3 | 10 | 5 | 5 | 6 | 7 | 10 | 5 | 10 | 6 |
| 049 | 4 | 2 | 1 | 2 | 2 | 2 | 3 | 2 | 4 | 10 | 5 | 5 | 9 | 6 | 10 | 5 | 10 | 6 |
| 050 | 2 | 3 | 1 | 2 | 4 | 2 | 2 | 2 | 3 | 10 | 5 | 5 | 9 | 7 | 10 | 5 | 10 | 7 |
| 051 | 2 | 3 | 1 | 2 | 4 | 2 | 2 | 2 | 3 | 10 | 5 | 5 | 9 | 8 | 10 | 5 | 10 | 7 |
| 052 | 10 | 5 | 1 | 6 | 6 | 3 | 2 | 3 | 1 | 10 | 5 | 5 | 10 | 8 | 10 | 5 | 10 | 9 |
| 053 | 4 | 3 | 1 | 2 | 2 | 3 | 3 | 2 | 3 | 10 | 5 | 5 | 9 | 9 | 10 | 5 | 10 | 9 |
| 054 | 2 | 1 | 1 | 4 | 4 | 2 | 3 | 4 | 4 | 10 | 5 | 5 | 9 | 7 | 10 | 4 | 8 | 7 |
| 055 | 2 | 3 | 1 | 2 | 2 | 1 | 5 | 2 | 6 | 10 | 5 | 5 | 5 | 6 | 10 | 5 | 10 | 6 |
| 067 | 2 | 1 | 2 | 4 | 2 | 2 | 6 | 2 | 10 | 10 | 5 | 5 | 8 | 7 | 8 | 5 | 10 | 6 |
| 068 | 2 | 2 | 1 | 2 | 2 | 1 | 10 | 2 | 10 | 10 | 5 | 5 | 9 | 8 | 10 | 5 | 10 | 6 |
| 069 | 2 | 1 | 1 | 2 | 4 | 1 | 10 | 4 | 10 | 10 | 5 | 5 | 9 | 8 | 10 | 5 | 10 | 8 |
| 070 | 2 | 3 | 2 | 4 | 4 | 1 | 10 | 2 | 10 | 10 | 5 | 5 | 6 | 7 | 10 | 5 | 10 | 7 |
| 071 | 2 | 1 | 1 | 2 | 2 | 1 | 10 | 2 | 10 | 10 | 5 | 5 | 9 | 7 | 10 | 5 | 10 | 6 |
| 072 | 2 | 1 | 1 | 2 | 4 | 1 | 4 | 2 | 10 | 10 | 5 | 5 | 9 | 7 | 10 | 5 | 10 | 8 |
| 073 | 2 | 1 | 1 | 2 | 2 | 1 | 10 | 2 | 10 | 10 | 5 | 5 | 9 | 7 | 10 | 5 | 10 | 7 |
| 074 | 2 | 1 | 1 | 2 | 2 | 1 | 10 | 2 | 10 | 10 | 5 | 5 | 6 | 7 | 10 | 6 | 9 | 7 |
| 075 | 2 | 1 | 4 | 4 | 4 | 2 | 7 | 2 | 10 | 10 | 5 | 5 | 9 | 8 | 10 | 6 | 9 | 8 |
| 076 | 2 | 6 | 2 | 4 | 2 | 2 | 10 | 4 | 10 | 10 | 5 | 5 | 9 | 7 | 10 | 5 | 10 | 7 |
| 077 | 2 | 3 | 10 | 6 | 2 | 1 | 10 | 2 | 10 | 10 | 5 | 5 | 8 | 8 | 10 | 5 | 10 | 7 |
| 078 | 2 | 4 | 3 | 2 | 2 | 1 | 8 | 4 | 10 | 10 | 5 | 5 | 10 | 7 | 10 | 5 | 10 | 7 |
| 079 | 2 | 4 | 4 | 2 | 2 | 1 | 9 | 2 | 10 | 10 | 5 | 5 | 7 | 7 | 10 | 5 | 10 | 6 |
| 080 | 2 | 5 | 5 | 2 | 2 | 1 | 10 | 2 | 10 | 10 | 5 | 5 | 9 | 7 | 10 | 5 | 9 | 7 |
| 081 | 2 | 7 | 7 | 2 | 2 | 1 | 10 | 2 | 10 | 10 | 5 | 5 | 9 | 7 | 10 | 5 | 10 | 8 |
| 082 | 2 | 1 | 10 | 2 | 2 | 1 | 10 | 2 | 10 | 10 | 5 | 5 | 9 | 8 | 10 | 5 | 10 | 8 |
| 083 | 2 | 1 | 10 | 2 | 2 | 1 | 10 | 2 | 10 | 10 | 5 | 5 | 8 | 8 | 10 | 5 | 10 | 8 |
| 084 | 2 | 4 | 10 | 4 | 4 | 1 | 10 | 2 | 6 | 10 | 5 | 5 | 9 | 7 | 10 | 5 | 10 | 7 |
| 085 | 2 | 2 | 2 | 2 | 2 | 1 | 3 | 2 | 4 | 10 | 5 | 5 | 10 | 6 | 10 | 5 | 10 | 6 |
| 086 | 2 | 2 | 2 | 2 | 2 | 2 | 3 | 1 | 4 | 10 | 5 | 5 | 10 | 8 | 10 | 5 | 10 | 9 |
| 087 | 2 | 1 | 3 | 2 | 2 | 2 | 3 | 2 | 8 | 10 | 5 | 5 | 9 | 7 | 10 | 5 | 10 | 7 |
| 088 | 2 | 3 | 2 | 4 | 4 | 4 | 4 | 4 | 10 | 10 | 5 | 5 | 8 | 6 | 10 | 5 | 10 | 6 |
| Polylon 1900 | 2 | 4(GL) | 10 | 2 | 4 | 10 | 10 | 5 | 5 | 10 | 6 | 10 | 5 | 10 | 6 | | | |
| Centurion | 2 | 4(GL) | 10 | 10 | 5(GL) | 10 | 10 | 5 | 5 | 9 | 8 | 10 | 5 | 10 | 7 | | | |
| Sher-cryl | 10 | 5(GL) | 10 | 10 | 5(GL) | 10 | 10 | 5 | 4 | 6 | 6 | 8 | 3 | 8 | 5 | | | |

Viscosity, settling, and pH Stability (6 weeks at 140 F.)

TABLE 8-continued

INDUSTRIAL MAINTENANCE

| Formula | initial KU | final KU | % change | initial ICI | final ICI | % change | initial pH | final pH | % change | settling amount | settling type |
|---|---|---|---|---|---|---|---|---|---|---|---|
| 001 | 96 | gelled | | 1.6 | gelled | | 9.58 | n/a | | n/a | n/a |
| 002 | 140 | gelled | | 1.18 | gelled | | 9.59 | n/a | | n/a | n/a |
| 003 | 94 | gelled | | 1.16 | gelled | | 9.43 | n/a | | n/a | n/a |
| 004 | 79 | gelled | | 1.88 | gelled | | 9.65 | n/a | | n/a | n/a |
| 005 | 136 | gelled | | 0.59 | gelled | | 9.61 | n/a | | n/a | n/a |
| 006 | 108 | gelled | | 1.83 | gelled | | 9.3 | n/a | | n/a | n/a |
| 007 | 91 | gelled | | 1.66 | gelled | | 9.48 | n/a | | n/a | n/a |
| 008 | 95 | gelled | | 1.88 | gelled | | 9.32 | n/a | | n/a | n/a |
| 009 | 68 | gelled | | 1.11 | gelled | | 9.42 | n/a | | n/a | n/a |
| 010 | 85 | gelled | | 0.492 | gelled | | 9.09 | n/a | | n/a | n/a |
| 011 | 83 | gelled | | 9.42 | gelled | | 9.14 | n/a | | n/a | n/a |
| 012 | 69 | gelled | | 0.66 | gelled | | 9.45 | n/a | | n/a | n/a |
| 013 | 74 | gelled | | 0.77 | gelled | | 9.32 | n/a | | n/a | n/a |
| 014 | 88 | gelled | | 0.56 | gelled | | 9.56 | n/a | | n/a | n/a |
| 015 | 61 | gelled | | 1.17 | gelled | | 9.52 | n/a | | n/a | n/a |
| 016 | 68 | gelled | | 1.12 | gelled | | 9.38 | n/a | | n/a | n/a |
| 017 | 61 | gelled | | 1.63 | gelled | | 9.52 | n/a | | n/a | n/a |
| 018 | 58 | gelled | | 0.68 | gelled | | 1.697 | n/a | | n/a | n/a |
| 019 | 63 | gelled | | 1.28 | gelled | | 9.47 | n/a | | n/a | n/a |
| 020 | 78 | gelled | | 2.34 | gelled | | 9.64 | n/a | | n/a | n/a |
| 021 | 69 | gelled | | 1.19 | gelled | | 9.53 | n/a | | n/a | n/a |
| 022 | 80 | gelled | | 0.78 | gelled | | 9.65 | n/a | | n/a | n/a |
| 023 | 70 | gelled | | 0.68 | gelled | | 9.48 | n/a | | n/a | n/a |
| 031 | 93 | gelled | | 1.37 | gelled | | 9.57 | n/a | | n/a | n/a |
| 032 | 72 | gelled | | 1.5 | gelled | | 9.24 | n/a | | n/a | n/a |
| 033 | 86 | 70 | −16.60 | 0.9 | 1.40 | 55.11 | 9.01 | 8.21 | −8.88 | 10 | soft |
| 034 | 90 | gelled | | 1.13 | gelled | | 9.44 | n/a | | n/a | n/a |
| 035 | 83 | gelled | | 1.95 | gelled | | 9.44 | n/a | | n/a | n/a |
| 036 | 88 | gelled | | 1.17 | gelled | | 9.33 | n/a | | n/a | n/a |
| 037 | 92 | gelled | | 0.85 | gelled | | 9.23 | n/a | | n/a | n/a |
| 038 | 86 | gelled | | 1.38 | gelled | | 9.55 | n/a | | n/a | n/a |
| 039 | 101 | gelled | | 0.77 | gelled | | 9.56 | n/a | | n/a | n/a |
| 040 | 88 | gelled | | 0.54 | gelled | | 9.4 | n/a | | n/a | n/a |
| 041 | 92 | gelled | | 1.79 | gelled | | 9.39 | n/a | | n/a | n/a |
| 042 | 85 | gelled | | 0.86 | gelled | | 9.44 | n/a | | n/a | n/a |
| 043 | 81 | gelled | | 0.7 | gelled | | 9.5 | n/a | | n/a | n/a |
| 044 | 85 | gelled | | 1.35 | gelled | | 9.49 | n/a | | n/a | n/a |
| 045 | 75 | gelled | | 1.16 | gelled | | 9.3 | n/a | | n/a | n/a |
| 046 | 73 | gelled | | 1.11 | gelled | | 9.22 | n/a | | n/a | n/a |
| 047 | 84 | gelled | | 0.7 | gelled | | 9.37 | n/a | | n/a | n/a |
| 048 | 80 | gelled | | 1.34 | gelled | | 9.53 | n/a | | n/a | n/a |
| 049 | 86 | gelled | | 1.66 | gelled | | 9.07 | n/a | | n/a | n/a |
| 050 | 68 | gelled | | 0.63 | gelled | | 9.4 | n/a | | n/a | n/a |
| 051 | 64 | gelled | | 2.88 | gelled | | 9.43 | n/a | | n/a | n/a |
| 052 | 138 | gelled | | 1.62 | gelled | | 9.65 | n/a | | n/a | n/a |
| 053 | 78 | gelled | | 1.34 | gelled | | 9.65 | n/a | | n/a | 20 | medium |
| 054 | 58 | gelled | | 1.48 | gelled | | 9.72 | n/a | | n/a | n/a |
| 055 | 87 | gelled | | 1.74 | gelled | | 9.32 | n/a | | n/a | n/a |

TABLE 8-continued

INDUSTRIAL MAINTENANCE

| | | | | | | | | |
|---|---|---|---|---|---|---|---|---|
| 067 | 89 | 110 | 23.60 | 0.85 | 1.29 | 51.53 | 9.81 | 9.05 | -7.75 | 60 | medium |
| 068 | 87 | 1637 | | 0.51 | 1.22 | 139.41 | 9.7 | 8.69 | -8.35 | 50 | med-hard |
| 069 | 98 | gelled | | 0.51 | gelled | | 9.71 | gelled | | 90 | med-hard |
| 070 | 77 | gelled | | 0.73 | gelled | | 9.75 | gelled | | 50 | med-hard |
| 071 | 85 | 94 | 10.59 | 1.55 | 0.67 | -58.71 | 9.76 | 9.04 | -7.38 | 75 | medium |
| 072 | 96 | n/a | | 0.52 | n/a | | 9.8 | n/a | | n/a | n/a |
| 073 | 90 | 107 | 18.89 | 0.41 | 1.26 | 208.05 | 9.73 | 9.08 | -6.68 | 50 | soft |
| 074 | 90 | 99 | 10.00 | 0.85 | 0.93 | 9.29 | 9.91 | 9.12 | -7.97 | 80 | soft |
| 075 | 90 | gelled | | 0.8 | n/a | | 9.73 | gelled | | 70 | medium |
| 076 | 84 | 70 | -16.67 | 0.84 | 0.79 | -5.71 | 9.67 | 8.93 | -7.65 | 20 | soft |
| 077 | 96 | 111 | 15.63 | 0.69 | 1.10 | 59.42 | 9.9 | 9.11 | -7.98 | 70 | soft |
| 078 | 94 | 109 | 15.96 | 0.63 | 0.88 | 40.16 | 9.9 | 9.14 | -7.68 | 50 | soft |
| 079 | 77 | 78 | 1.30 | 1.1 | 0.79 | -28.36 | 9.92 | 9.37 | -5.54 | 20 | medium |
| 080 | 85 | 93 | 9.41 | 0.97 | 0.75 | -22.27 | 9.78 | 8.97 | -8.28 | 60 | medium |
| 081 | 94 | 116 | 23.40 | 1.06 | 0.58 | -45.00 | 9.8 | 9.16 | -6.53 | 80 | soft |
| 082 | 83 | 86 | 3.61 | 0.71 | 0.29 | -59.44 | 9.67 | 8.8 | -9.00 | 20 | soft |
| 083 | 91 | gelled | | 1.1 | gelled | | 9.82 | gelled | | gelled | gelled |
| 084 | 83 | 94 | 13.25 | 0.74 | 0.98 | 31.76 | 9.78 | n/a | | 60 | medium |
| 085 | 87 | gelled | | 0.64 | gelled | | 9.01 | gelled | | gelled | gelled |
| 086 | 72 | gelled | | 1.05 | gelled | | 9.33 | gelled | | gelled | gelled |
| 087 | 83 | gelled | | 0.78 | gelled | | 9.35 | gelled | | gelled | gelled |
| 088 | 90 | gelled | | 0.95 | gelled | | 9.18 | gelled | | gelled | gelled |

GL = Gloss Loss
% settling is the relative ht on stirring stick that adheres w/o easily falling away

TABLE 9

OVEN BAKE

| Formula | Resin | Dispersant | Dispersant amount | Thickener | Film Build | Gloss 20 | Gloss 60 | Coppertone | Toluene | IPA | MEK | DWO | 10% Sulf | 10% NaOH | F409 |
|---|---|---|---|---|---|---|---|---|---|---|---|---|---|---|---|
| 001 | 3 | 2 | 1 | 3 | 1.74 | 4.2 | 23.3 | 3 | 3 | 5 | 3 | 3 | 3 | 3 | 5 |
| 002 | 3 | 8 | 1 | 5 | 1.71 | 18.5 | 56.7 | 4 | 3 | 5 | 4 | 3 | 3 | 5 | 5 |
| 003 | 3 | 7 | 1 | 5 | 1.86 | 35.3 | 68.3 | 4 | 2 | 3.5 | 3 | 3 | 5 | 4 | 1 |
| 004 | 3 | 2 | 1 | 6 | 1.66 | 6.5 | 33.8 | 5 | 5 | 4.5 | 4 | 2.5 | 5 | 5 | 4 |
| 005 | 3 | 11 | 1 | 7 | 1.88 | 19.3 | 63.1 | 4 | 2 | 5 | 3 | 3 | 5 | 5 | 2 |
| 006 | 3 | 3 | 1 | 7 | 1.91 | 13.1 | 50.1 | 3 | 4 | 6 | 4 | 2.5 | 5 | 4 | 6 |
| 007 | 4 | 1 | 2 | 7 | 1.60 | 26.1 | 61.5 | 4 | 5 | 5 | 2 | 3 | 5 | 3 | 6 |
| 008 | 4 | 5 | 2 | 5 | 1.74 | 25.5 | 62.4 | 4.5 | 5 | 5 | 5 | 3.5 | 2 | 5 | 5 |
| 009 | 4 | 3 | 2 | 3 | 1.61 | 23.5 | 59.4 | 5 | 3 | 5 | 5 | 3.5 | 5 | 5 | 5 |
| 010 | 4 | 10 | 2 | 2 | 1.62 | 6.8 | 34.4 | 3 | 3 | 5 | 4 | 2 | 2 | 4.5 | 5 |
| 011 | 4 | 10 | 2 | 2 | 1.48 | 3.8 | 23.6 | 3 | 3 | 4 | 4 | 2 | 3 | 3 | 5 |
| 012 | 4 | 3 | 2 | 7 | 1.61 | 14.4 | 45.3 | 3 | 4 | 4 | 3 | 2 | 3 | 3 | 4.5 |
| 013 | 4 | 8 | 2 | 7 | 1.85 | 6.8 | 34.1 | 3 | 5 | 5 | 4 | 2 | 5 | 5 | 5 |
| 014 | 4 | 11 | 2 | 8 | 1.60 | 26.0 | 56.7 | 3.5 | 5 | 5 | 5 | 3.5 | 5 | 5 | 4 |
| 015 | 4 | 1 | 1 | 2 | 1.88 | 21.8 | 59.2 | 3.5 | 3 | 3 | 3 | 2 | 3 | 4.5 | 4 |
| 016 | 4 | 5 | 1 | 3 | 1.48 | 30.5 | 63.2 | 4 | 3.5 | 5 | 3 | 2 | 3 | 3 | 4 |
| 017 | 4 | 1 | 1 | 8 | 1.72 | 12.6 | 47.1 | 4.5 | 3 | 4 | 3 | 2 | 5 | 5 | 4.5 |
| 018 | 4 | 2 | 1 | 4 | 1.62 | 23.9 | 62.0 | 3 | 3 | 5 | 3 | 2 | 2 | 5 | 5 |
| 019 | 4 | 7 | 1 | 1 | 1.71 | 7.8 | 38.9 | 5 | 5 | 4 | 5 | 3.5 | 5 | 3 | 4 |
| 020 | 4 | 11 | 1 | 4 | 1.70 | 28.5 | 60.6 | 4 | 5 | 4 | 3 | 2 | 5 | 3 | 5 |
| 021 | 4 | 3 | 1 | 6 | 1.64 | 31.4 | 63.0 | 3.5 | 5 | 4.5 | 5 | 2.5 | 5 | 5 | 4.5 |
| 022 | 4 | 11 | 1 | 2 | 1.81 | 22.6 | 59.5 | 4 | 4 | 5 | 5 | 3 | 4 | 5 | 5 |
| 023 | 4 | 3 | 1 | 7 | 1.67 | 29.9 | 66.4 | 3 | 5 | 5 | 4 | 2 | 6 | 3 | 6 |
| 031 | 2 | 2 | 2 | 1 | 1.63 | 20.9 | 55.9 | 3 | 3 | 5 | 4 | 1 | 5 | 5 | 2 |
| 032 | 2 | 3 | 2 | 6 | 1.39 | 39.3 | 68.4 | 4 | 5 | 5 | 5 | 3.5 | 5 | 5 | 2 |
| 033 | 2 | 4 | 2 | 8 | 1.60 | 11.8 | 44.6 | 4 | 3 | 3.5 | 3 | 2 | 5 | 5 | 3 |
| 034 | 2 | 1 | 1 | 7 | 1.69 | 22.9 | 60.3 | 4 | 3 | 5 | 3.5 | 3.5 | 5 | 5 | 3 |
| 035 | 2 | 1 | 1 | 5 | 1.61 | 12.7 | 46.4 | 4 | 3 | 5 | 3 | 3 | 5 | 5 | 3 |
| 036 | 2 | 3 | 1 | 4 | 1.59 | 15.5 | 49.3 | 4 | 3 | 4.5 | 3 | 3 | 5 | 5 | 3 |
| 037 | 2 | 8 | 1 | 4 | 1.57 | 14.2 | 47.2 | 4.5 | 3 | 4.5 | 4 | 3 | 5 | 5 | 3 |
| 038 | 2 | 11 | 1 | 2 | 1.74 | 42.8 | 71.5 | 4 | 2 | 5 | 4 | 3 | 5 | 3 | 3 |
| 039 | 2 | 2 | 1 | 8 | 1.78 | 24.3 | 59.7 | 3.5 | 3 | 5 | 4 | 3.5 | 5 | 5 | 3 |
| 040 | 2 | 7 | 1 | 8 | 1.51 | 27.4 | 62.8 | 4 | 3 | 4 | 3 | 3 | 5 | 3 | 3 |
| 041 | 2 | 7 | 1 | 6 | 1.46 | 22.3 | 58.9 | 3 | 4 | 5 | 3 | 3 | 5 | 5 | 2 |
| 042 | 3 | 1 | 2 | 4 | 1.80 | 22.4 | 59.2 | 4 | 2 | 4 | 3 | 3.5 | 5 | 5 | 2 |
| 043 | 3 | 1 | 2 | 1 | 1.60 | 16.2 | 51.4 | 3.5 | 3.5 | 5 | 3 | 3 | 5 | 4.5 | 3 |
| 044 | 3 | 1 | 2 | 7 | 1.91 | 6.2 | 33.9 | 2 | 2 | 4 | 3 | 3 | 5 | 5 | 3 |
| 045 | 3 | 5 | 2 | 8 | 1.72 | 30.9 | 64.9 | 4 | 2 | 3 | 2 | 3 | 2 | 3 | 2 |
| 046 | 3 | 8 | 2 | 3 | 1.83 | 6.5 | 31.3 | 5 | 3 | 5 | 3 | 3.5 | 5 | 5 | 4 |
| 047 | 3 | 7 | 2 | 1 | 1.40 | 32.8 | 66.5 | 4 | 2 | 3 | 2 | 3.5 | 5 | 4 | 2 |
| 048 | 3 | 11 | 2 | 3 | 1.83 | 27.7 | 63.4 | 4 | 2 | 3 | 2 | 3 | 5 | 5 | 2 |
| 049 | 3 | 8 | 2 | 6 | 1.36 | 26.8 | 65.2 | 4 | 3 | 5 | 3 | 3 | 4 | 4 | 3.5 |
| 050 | 3 | 3 | 2 | 5 | 1.87 | 13.0 | 46.7 | 4 | 3 | 3 | 2.5 | 3 | 3.5 | 3 | 3 |
| 051 | 3 | 5 | 1 | 4 | 1.71 | 23.9 | 63.2 | 4 | 5 | 5 | 5 | 3.5 | 4.5 | 3 | 3 |
| 052 | 3 | 9 | 1 | 1 | 1.54 | 24.4 | 60.1 | 3 | 5 | 5 | 3 | 3.5 | 5 | 5 | 5 |
| 053 | 3 | 9 | 1 | 2 | 1.56 | 21.7 | 57.2 | 4.5 | 3 | 5 | 3 | 2.5 | 3 | 3 | 3 |
| 054 | 2 | 8 | 1 | 4 | 1.67 | 10.0 | 45.2 | 3 | 2 | 5 | 3 | 3.5 | 5 | 5 | 3 |
| 055 | 3 | 8 | 2 | 4 | 1.33 | 7.5 | 34.3 | 5 | 2 | 5 | 3.5 | 2.5 | 3 | 3 | 4 |
| 067 | 1 | 5 | 2 | 3 | 1.66 | 25.5 | 63.3 | 4 | 3 | 4 | 3 | 2 | 2 | 5 | 5 |
| 068 | 1 | 1 | 2 | 6 | 1.72 | 33.3 | 68.5 | 3 | 3 | 4.5 | 4 | 3 | 2 | 3 | 5 |
| 069 | 1 | 8 | 2 | 2 | 1.63 | 31.6 | 68.8 | 3 | 3 | 4 | 3 | 3 | 5 | 5 | 4 |
| 070 | 1 | 3 | 2 | 2 | 1.60 | 30.1 | 67.7 | 4 | 3 | 4 | 3 | 2 | 3 | 3 | 3 |
| 071 | 1 | 3 | 2 | 2 | 1.50 | 28.7 | 65.2 | 3.5 | 3 | 3 | 3 | 2.5 | 2 | 5 | 4 |
| 072 | 1 | 11 | 2 | 5 | 1.65 | 40.9 | 71.0 | 3 | 3 | 4.5 | 3.5 | 2 | 5 | 3 | 4 |
| 073 | 1 | 7 | 2 | 6 | 1.69 | 32.9 | 67.4 | 4 | 2 | 4 | 2 | 2 | 3 | 5 | 3 |
| 074 | 1 | 2 | 2 | 5 | 1.52 | 27.9 | 68.3 | 3.5 | 3.5 | 5 | 3.5 | 2 | 5 | 5 | 5 |
| 075 | 1 | 5 | 1 | 2 | 1.97 | 28.9 | 66.6 | 4 | 3 | 3.5 | 3 | 2.5 | 5 | 5 | 5 |
| 076 | 1 | 6 | 1 | 1 | 2.13 | 24.8 | 61.0 | 4 | 3 | 4 | 3 | 2 | 5 | 5 | 5 |
| 077 | 1 | 9 | 1 | 5 | 1.57 | 28.7 | 65.4 | 4 | 3 | 4 | 3 | 2 | 4.5 | 4 | 5 |
| 078 | 1 | 9 | 1 | 4 | 1.91 | 30.3 | 65.7 | 4 | 3.5 | 4 | 3 | 3 | 5 | 4 | 4 |
| 079 | 1 | 2 | 1 | 1 | 2.70 | 24.6 | 61.7 | 4 | 3 | 3 | 4.5 | 3 | 5 | 5 | 4.5 |
| 080 | 1 | 3 | 1 | 8 | 2.32 | 32.8 | 66.5 | 3.5 | 3 | 5 | 3 | 3 | 4 | 3 | 4 |
| 081 | 1 | 7 | 1 | 3 | 1.70 | 32.1 | 65.7 | 4 | 5 | 5 | 3 | 3 | 4.5 | 4.5 | 4.5 |
| 082 | 1 | 10 | 1 | 1 | 1.94 | 28.0 | 63.6 | 4 | 3 | 3 | 2.5 | 2 | 5 | 5 | 4 |
| 083 | 1 | 9 | 1 | 5 | 1.57 | 29.4 | 67.0 | 4 | 3 | 5 | 4 | 2 | 3 | 3 | 4 |
| 084 | 1 | 3 | 1 | 6 | 1.80 | 32.8 | 67.0 | 3 | 3 | 4 | 3 | 3 | 5 | 5 | 4.5 |
| 085 | 2 | 1 | 2 | 3 | 1.48 | 32.5 | 65.3 | 3 | 3 | 4 | 3 | 3.5 | 5 | 5 | 3 |
| 086 | 2 | 5 | 2 | 7 | 1.40 | 26.4 | 61.4 | 4 | 3 | 4 | 3 | 3.5 | 5 | 5 | 3 |
| 087 | 2 | 5 | 2 | 7 | 1.54 | 36.6 | 68.6 | 3 | 2.5 | 4 | 2 | 3.5 | 5 | 3 | 3 |
| 088 | 2 | 8 | 2 | 4 | 2.05 | 18.0 | 51.4 | 4 | 4 | 5 | 6 | 3.5 | 5 | 5 | 3 |
| KA 1400 | | | | | 1.28 | 77.8 | 96.7 | 4.5 | 4 | 5 | 2 | 5 | 5 | 5 | 5 |

TABLE 9-continued

OVEN BAKE

| KA 1700T | | | | 1.49 | 4.1 | 25.4 | 4 | 3 | 5 | 4 | 4 | 2 | 5 | 5 |

| | | | Humidity-200 hours | | | | | Salt Spray-100 HOURS | | | |
|---|---|---|---|---|---|---|---|---|---|---|---|
| Formula | Pencil Hardness | Blister size | Blister density | Rust | Flash rust- Y or N | Gloss 60 | % change 60 gloss | Blister size | Blister density | Rust | Scribe |
| 001 | 6 | 8 | 1 | 10 | no | 12.5 | −46.35% | 6 | 4 | 8 | 5 |
| 002 | 6 | 8 | 1 | 10 | yes | 17 | −70.02% | 6 | 4 | 8 | 4 |
| 003 | 6 | 8 | 1 | 8 | yes | 14.6 | −78.62% | 8 | 4 | 9 | 4 |
| 004 | 6 | 8 | 1 | 10 | no | 14.9 | −55.92% | 8 | 4 | 8 | 4 |
| 005 | 6 | 6 | 1 | 10 | yes | 16.7 | −73.53% | 8 | 4 | 8 | 4 |
| 006 | 6 | 8 | 1 | 10 | Yes | 15.6 | −68.88% | 8 | 3 | 9 | 5 |
| 007 | 8 | 6 | 1 | 9 | yes | 7.3 | −88.13% | 6 | 4 | 8 | 3 |
| 008 | 7 | 6 | 1 | 8 | yes | 7.4 | −88.14% | 6 | 4 | 9 | 3 |
| 009 | 6 | 4 | 1 | 10 | yes | 5.7 | −90.40% | 8 | 4 | 8 | 1 |
| 010 | 6 | 6 | 1 | 9 | yes | 5.7 | −83.43% | 6 | 3 | 8 | 1 |
| 011 | 6 | 6 | 1 | 10 | yes | 4.7 | −80.08% | 8 | 3 | 6 | 2 |
| 012 | 6 | 4 | 1 | 8 | yes | 5.7 | −87.42% | 6 | 4 | 7 | 2 |
| 013 | 6 | 6 | 1 | 9 | yes | 8.3 | −75.66% | 8 | 4 | 8 | 3 |
| 014 | 6 | 6 | 1 | 10 | yes | 9.9 | −82.54% | 8 | 4 | 8 | 3 |
| 015 | 6 | 2 | 1 | 9 | no | 6.7 | −88.68% | 8 | 4 | 7 | 3 |
| 016 | 6 | 4 | 1 | 10 | no | 7.4 | −88.29% | 8 | 4 | 9 | 2 |
| 017 | 6 | 4 | 1 | 9 | yes | 6.3 | −86.62% | 6 | 4 | 7 | 3 |
| 018 | 6 | 2 | 1 | 9 | no | 9.6 | −84.19% | 6 | 4 | 7 | 4 |
| 019 | 6 | 4 | 1 | 10 | yes | 4.4 | −88.08% | 6 | 3 | 5 | 0 |
| 020 | 6 | 4 | 1 | 9 | no | 8.1 | −86.63% | 6 | 4 | 6 | 2 |
| 021 | 5 | 4 | 1 | 10 | yes | 9.1 | −85.56% | 10 | 5 | 9 | 3 |
| 022 | 6 | 4 | 1 | 10 | yes | 7.9 | −86.72% | 6 | 4 | 7 | 3 |
| 023 | 6 | 4 | 1 | 7 | no | 11.9 | −81.80% | 8 | 4 | 8 | 3 |
| 031 | 6 | 8 | 1 | 5 | yes | 21.4 | −61.72% | 6 | 3 | 9 | 2 |
| 032 | 6 | 8 | 1 | 7 | yes | 25.7 | −62.43% | 8 | 4 | 8 | 3 |
| 033 | 6 | 8 | 1 | 8 | yes | 15 | −66.37% | 8 | 4 | 7 | 3 |
| 034 | 6 | 4 | 1 | 7 | yes | 24.6 | −59.20% | 10 | 5 | 10 | 4 |
| 035 | 6 | 8 | 1 | 6 | yes | 17.9 | −61.42% | 8 | 4 | 7 | 3 |
| 036 | 6 | 8 | 1 | 10 | yes | 15.7 | −68.15% | 8 | 4 | 9 | 3 |
| 037 | 6 | | | | | | −100.00% | 8 | 4 | 7 | 4 |
| 038 | 6 | 8 | 1 | 9 | yes | 22.2 | −68.95% | 6 | 3 | 7 | 3 |
| 039 | 4 | 8 | 1 | 10 | no | 16.3 | −72.70% | 6 | 4 | 6 | 4 |
| 040 | 5 | 6 | 1 | 6 | yes | 26.6 | −57.64% | 8 | 3 | 6 | 3 |
| 041 | 6 | 8 | 1 | 9 | yes | 22.1 | −62.48% | 8 | 4 | 7 | 4 |
| 042 | 6 | 6 | 1 | 7 | yes | 15.4 | −73.99% | 10 | 5 | 8 | 3 |
| 043 | 6 | 8 | 1 | 10 | yes | 16.8 | −67.32% | 6 | 4 | 6 | 3 |
| 044 | 6 | 8 | 1 | 10 | no | 20.1 | −40.71% | 8 | 3 | 9 | 4 |
| 045 | 6 | 8 | 1 | 10 | yes | 17 | −73.81% | 8 | 4 | 9 | 3 |
| 046 | 6 | 8 | 1 | 10 | no | 18.1 | −42.17% | 6 | 4 | 6 | 4 |
| 047 | 6 | 8 | 1 | 10 | yes | 23 | −65.41% | 6 | 3 | 8 | 4 |
| 048 | 6 | 8 | 1 | 10 | yes | 16.8 | −73.50% | 6 | 4 | 9 | 4 |
| 049 | 6 | 8 | 1 | 9 | yes | 25.7 | −60.58% | 8 | 4 | 8 | 4 |
| 050 | 6 | 8 | 1 | 10 | yes | 14.9 | −68.09% | 8 | 4 | 8 | 4 |
| 051 | 6 | 8 | 1 | 10 | yes | 13.7 | −78.32% | 6 | 3 | 9 | 4 |
| 052 | 6 | 8 | 1 | 10 | yes | 12.9 | −78.54% | 8 | 3 | 9 | 4 |
| 053 | 6 | 8 | 1 | 10 | yes | 15.7 | −72.55% | 8 | 4 | 9 | 4 |
| 054 | 6 | 8 | 1 | 10 | yes | 15 | #REFI | 8 | 4 | 8 | 4 |
| 055 | 6 | 8 | 1 | 10 | no | 15 | #REFI | 6 | 3 | 4 | 3 |
| 067 | 6 | 8 | 1 | 8 | no | 13.1 | −79.30% | 8 | 4 | 4 | 2 |
| 068 | 6 | none | | 10 | yes | 19 | −72.26% | 10 | 5 | 8 | 2 |
| 069 | 6 | 8 | 1 | 7 | yes | 18.4 | −73.26% | 8 | 4 | 8 | 2 |
| 070 | 6 | 8 | 1 | 8 | yes | 19.5 | −71.20% | 10 | 5 | 10 | 2 |
| 071 | 6 | 8 | 1 | 8 | yes | 19.4 | −70.25% | 8 | 4 | 7 | 2 |
| 072 | 6 | none | | 10 | yes | 19.6 | −72.39% | 8 | 3 | 8 | 1 |
| 073 | 6 | 8 | 1 | 10 | no | 16.4 | −75.67% | 8 | 4 | 9 | 2 |
| 074 | 6 | 8 | 1 | 10 | yes | 15.9 | −76.02% | 8 | 4 | 8 | 2 |
| 075 | 6 | none | | 6 | yes | 14.5 | −78.23% | 8 | 4 | 8 | 2 |
| 076 | 6 | 8 | 1 | 9 | yes | 13.3 | −78.20% | 8 | 4 | 8 | 2 |
| 077 | 6 | 8 | 1 | 9 | yes | 15.7 | −75.99% | 8 | 4 | 8 | 2 |
| 078 | 6 | 8 | 4 | 10 | no | 23.8 | −63.77% | 8 | 4 | 9 | 3 |
| 079 | 6 | 8 | 1 | 9 | yes | 17.2 | −72.12% | 6 | 4 | 8 | 2 |
| 080 | 6 | 8 | 1 | 9 | yes | 14.7 | −77.89% | 8 | 4 | 9 | 2 |
| 081 | 6 | 8 | 1 | 10 | yes | 16.8 | −74.43% | 8 | 4 | 8 | 2 |
| 082 | 6 | 8 | 1 | 10 | no | 12.9 | −79.72% | 8 | 4 | 9 | 2 |
| 083 | 6 | 8 | 1 | 10 | no | 14.3 | −78.68% | 10 | 5 | 9 | 2 |
| 084 | 6 | 8 | 1 | 10 | yes | 21.7 | −67.61% | 8 | 4 | 9 | 2 |
| 085 | 6 | 8 | 1 | 7 | yes | 17.6 | −73.05% | 6 | 4 | 6 | 3 |
| 086 | 6 | 8 | 1 | 6 | yes | 16.8 | −72.64% | 8 | 4 | 8 | 3 |
| 087 | 6 | 8 | 1 | 7 | yes | 20.9 | −69.53% | 8 | 4 | 8 | 3 |
| 088 | 6 | 8 | 1 | 9 | yes | 16.8 | −67.32% | 10 | 5 | 8 | 4 |

TABLE 9-continued

| | | | | OVEN BAKE | | | | | | | |
|---|---|---|---|---|---|---|---|---|---|---|---|
| KA 1400 | 4 | none | | 10 | no | 96.5 | 8 | 4 | 10 | 2 | |
| KA 1700T | 9 | none | | 10 | no | 19.4 | 4 | 2 | 4 | 7 | |

| | Self Spray-200 HOURS | | | | | | | 48 Hr. Water-Soak | | | |
|---|---|---|---|---|---|---|---|---|---|---|---|
| | | Blister | | | Impact | | | Adhesion treated | Blister | Blister | | |
| Formula | Blister size | density | Rust | Scribe | Forward | Reverse | MEK Rubs | aluminum | size | density | Rust | Adhesion |
| 001 | 6 | 4 | 8 | 5 | 24 | <4 | 100 | 4 | 10 | 5 | 10 | 5 |
| 002 | 6 | 4 | 8 | 4 | 24 | <4 | 150 | 5 | 10 | 5 | 10 | 5 |
| 003 | 8 | 4 | 9 | 4 | 24 | <4 | 500 | 4 | 10 | 5 | 10 | 5 |
| 004 | 8 | 4 | 8 | 4 | 24 | <4 | 150 | 3 | 10 | 5 | 9 | 4 |
| 005 | 8 | 4 | 8 | 4 | 20 | <4 | 250 | 4 | 10 | 5 | 10 | 4 |
| 006 | 8 | 3 | 9 | 5 | 24 | <4 | 200 | 3 | 10 | 5 | 10 | 5 |
| 007 | 8 | 4 | 8 | 3 | 20 | <4 | 700 | 4 | 4 | 3 | 9 | 2 |
| 008 | 6 | 4 | 9 | 2 | 28 | <4 | 1000 | 3 | 4 | 2 | 10 | −1 |
| 009 | 8 | 4 | 6 | 0 | 28 | <4 | 1000 | 3 | 4 | 3 | 10 | −1 |
| 010 | 6 | 3 | 8 | 2 | 24 | <4 | 800 | 4 | 10 | 5 | 10 | 3 |
| 011 | 8 | 3 | 5 | 2 | 24 | <4 | 1000 | 3 | 10 | 5 | 10 | 4 |
| 012 | 6 | 4 | 7 | 2 | 28 | <4 | 1000 | 4 | 6 | 2 | 5 | 5 |
| 013 | 8 | 4 | 8 | 3 | 24 | 8 | 650 | 4 | 10 | 5 | 10 | 4 |
| 014 | 8 | 4 | 8 | 3 | 32 | <4 | 450 | 5 | 4 | 3 | 10 | 2 |
| 015 | 8 | 4 | 7 | 3 | 28 | 4 | 1000 | 4 | 10 | 5 | 10 | 5 |
| 016 | 8 | 4 | 9 | 2 | 24 | <4 | 250 | 4 | 6 | 2 | 10 | 2 |
| 017 | 6 | 4 | 7 | 3 | 24 | <4 | 1000 | 3 | 6 | 3 | 5 | 4 |
| 018 | 6 | 4 | 6 | 4 | 24 | <4 | 450 | 3 | 8 | 2 | 2 | 4 |
| 019 | 6 | 3 | 6 | 0 | 24 | 4 | 800 | 3 | 4 | 3 | 4 | 3 |
| 020 | 6 | 4 | 6 | 2 | 28 | <4 | 1000 | 3 | 4 | 3 | 10 | 3 |
| 021 | 10 | 5 | 9 | 3 | 28 | <4 | 950 | 4 | 6 | 3 | 7 | 4 |
| 022 | 6 | 4 | 7 | 3 | 24 | <4 | 1000 | 3 | 8 | 4 | 10 | 5 |
| 023 | 8 | 4 | 4 | 2 | 24 | <4 | 1000 | 3 | 4 | 3 | 6 | 4 |
| 031 | 6 | 3 | 9 | 2 | 20 | <4 | 250 | 4 | 10 | 5 | 10 | 4 |
| 032 | 8 | 4 | 8 | 3 | 20 | <4 | 150 | 4 | 10 | 5 | 10 | 5 |
| 033 | 8 | 4 | 7 | 3 | 20 | <4 | 100 | 5 | 10 | 5 | 8 | 5 |
| 034 | 10 | 5 | 10 | 4 | 20 | <4 | 600 | 2 | 10 | 5 | 10 | 5 |
| 035 | 6 | 4 | 7 | 3 | 20 | <4 | 150 | 5 | 10 | 5 | 10 | 5 |
| 036 | 8 | 4 | 9 | 3 | 20 | <4 | 150 | 4 | 10 | 5 | 10 | 5 |
| 037 | 8 | 4 | 7 | 4 | 20 | <4 | 200 | 4 | 10 | 5 | 10 | 5 |
| 038 | 6 | 3 | 7 | 3 | 20 | <4 | 200 | 3 | 10 | 5 | 9 | 4 |
| 039 | 6 | 4 | 6 | 4 | 20 | <4 | 50 | 2 | 10 | 5 | 9 | 4 |
| 040 | 8 | 3 | 6 | 3 | 20 | <4 | 50 | 3 | 10 | 5 | 10 | 4 |
| 041 | 8 | 4 | 7 | 4 | 20 | <4 | 50 | 3 | 10 | 5 | 10 | 4 |
| 042 | 10 | 5 | 8 | 3 | 24 | <4 | 61 | 4 | 10 | 5 | 10 | 4 |
| 043 | 6 | 4 | 6 | 3 | 24 | <4 | 50 | 5 | 10 | 5 | 10 | 5 |
| 044 | 8 | 3 | 9 | 4 | 24 | <4 | 120 | 5 | 10 | 5 | 10 | 5 |
| 045 | 8 | 4 | 9 | 3 | 24 | <4 | 850 | 5 | 10 | 5 | 9 | 5 |
| 046 | 8 | 4 | 6 | 4 | 20 | <4 | 100 | 4 | 10 | 5 | 10 | 5 |
| 047 | 6 | 3 | 7 | 3 | 24 | <4 | 400 | 4 | 10 | 5 | 10 | 5 |
| 048 | 6 | 4 | 9 | 5 | 28 | <4 | 150 | 4 | 10 | 5 | 10 | 5 |
| 049 | 8 | 4 | 8 | 4 | 24 | <4 | 150 | 4 | 10 | 5 | 10 | 4 |
| 050 | 8 | 4 | 8 | 4 | 24 | <4 | 450 | 5 | 10 | 5 | 9 | 4 |
| 051 | 6 | 3 | 9 | 4 | 20 | <4 | 550 | 1 | 10 | 5 | 10 | 5 |
| 052 | 8 | 3 | 9 | 4 | 20 | <4 | 700 | 3 | 10 | 5 | 10 | 5 |
| 053 | 8 | 4 | 9 | 4 | 24 | <4 | 650 | 3 | 10 | 5 | 10 | 5 |
| 054 | 8 | 4 | 8 | 4 | 20 | <4 | 50 | 1 | 10 | 5 | 8 | 5 |
| 055 | 6 | 3 | 4 | 3 | 24 | <4 | 200 | 5 | 10 | 5 | 7 | 5 |
| 067 | 8 | 4 | 4 | 2 | 24 | <4 | 400 | 0 | 6 | 2 | 10 | 4 |
| 068 | 10 | 5 | 8 | 2 | 24 | <4 | 750 | 0 | 10 | 5 | 10 | 4 |
| 069 | 8 | 4 | 8 | 2 | 24 | <4 | 700 | 4 | 8 | 2 | 10 | 5 |
| 070 | 10 | 5 | 10 | 2 | 24 | <4 | 600 | 1 | 8 | 2 | 10 | 4 |
| 071 | 8 | 4 | 7 | 2 | 24 | <4 | 1000 | 1 | 6 | 2 | 10 | 4 |
| 072 | 8 | 3 | 8 | 1 | 24 | <4 | 500 | 0 | 10 | 5 | 10 | 5 |
| 073 | 8 | 4 | 9 | 2 | 24 | <4 | 650 | 1 | 8 | 2 | 10 | 3 |
| 074 | 8 | 4 | 8 | 2 | 24 | <4 | 750 | 0 | 10 | 5 | 10 | 5 |
| 075 | 8 | 4 | 8 | 2 | 24 | <4 | 50 | 0 | 6 | 4 | 10 | 4 |
| 076 | 8 | 4 | 8 | 2 | 20 | <4 | 800 | 0 | 10 | 5 | 10 | 5 |
| 077 | 8 | 4 | 8 | 2 | 24 | <4 | 1000 | 0 | 6 | 3 | 9 | 1 |
| 078 | 8 | 4 | 9 | 3 | 24 | <4 | 900 | 0 | 8 | 3 | 10 | 1 |
| 079 | 6 | 4 | 8 | 2 | 20 | <4 | 750 | 0 | 8 | 4 | 10 | 5 |
| 080 | 8 | 4 | 9 | 2 | 24 | <4 | 550 | 4 | 6 | 2 | 10 | 4 |
| 081 | 8 | 4 | 8 | 2 | 24 | <4 | 1000 | 0 | 8 | 4 | 10 | 4 |
| 082 | 8 | 4 | 9 | 2 | 24 | <4 | 1000 | 1 | 8 | 4 | 10 | 5 |
| 083 | 10 | 5 | 9 | 3 | 24 | <4 | 700 | 0 | 6 | 4 | 9 | 4 |
| 084 | 8 | 4 | 9 | 2 | 24 | <4 | 700 | 1 | 10 | 5 | 10 | 5 |
| 085 | 6 | 4 | 6 | 3 | 20 | <4 | 50 | 3 | 8 | 4 | 10 | 4 |
| 086 | 8 | 4 | 8 | 3 | 20 | <4 | 50 | 4 | 10 | 5 | 10 | 5 |

TABLE 9-continued

OVEN BAKE

| | | | | | | | | | | | | |
|---|---|---|---|---|---|---|---|---|---|---|---|---|
| 087 | 8 | 4 | 8 | 3 | 20 | <4 | 50 | 3 | 10 | 5 | 10 | 4 |
| 088 | 10 | 5 | 7 | 4 | 20 | <4 | 50 | 4 | 10 | 5 | 10 | 4 |
| KA 1400 | 8 | 4 | 10 | 2 | >168 | >168 | 650 | 5 | 10 | 5 | 10 | 5 |
| KA 1700T | 4 | 2 | 4 | 7 | 66 | 4 | 1000 | 5 | 10 | 5 | 10 | 2 |

| | QUV-Initial | | | QUV-500-HOUR | | | | | | QUV-1000-HOUR | | | | |
|---|---|---|---|---|---|---|---|---|---|---|---|---|---|---|
| Formula | 60° Gloss | Delta E | Delta YB | 60° Gloss | Delta E | Delta YB | % Loss of 60 gloss | Change in delta E | Change in YB | 60° Gloss | Delta E | Delta YB | % Loss of 60 gloss | Change in delta E | Change in YB |
| 001 | 29.1 | 0.98 | −0.21 | 18.7 | 2.85 | 1.24 | −35.74% | 1.89 | 1.45 | 18.5 | 2.00 | 0.55 | −36.43% | 1.04 | 0.76 |
| 002 | MISSING PANEL | | | MISSING PANEL | | | | | | MISSING PANEL | | | | | |
| 003 | 68.5 | 0.31 | −0.21 | 53.1 | 2.03 | 0.92 | −22.48% | 1.72 | 1.13 | 54.9 | 1.55 | 0.49 | −19.85% | 1.24 | 0.70 |
| 004 | 46.9 | 1.65 | −0.58 | 25.1 | 2.59 | 0.65 | −46.48% | 0.94 | 1.23 | 22.9 | 2.12 | −0.05 | −51.17% | 0.47 | 0.53 |
| 005 | 63.7 | 1.47 | 0.44 | 42.7 | 3.41 | 1.98 | −32.97% | 1.94 | 1.54 | 47.4 | 3.32 | 1.67 | −25.59% | 1.85 | 1.23 |
| 006 | 50.2 | 0.25 | −0.11 | 33.9 | 2.99 | 1.60 | −32.47% | 2.74 | 1.71 | 32.5 | 2.78 | 1.26 | −35.26% | 2.53 | 1.37 |
| 007 | 83.0 | 3.72 | 3.03 | 19.9 | 3.89 | 2.40 | −68.41% | 0.17 | −0.63 | 17.2 | 3.49 | 1.98 | −72.70% | 0.23 | −1.05 |
| 008 | 64.4 | 3.53 | 2.67 | 21.6 | 3.62 | 2.29 | −66.46% | 0.09 | −0.58 | 16.9 | 3.15 | 1.72 | −73.78% | 0.38 | −1.15 |
| 009 | 57.7 | 3.01 | 2.45 | 18.4 | 3.13 | 1.87 | −68.11% | 0.12 | −0.58 | 16.8 | 2.62 | 1.39 | −70.88% | 0.39 | −1.06 |
| 010 | 37.7 | 3.83 | 3.00 | 8.5 | 4.99 | 2.93 | −77.45% | 1.16 | −0.07 | 8.9 | 4.47 | 2.37 | −76.39% | 0.64 | −0.63 |
| 011 | 25.2 | 4.12 | 3.01 | 6.2 | 5.34 | 3.01 | −75.40% | 1.22 | 0.00 | 5.7 | 4.54 | 2.31 | −77.38% | 0.42 | −0.70 |
| 012 | 49.8 | 3.85 | 3.03 | 14.1 | 3.98 | 2.40 | −71.69% | 0.11 | −0.63 | 10.6 | 3.99 | 2.16 | −78.71% | 0.14 | −0.87 |
| 013 | 36.0 | 4.74 | 3.73 | 12.6 | 5.51 | 3.34 | −64.44% | 0.77 | −0.39 | 11.9 | 5.09 | 2.87 | −66.94% | 0.35 | −0.86 |
| 014 | 63.7 | 3.30 | 2.50 | 17.9 | 3.91 | 2.36 | −71.90% | 0.61 | −0.14 | 15.7 | 3.05 | 1.44 | −75.35% | 0.25 | −1.06 |
| 015 | 62.4 | 4.32 | 3.42 | 23.0 | 4.49 | 2.75 | −63.14% | 0.17 | −0.67 | 16.8 | 3.84 | 2.15 | −73.08% | 0.48 | −1.27 |
| 016 | 70.3 | 4.08 | 3.30 | 29.1 | 4.07 | 2.54 | −58.61% | 0.01 | −0.76 | 24.6 | 3.69 | 2.05 | −65.01% | 0.39 | −1.25 |
| 017 | 49.5 | 4.90 | 3.87 | 16.3 | 5.10 | 3.21 | −67.07% | 0.20 | −0.66 | 11.9 | 5.07 | 2.83 | −75.96% | 0.17 | −1.04 |
| 018 | 67.5 | 4.79 | 3.74 | 26.1 | 4.50 | 2.85 | −61.33% | 0.29 | −0.89 | 15.5 | 3.87 | 2.10 | −77.04% | 0.92 | −1.64 |
| 019 | 36.7 | 5.34 | 4.20 | 11.4 | 5.16 | 3.37 | −68.94% | 0.18 | −0.83 | 8.3 | 4.44 | 2.61 | −77.38% | 0.90 | −1.69 |
| 020 | 68.3 | 4.31 | 3.48 | 30.3 | 4.64 | 2.98 | −55.64% | 0.33 | −0.50 | 20.9 | 3.76 | 2.03 | −69.40% | 0.55 | −1.45 |
| 021 | 68.5 | 4.56 | 3.71 | 24.9 | 4.52 | 2.76 | −63.65% | 0.06 | −0.95 | 20.7 | 4.16 | 2.30 | −69.78% | 0.42 | −1.41 |
| 022 | 64.8 | 5.02 | 3.96 | 16.3 | 4.84 | 2.94 | −74.85% | 0.18 | −1.02 | 12.1 | 4.35 | 2.43 | −81.33% | 0.67 | −1.53 |
| 023 | 73.6 | 4.95 | 3.92 | 34.6 | 4.28 | 2.72 | −52.93% | 0.67 | −1.20 | 24.7 | 3.89 | 2.13 | −66.39% | 1.06 | −1.79 |
| 031 | 59.2 | 0.51 | 0.05 | 50.4 | 1.23 | 0.69 | −14.86% | 0.72 | 0.64 | 51.5 | 1.45 | 0.71 | −13.01% | 0.94 | 0.66 |
| 032 | 72.0 | 0.37 | −0.35 | 59.7 | 0.88 | 0.33 | −17.08% | 0.51 | 0.68 | 63.2 | 1.33 | 0.47 | −12.22% | 0.96 | 0.82 |
| 033 | 47.7 | 0.39 | −0.02 | 33.3 | 1.05 | 1.11 | −30.19% | 0.66 | 1.13 | 38.8 | 1.71 | 0.88 | −18.66% | 1.32 | 0.90 |
| 034 | 62.1 | 0.94 | 0.21 | 49.1 | 1.62 | 1.07 | −20.93% | 0.88 | 0.86 | 53.4 | 2.10 | 1.10 | −14.01% | 1.16 | 0.89 |
| 035 | 48.1 | 0.82 | −0.25 | 32.3 | 1.52 | 0.62 | −32.85% | 0.70 | 0.87 | 36.1 | 1.60 | 0.60 | −24.95% | 0.78 | 0.85 |
| 036 | 50.0 | 0.18 | −0.09 | 33.8 | 1.52 | 0.60 | −32.40% | 1.34 | 0.69 | 37.4 | 1.23 | 0.30 | −25.20% | 1.05 | 0.39 |
| 037 | 48.5 | 0.59 | 0.06 | 34.9 | 2.25 | 1.22 | −28.04% | 1.66 | 1.16 | 41.5 | 2.13 | 1.08 | −14.43% | 1.54 | 1.02 |
| 038 | 67.6 | 1.63 | 1.22 | 59.1 | 2.02 | 1.26 | −12.57% | 0.39 | 0.04 | 59.8 | 2.16 | 1.15 | −11.64% | 0.53 | −0.07 |
| 039 | 60.6 | 1.23 | 0.28 | 49.4 | 2.08 | 1.14 | −18.48% | 0.85 | 0.66 | 51.0 | 2.06 | 0.94 | −15.84% | 0.83 | 0.66 |
| 040 | 64.7 | 0.61 | −0.42 | 49.1 | 1.25 | 0.44 | −24.11% | 0.64 | 0.66 | 53.7 | 0.81 | −0.01 | −17.00% | 0.20 | 0.41 |
| 041 | 58.1 | 0.32 | −0.15 | 42.9 | 1.58 | 0.75 | −26.16% | 1.26 | 0.90 | 48.8 | 1.60 | 0.69 | −16.01% | 1.28 | 0.84 |
| 042 | 59.3 | 0.24 | −0.19 | 41.2 | 2.36 | 1.23 | −30.52% | 2.14 | 1.42 | 44.5 | 2.04 | 0.69 | −24.96% | 1.80 | 1.08 |
| 043 | 53.6 | 0.55 | −0.53 | 41.6 | 1.95 | 0.91 | −22.39% | 1.40 | 1.44 | 44.6 | 2.05 | 0.75 | −16.79% | 1.50 | 1.28 |
| 044 | 35.3 | 0.43 | −0.08 | 25.3 | 2.47 | 1.25 | −28.33% | 2.04 | 1.33 | 29.6 | 2.33 | 0.98 | −16.15% | 1.90 | 1.06 |
| 045 | 65.6 | 0.41 | −0.41 | 58.1 | 2.16 | 1.19 | −11.43% | 1.75 | 1.60 | 59.7 | 2.44 | 1.09 | −8.99% | 2.03 | 1.50 |
| 046 | 36.1 | 0.42 | −0.11 | 28.3 | 2.63 | 1.31 | −21.61% | 2.21 | 1.42 | 31.2 | 2.63 | 1.19 | −13.57% | 2.21 | 1.30 |
| 047 | 66.9 | 0.30 | −0.08 | 58.8 | 1.93 | 0.99 | −12.11% | 1.83 | 1.07 | 61.7 | 2.01 | 0.77 | −7.77% | 1.71 | 0.85 |
| 048 | 64.0 | 0.57 | −0.43 | 54.8 | 2.41 | 1.08 | −14.38% | 1.84 | 1.51 | 55.9 | 1.97 | 0.67 | −12.66% | 1.40 | 1.10 |
| 049 | 67.4 | 0.77 | −0.57 | 53.9 | 1.95 | 0.47 | −20.03% | 1.18 | 1.04 | 54.0 | 1.43 | 0.16 | −19.88% | 0.66 | 0.73 |
| 050 | 46.8 | 0.84 | −0.33 | 35.9 | 2.32 | 0.93 | −23.29% | 1.48 | 1.26 | 33.9 | 1.99 | 0.65 | −27.56% | 1.15 | 0.98 |
| 051 | 64.7 | 0.17 | −0.16 | 52.3 | 2.40 | 1.13 | −19.17% | 2.23 | 1.29 | 54.8 | 2.14 | 0.86 | −15.30% | 1.97 | 1.02 |
| 052 | 62.7 | 0.48 | −0.03 | 48.8 | 2.91 | 1.32 | −22.49% | 2.43 | 1.35 | 55.4 | 2.54 | 1.07 | −11.64% | 2.06 | 1.10 |
| 053 | 58.5 | 0.37 | 0.07 | 47.4 | 2.40 | 1.19 | −18.97% | 2.03 | 1.12 | 52.3 | 2.35 | 1.00 | −10.60% | 1.98 | 0.93 |
| 054 | 46.2 | 1.08 | −0.21 | 30.3 | 2.48 | 0.91 | −34.42% | 1.40 | 1.12 | 32.8 | 2.00 | 0.48 | −29.00% | 0.92 | 0.69 |
| 055 | 35.2 | 0.27 | −0.02 | 22.3 | 2.79 | 1.36 | −36.85% | 2.52 | 1.38 | 26.1 | 2.24 | 0.90 | −25.85% | 1.97 | 0.92 |
| 067 | 64.6 | 0.56 | −0.55 | 45.6 | 0.96 | 0.39 | −29.41% | 0.40 | 0.94 | 40.1 | 1.63 | 0.83 | −37.93% | 1.07 | 1.38 |
| 068 | 68.2 | 0.50 | −0.40 | 50.2 | 1.28 | 0.61 | −26.39% | 0.78 | 1.01 | 38.6 | 1.98 | 0.97 | −43.40% | 1.48 | 1.37 |
| 069 | 69.8 | 0.78 | −0.53 | 53.5 | 0.93 | 0.40 | −23.35% | 0.15 | 0.93 | 48.2 | 1.76 | 0.80 | −30.95% | 0.98 | 1.33 |
| 070 | 88.5 | 0.63 | −0.60 | 50.6 | 0.98 | 0.42 | −26.13% | 0.35 | 1.02 | 39.8 | 1.33 | 0.53 | −41.90% | 0.70 | 1.13 |
| 071 | 66.7 | 0.61 | −0.57 | 47.5 | 1.03 | 0.25 | −28.79% | 0.42 | 0.82 | 36.6 | 1.75 | 0.78 | −44.83% | 1.14 | 1.35 |
| 072 | 69.8 | 0.79 | −0.67 | 49.5 | 0.72 | 0.21 | −29.08% | 0.07 | 0.88 | 50.1 | 1.37 | 0.51 | −28.22% | 0.58 | 1.18 |
| 073 | 68.2 | 1.03 | −0.88 | 40.8 | 0.91 | 0.16 | −40.47% | 0.12 | 1.04 | 38.9 | 1.13 | 0.26 | −42.96% | 0.10 | 1.14 |
| 074 | 68.6 | 0.54 | −0.34 | 39.9 | 0.99 | 0.49 | −41.84% | 0.45 | 0.83 | 32.3 | 1.42 | 0.63 | −52.92% | 0.88 | 0.97 |
| 075 | 67.9 | 0.43 | −0.32 | 38.0 | 1.39 | 0.71 | −44.04% | 0.96 | 1.03 | 32.8 | 1.38 | 0.70 | −51.69% | 0.95 | 1.02 |
| 076 | 61.2 | 0.63 | −0.41 | 37.6 | 1.55 | 0.83 | −38.56% | 0.92 | 1.24 | 43.1 | 1.94 | 0.95 | −29.58% | 1.31 | 1.36 |
| 077 | 67.2 | 0.60 | −0.26 | 37.8 | 1.62 | 0.87 | −43.75% | 1.02 | 1.13 | 36.3 | 1.62 | 0.82 | −45.98% | 1.02 | 1.08 |
| 078 | 67.3 | 0.62 | −0.24 | 43.0 | 1.54 | 0.85 | −36.11% | 0.92 | 1.09 | 35.2 | 2.19 | 1.20 | −47.70% | 1.57 | 1.44 |
| 079 | 63.3 | 0.93 | 0.01 | 41.8 | 1.55 | 0.88 | −33.97% | 0.62 | 0.65 | 33.8 | 2.14 | 1.12 | −46.60% | 1.21 | 1.11 |
| 080 | 67.9 | 0.53 | −0.33 | 44.4 | 1.20 | 0.63 | −34.61% | 0.67 | 0.96 | 37.9 | 2.02 | 1.05 | −44.18% | 1.49 | 1.38 |
| 081 | 67.8 | 0.50 | −0.35 | 41.0 | 1.20 | 0.58 | −39.53% | 0.70 | 0.93 | 34.6 | 1.83 | 0.86 | −48.97% | 1.33 | 1.21 |
| 082 | 63.5 | 0.49 | −0.47 | 44.2 | 1.62 | 0.85 | −30.39% | 1.13 | 1.32 | 41.3 | 1.83 | 0.89 | −34.96% | 1.34 | 1.36 |
| 083 | 69.3 | 0.55 | −0.35 | 49.9 | 1.32 | 0.71 | −27.99% | 0.77 | 1.06 | 38.2 | 1.61 | 0.80 | −44.86% | 1.06 | 1.15 |
| 084 | 68.7 | 0.88 | −0.23 | 46.4 | 1.68 | 0.84 | −32.46% | 0.82 | 1.07 | 38.5 | 2.00 | 0.97 | −43.96% | 1.14 | 1.20 |

TABLE 9-continued

OVEN BAKE

| | | | | | | | | | | | | | | | |
|---|---|---|---|---|---|---|---|---|---|---|---|---|---|---|---|
| 085 | 67.9 | 0.50 | −0.38 | 57.4 | 1.13 | 0.47 | −15.46% | 0.63 | 0.85 | 55.5 | 0.95 | 0.32 | −18.26% | 0.45 | 0.70 |
| 086 | 62.7 | 0.46 | −0.26 | 48.7 | 1.13 | 0.41 | −22.33% | 0.67 | 0.67 | 51.1 | 1.28 | 0.45 | −18.50% | 0.82 | 0.71 |
| 087 | 68.8 | 0.31 | −0.25 | 58.5 | 1.05 | 0.36 | −17.88% | 0.74 | 0.63 | 60.7 | 1.33 | 0.39 | −11.77% | 1.02 | 0.64 |
| 088 | 54.4 | 0.22 | −0.11 | 45.2 | 1.46 | 0.75 | −16.91% | 1.24 | 0.86 | 47.0 | 1.45 | 0.71 | −13.60% | 1.23 | 0.82 |
| KA 1400 | 97.0 | 2.86 | −0.24 | 92.1 | 3.75 | 1.06 | −5.05% | 0.89 | 1.30 | 81.2 | 4.66 | 1.91 | −18.29% | 2.00 | 2.15 |
| KA 1700T | 26.5 | 4.14 | 0.42 | 25.0 | 4.14 | −0.08 | −5.66% | 0.00 | −0.50 | 23.0 | 4.07 | 0.19 | −13.21% | 0.07 | −0.23 |
| Sher-cryl | 80.0 | 7.97 | 4.05 | 74.3 | 6.26 | 1.07 | −7.13% | 1.71 | −2.98 | 60.6 | 5.96 | 0.74 | −24.25% | 2.01 | −3.31 |
| Centurion | 50.7 | 10.50 | 1.92 | 32.9 | 11.32 | 4.46 | −35.11% | 0.82 | 2.54 | 25.0 | 11.07 | 3.84 | −50.69% | 0.57 | 1.92 |
| HS+ | 80.0 | 7.95 | 6.40 | 78.0 | 3.58 | 2.46 | −2.50% | 4.37 | −3.94 | 75.5 | 3.40 | 2.53 | −5.63% | 4.55 | −3.87 |
| 700T | 22.0 | 2.48 | 1.88 | 15.3 | 0.84 | −0.25 | −30.45% | 1.64 | −2.13 | 12.5 | 0.57 | −0.17 | −43.18% | 1.91 | −2.05 |

Viscosity, settling, and pH Stability (6 weeks at 140° F.)

| Formula | InitialKU | final KU | % change | Initial ICI | final ICI | % change | Initial pH | final pH | % change | settling amount | settling type |
|---|---|---|---|---|---|---|---|---|---|---|---|
| 001 | 96 | gelled | | 1.6 | gelled | | 9.58 | n/a | | n/a | n/a |
| 002 | 140 | gelled | | 1.18 | gelled | | 9.59 | n/a | | n/a | n/a |
| 003 | 94 | gelled | | 1.16 | gelled | | 9.43 | n/a | | n/a | n/a |
| 004 | 79 | gelled | | 1.88 | gelled | | 9.65 | n/a | | n/a | n/a |
| 005 | 136 | gelled | | 0.69 | gelled | | 9.61 | n/a | | n/a | n/a |
| 006 | 108 | gelled | | 1.83 | gelled | | 9.3 | n/a | | n/a | n/a |
| 007 | 91 | gelled | | 1.66 | gelled | | 9.48 | n/a | | n/a | n/a |
| 008 | 95 | gelled | | 1.88 | gelled | | 9.32 | n/a | | n/a | n/a |
| 009 | 68 | gelled | | 1.11 | gelled | | 9.42 | n/a | | n/a | n/a |
| 010 | 65 | gelled | | 0.492 | gelled | | 9.09 | n/a | | n/a | n/a |
| 011 | 83 | gelled | | 9.42 | gelled | | 9.14 | n/a | | n/a | n/a |
| 012 | 69 | gelled | | 0.68 | gelled | | 9.45 | n/a | | n/a | n/a |
| 013 | 74 | gelled | | 0.77 | gelled | | 9.32 | n/a | | n/a | n/a |
| 014 | 88 | gelled | | 0.58 | gelled | | 9.55 | n/a | | n/a | n/a |
| 015 | 61 | gelled | | 1.17 | gelled | | 9.52 | n/a | | n/a | n/a |
| 016 | 68 | gelled | | 1.12 | gelled | | 9.38 | n/a | | n/a | n/a |
| 017 | 81 | gelled | | 1.63 | gelled | | 9.52 | n/a | | n/a | n/a |
| 018 | 68 | gelled | | 0.68 | gelled | | 1.697 | n/a | | n/a | n/a |
| 019 | 83 | gelled | | 1.28 | gelled | | 9.47 | n/a | | n/a | n/a |
| 020 | 78 | gelled | | 2.34 | gelled | | 9.64 | n/a | | n/a | n/a |
| 021 | 69 | gelled | | 1.19 | gelled | | 9.53 | n/a | | n/a | n/a |
| 022 | 80 | gelled | | 0.78 | gelled | | 9.65 | n/a | | n/a | n/a |
| 023 | 70 | gelled | | 0.88 | gelled | | 9.48 | n/a | | n/a | n/a |
| 031 | 93 | gelled | | 1.37 | gelled | | 9.57 | n/a | | n/a | n/a |
| 032 | 72 | gelled | | 1.5 | gelled | | 9.24 | n/a | | n/a | n/a |
| 033 | 86 | 70 | −18.60 | 0.9 | 1.40 | 55.11 | 9.01 | 8.21 | −8.68 | 10 | soft |
| 034 | 90 | gelled | | 1.13 | gelled | | 9.44 | n/a | | n/a | n/a |
| 035 | 83 | gelled | | 1.95 | gelled | | 9.44 | n/a | | n/a | n/a |
| 036 | 88 | gelled | | 1.17 | gelled | | 9.33 | n/a | | n/a | n/a |
| 037 | 92 | gelled | | 0.65 | gelled | | 9.23 | n/a | | n/a | n/a |
| 038 | 68 | gelled | | 1.38 | gelled | | 9.55 | n/a | | n/a | n/a |
| 039 | 101 | gelled | | 0.77 | gelled | | 9.56 | n/a | | n/a | n/a |
| 040 | 88 | gelled | | 0.54 | gelled | | 9.4 | n/a | | n/a | n/a |
| 041 | 92 | gelled | | 1.79 | gelled | | 9.39 | n/a | | n/a | n/a |
| 042 | 85 | gelled | | 0.88 | gelled | | 9.44 | n/a | | n/a | n/a |
| 043 | 81 | gelled | | 0.7 | gelled | | 9.5 | n/a | | n/a | n/a |
| 044 | 85 | gelled | | 1.35 | gelled | | 9.49 | n/a | | n/a | n/a |
| 045 | 75 | gelled | | 1.18 | gelled | | 9.3 | n/a | | n/a | n/a |
| 046 | 73 | gelled | | 1.11 | gelled | | 9.22 | n/a | | n/a | n/a |
| 047 | 84 | gelled | | 0.7 | gelled | | 9.37 | n/a | | n/a | n/a |
| 048 | 80 | gelled | | 1.34 | gelled | | 9.53 | n/a | | n/a | n/a |
| 049 | 88 | gelled | | 1.66 | gelled | | 9.07 | n/a | | n/a | n/a |
| 050 | 68 | gelled | | 0.63 | gelled | | 9.4 | n/a | | n/a | n/a |
| 051 | 64 | gelled | | 2.88 | gelled | | 9.43 | n/a | | n/a | n/a |
| 052 | 138 | gelled | | 1.62 | gelled | | 9.55 | n/a | | n/a | n/a |
| 053 | 78 | gelled | | 1.34 | gelled | | 9.65 | n/a | | 20 | medium |
| 054 | 58 | gelled | | 1.48 | gelled | | 9.72 | n/a | | n/a | n/a |
| 055 | 57 | gelled | | 1.74 | gelled | | 9.32 | n/a | | n/a | n/a |
| 067 | 89 | 110 | 23.60 | 0.85 | 1.29 | 51.53 | 9.81 | 9.05 | −7.78 | 60 | medium |
| 068 | 87 | 183? | | 0.51 | 1.22 | 139.41 | 9.7 | 8.89 | −8.35 | 50 | ed-hard |
| 069 | 98 | gelled | | 0.51 | gelled | | 9.71 | gelled | | 90 | ed-hard |
| 070 | 77 | gelled | | 0.73 | gelled | | 9.75 | gelled | | 50 | ed-hard |
| 071 | 85 | 94 | 10.59 | 1.55 | 0.67 | −56.71 | 9.78 | 9.04 | −7.38 | 75 | medium |
| 072 | 96 | n/a | | 0.52 | n/a | | 9.8 | n/a | | n/a | n/a |
| 073 | 90 | 107 | 18.69 | 0.41 | 1.26 | 208.05 | 9.73 | 9.08 | −6.68 | 50 | soft |
| 074 | 90 | 99 | 10.00 | 0.85 | 0.93 | 9.29 | 9.91 | 9.12 | −7.97 | 80 | soft |
| 075 | 90 | gelled | | 0.8 | n/a | | 9.73 | gelled | | 70 | medium |
| 076 | 84 | 70 | −18.87 | 0.84 | 0.79 | −5.71 | 9.67 | 8.93 | −7.65 | 20 | soft |
| 077 | 96 | 111 | 15.63 | 0.69 | 1.10 | 59.42 | 9.9 | 9.11 | −7.98 | 70 | soft |
| 078 | 94 | 109 | 15.96 | 0.63 | 0.88 | 40.16 | 9.9 | 9.14 | −7.68 | 50 | soft |
| 079 | 77 | 78 | 1.30 | 1.1 | 0.79 | 28.36 | 9.92 | 9.37 | −5.64 | 20 | medium |
| 080 | 85 | 93 | 9.41 | 0.97 | 0.75 | −22.27 | 9.78 | 8.97 | −6.28 | 60 | medium |

TABLE 9-continued

| | | | | OVEN BAKE | | | | | | | |
|---|---|---|---|---|---|---|---|---|---|---|---|
| 081 | 94 | 116 | 23.40 | 1.06 | 0.58 | −45.00 | 9.6 | 9.16 | −6.53 | 80 | soft |
| 082 | 83 | 86 | 3.61 | 0.71 | 0.29 | −59.44 | 9.87 | 8.8 | −9.00 | 20 | soft |
| 083 | 91 | gelled | | 1.1 | gelled | | 9.82 | gelled | | gelled | gelled |
| 084 | 83 | 94 | 13.25 | 0.74 | 0.98 | 31.76 | 9.78 | n/a | | 60 | medium |
| 085 | 87 | gelled | | 0.64 | gelled | | 9.01 | gelled | | gelled | gelled |
| 086 | 72 | gelled | | 1.05 | gelled | | 9.33 | gelled | | gelled | gelled |
| 087 | 83 | gelled | | 0.78 | gelled | | 9.35 | gelled | | gelled | gelled |
| 088 | 90 | gelled | | 0.95 | gelled | | 9.18 | gelled | | gelled | gelled |

% settling is the relative ht on stirring stick that adheres w/o easily failing away (Key for Tables 7, 8 and 9)
Resin 1=Binder resin C2
Resin 2=Binder resin B28
Resin 3=Binder resin B27
Resin 4=Binder resin B29
Dispersant Amount:
1=Dispersant used in pigment grind as in Example G.
2=Dispersant used in pigment grind and in final mix as in Example H.
Pencil Hardness Ratings:
0 <3B
1 3B
2 2B
3 B
4 HB
5 F
6 H
7 2H
8 3H
9 4H
Blister Density:
1 Dense
2 Medium dense
3 Medium
4 Few
5 No Blister While this invention has been described by a specific number of embodiments, other variations and modifications may be made without departing from the spirit and scope of the invention as set forth in the appended claims.

The entire disclosure of all applications, patents and publications cited herein are hereby incorporated by reference.

The invention claimed is:

1. An aqueous coating composition comprising:
   (a) a binder polymer polymerized from one or more copolymerizable monoethylenically unsaturated monomers containing latent crosslinking functionality, wherein at least one of said monoethylenically unsaturated monomers is a carbonyl-containing monomer selected from the group consisting of acrolein, methacrolein, diacetone acrylamide, diacetone methacrylamide and vinylaceto acetate; and
   (b) a second polymer polymerized from monomers comprising a monoethylenically unsaturated monomer containing latent crosslinking functionality and a macromonomer comprising a hydrophobic portion and an alkoxylated portion, wherein the amount of the monoethylenically unsaturated monomer containing latent crosslinking functionality is in a range that extends from greater than 5 weight percent to 50 weight percent, based on the total weight of the second polymer.

2. The coating composition of claim 1 wherein the monoethylenically unsaturated monomers forming the binder polymer further comprise a macromonomer represented by the formula:

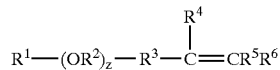

wherein:
   $R^1$ is a monovalent residue of a substituted or unsubstituted hydrophobe compound;
   each $R^2$ is the same or different and is a substituted or unsubstituted divalent hydrocarbon residue;
   $R^3$ is a substituted or unsubstituted divalent hydrocarbon residue;
   $R^4$, $R^5$, $R^6$ are the same or different and are hydrogen or a substituted or unsubstituted monovalent hydrocarbon residue;
   and z is a value of 0 to 150.

3. The coating composition of claim 1 wherein said second polymer is a dispersant polymer.

4. The coating composition of claim 1 wherein said second polymer is a thickener polymer.

5. The coating composition of claim 1 wherein the monoethylenically unsaturated monomers forming the binder polymer comprise:
   (a) 40–60% by weight of a fatty acid vinyl ester;
   (b) 30–50% by weight of methylmethacrylate;
   (c) 0.5–10% by weight of diacetone acrylamide; and
   (d) 0.5%–5% by weight of methacrylic acid, based on the total weight of the binder polymer.

6. The coating composition of claim 1 wherein the monomer containing latent crosslinking functionality is diacetone acrylamide.

7. An aqueous coating composition comprising:
   (a) a binder polymer polymerized from one or more copolymerizable monoethylenically unsaturated monomers, wherein at least one of said monoethylenically unsaturated monomers is a carbonyl-containing monomer selected from the group consisting of acrolein, methacrolein, diacetone acrylamide, diacetone methacrylamide and vinylaceto acetate; and
   (b) a polymer comprising the reaction product of:
      (i) an unsaturated carboxylic acid monomer,
      (ii) a monoethylenically unsaturated monomer different from the carboxylic acid monomer,
      (ii) a macromonomer comprising a hydrophobic portion and an alkoxylated portion, and
      (iv) a monoethylenically unsaturated monomer containing latent crosslinking functionality, wherein the amount of the monoethylenically unsaturated monomer containing latent crosslinking functionality is in a range that extends from greater than 5 weight percent to 50 weight percent, based on the total weight of the at least one polymer.

8. The coating composition of claim 7 wherein said monoethylenically unsaturated monomer containing latent crosslinking functionality comprises a carbonyl-containing monomer selected from the group consisting of acrolein, methacrolein, diacetone acrylamide, diacetone methacrylamide and vinylaceto acetate.

9. The coating composition of claim 7 wherein said macromonomer is represented by the formula:

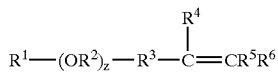

wherein:
$R^1$ is a monovalent residue of a substituted or unsubstituted hydrophobe compound;
each $R^2$ is the same or different and is a substituted or unsubstituted divalent hydrocarbon residue;
$R^3$ is a substituted or unsubstituted divalent hydrocarbon residue;
$R^4$, $R^5$, $R^6$ are the same or different and are hydrogen or a substituted or unsubstituted monovalent hydrocarbon residue;
and z is a value of 0 to 150.

10. The coating composition of claim 7 wherein the monoethylenically unsaturated monomers forming the binder polymer further comprise a macromonomer represented by the formula:

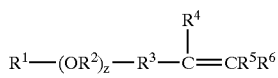

wherein:
$R^1$ is a monovalent residue of a substituted or unsubstituted hydrophobe compound;
each $R^2$ is the same or different and is a substituted or unsubstituted divalent hydrocarbon residue;
$R^3$ is a substituted or unsubstituted divalent hydrocarbon residue;
$R^4$, $R^5$, $R^6$ are the same or different and are hydrogen or a substituted or unsubstituted monovalent hydrocarbon residue;
and z is a value of 0 to 150.

11. The coating composition of claim 7 wherein the monoethylenically unsaturated monomers forming the binder polymer comprise:
(a) 40–60% by weight of a fatty acid vinyl ester;
(b) 30–50% by weight of methylmethacrylate;
(c) 0.5–10% by weight of diacetone acrylamide; and
(d) 0.5%–5% by weight of methacrylic acid, based on the total weight of the binder polymer.

12. The coating composition of claim 7 wherein the monomer containing latent crosslinking functionality is diacetone acrylamide.

13. The coating composition of claim 7 further comprising a second polymer comprising the reaction product of:
(i) an unsaturated carboxylic acid monomer,
(ii) a monoethylenically unsaturated monomer different from the carboxylic acid monomer,
(iii) a macromonomer comprising a hydrophobic portion and an alkoxylated portion, and
(iv) a monoethylenically unsaturated monomer containing latent crosslinking functionality.

14. The coating composition of claim 1, wherein the macromonomer is represented by the formula:

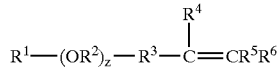

wherein:
$R^1$ is a monovalent residue of a substituted or unsubstituted hydrophobe compound;
each $R^2$ is the same or different and is a substituted or unsubstituted divalent hydrocarbon residue;
$R^3$ is a substituted or unsubstituted divalent hydrocarbon residue;
$R^4$, $R^5$, $R^6$ are the same or different and are hydrogen or a substituted or unsubstituted monovalent hydrocarbon residue;
and z is a value of 0 to 150.

15. The coating composition of claim 1, wherein the carbonyl-containing monomer is diacetone acrylamide.

16. The coating composition of claim 7, wherein the carbonyl-containing monomer is diacetone acrylamide.

17. The aqueous coating composition of claim 1, wherein the monoethylenically unsaturated monomer containing latent crosslinking that is used to form the second polymer is a carbonyl-containing monomer selected from the group consisting of acrolein, methacrolein, diacetone acrylamide, diacetone methacrylamide and vinylaceto acetate.

18. The aqueous coating composition of claim 7, wherein the amount of the monoethylenically unsaturated monomer containing latent crosslinking functionality that is used to form the polymer is in a range that extends from greater than 5 weight percent to 35 weight percent, based on the total weight of the polymer.

19. The aqueous coating composition of claim 18, wherein the polymer is a dispersant polymer, a thickener polymer or a combination thereof.

20. The aqueous coating composition of claim 19, wherein the monoethylenically unsaturated monomer containing latent crosslinking that is used to form the dispersant polymer and the thickener polymer is a carbonyl-containing monomer selected from the group consisting of acrolein, methacrolein, diacetone acrylamide, diacetone methacrylamide and vinylaceto acetate.

21. An aqueous coating composition comprising:
(a) a binder polymer polymerized from one or more copolymerizable monoethylenically unsaturated monomers, wherein at least one of said monoethylenically unsaturated monomers is a carbonyl-containing monomer selected from the group consisting of acrolein, methacrolein, diacetone acrylamide, diacetone methacrylamide and vinylaceto acetate; and
(b) a second polymer polymerized from monomers comprising a monoethylenically unsaturated monomer containing latent crosslinking functionality and a macromonomer comprising a hydrophobic portion and an alkoxylated portion, wherein the amount of the monoethylenically unsaturated monomer containing latent crosslinking functionality is in a range that extends from greater than 5 weight percent to 50 weight percent, based on the total weight of the second polymer,
wherein the monoethylenically unsaturated monomers forming the binder polymer further comprise a macromonomer represented by the formula:

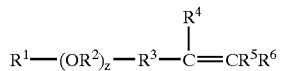

wherein
  $R^1$ is a monovalent residue of a substituted or unsubstituted hydrophobe compound;
  each $R^2$ is the same or different and is a substituted or unsubstituted divalent hydrocarbon residue;
  $R^3$ is a substituted divalent hydrocarbon residue;
  $R^4$, $R^5$, $R^6$ are the same or different and are hydrogen or a substituted or unsubstituted monovalent hydrocarbon residue:
  and z is a value of 0 to 150.

* * * * *